US012299841B2

(12) United States Patent
Matsuura et al.

(10) Patent No.: US 12,299,841 B2
(45) Date of Patent: May 13, 2025

(54) MEDICAL DATA PROCESSING METHOD, MODEL GENERATION METHOD, MEDICAL DATA PROCESSING APPARATUS, AND COMPUTER-READABLE NON-TRANSITORY STORAGE MEDIUM STORING MEDICAL DATA PROCESSING PROGRAM

(71) Applicant: CANON MEDICAL SYSTEMS CORPORATION, Otawara (JP)

(72) Inventors: Masakazu Matsuura, Nasushiobara (JP); Takuya Nemoto, Hitachinaka (JP); Hiroki Taguchi, Otawara (JP); Tzu-Cheng Lee, Vernon Hills, IL (US); Jian Zhou, Vernon Hills, IL (US); Liang Cai, Vernon Hills, IL (US); Zhou Yu, Vernon Hills, IL (US)

(73) Assignee: Canon Medical Systems Corporation, Otawara (JP)

( * ) Notice: Subject to any disclaimer, the term of this patent is extended or adjusted under 35 U.S.C. 154(b) by 349 days.

(21) Appl. No.: 17/705,030

(22) Filed: Mar. 25, 2022

(65) Prior Publication Data
US 2022/0327662 A1 Oct. 13, 2022

Related U.S. Application Data

(60) Provisional application No. 63/251,357, filed on Oct. 1, 2021, provisional application No. 63/171,700, filed on Apr. 7, 2021.

(51) Int. Cl.
*G06T 3/4053* (2024.01)
*G06T 3/4046* (2024.01)
(Continued)

(52) U.S. Cl.
CPC .......... *G06T 3/4053* (2013.01); *G06T 3/4046* (2013.01); *G06T 5/50* (2013.01);
(Continued)

(58) Field of Classification Search
None
See application file for complete search history.

(56) References Cited

U.S. PATENT DOCUMENTS 9,332,953 B2    5/2016  Suzuki
2013/0051516 A1 2/2013  Yang et al.
(Continued)

FOREIGN PATENT DOCUMENTS

CN    112489156 A  *  3/2021  ........... G06K 9/6256
EP    3447731 A1      2/2019
(Continued)

OTHER PUBLICATIONS

Extended European Search Report for European application No. 22166370.1, Aug. 24, 2022.
(Continued)

*Primary Examiner* — Jiangeng Sun
(74) *Attorney, Agent, or Firm* — Canon U.S.A., Inc. IP Division

(57) ABSTRACT

A medical data processing method according to an embodiment includes inputting first medical data relating to a subject imaged with a medical image capture apparatus to a learned model to configured to generate second medical data having lower noise than that of the first medical data and having a super resolution compared with the first medical data based on the first medical data to output the second medical data.

11 Claims, 28 Drawing Sheets

(51) Int. Cl.
*G06T 5/50* (2006.01)
*G06T 5/70* (2024.01)

(52) U.S. Cl.
CPC ...... *G06T 5/70* (2024.01); *G06T 2207/20016* (2013.01); *G06T 2207/20081* (2013.01); *G06T 2207/20084* (2013.01)

(56) References Cited

U.S. PATENT DOCUMENTS

| | | |
|---|---|---|
| 2013/0051519 A1 | 2/2013 | Yang et al. |
| 2015/0196265 A1 | 7/2015 | Suzuki |
| 2018/0286037 A1 | 10/2018 | Zaharchuk et al. |
| 2018/0349759 A1 | 12/2018 | Isogawa et al. |
| 2019/0035116 A1 | 1/2019 | Xing et al. |
| 2019/0066268 A1 | 2/2019 | Song et al. |
| 2019/0104940 A1* | 4/2019 | Zhou ............... G06T 11/008 |
| 2019/0108634 A1 | 4/2019 | Zaharchuk et al. |
| 2019/0108904 A1 | 4/2019 | Zhou et al. |
| 2019/0114742 A1* | 4/2019 | Wang ............... G06T 5/60 |
| 2019/0244399 A1 | 8/2019 | Li et al. |
| 2019/0347772 A1 | 11/2019 | Zhang et al. |
| 2020/0104720 A1 | 4/2020 | Bao et al. |
| 2020/0111194 A1 | 4/2020 | Wang et al. |
| 2020/0175675 A1 | 6/2020 | Ogino et al. |
| 2020/0196972 A1 | 6/2020 | Zhou et al. |
| 2020/0196973 A1 | 6/2020 | Zhou et al. |
| 2020/0234471 A1 | 7/2020 | Lu et al. |
| 2020/0305806 A1 | 10/2020 | Tang et al. |
| 2020/0311490 A1 | 10/2020 | Lee et al. |
| 2020/0311878 A1 | 10/2020 | Matsuura et al. |
| 2021/0007695 A1 | 1/2021 | Lu et al. |
| 2021/0012543 A1 | 1/2021 | Hein et al. |
| 2021/0027426 A1* | 1/2021 | Ma ............... G06T 3/4053 |
| 2022/0217371 A1* | 7/2022 | Jiang ............... G06V 10/993 |

FOREIGN PATENT DOCUMENTS

| | | |
|---|---|---|
| JP | 108153194 A | 6/1996 |
| JP | 2015506774 A | 3/2015 |
| JP | 2015525648 A | 9/2015 |
| JP | 2018005841 A | 1/2018 |
| JP | 2019025044 A | 2/2019 |
| JP | 2019212050 A | 12/2019 |
| JP | 2020036773 A | 3/2020 |
| JP | 2020516345 A | 6/2020 |
| JP | 2020537555 A | 12/2020 |
| JP | 2021013729 A | 2/2021 |
| JP | 2021026592 A | 2/2021 |
| WO | 2017/223560 A1 | 12/2017 |
| WO | 2019/038246 A1 | 2/2019 |
| WO | 2019/081256 A1 | 5/2019 |
| WO | 2020/175446 A1 | 9/2020 |

OTHER PUBLICATIONS

Extended European Search Report for European application No. 22166373.5, Aug. 24, 2022.
Park Junyoung, et al., Computed tomography super-resolution using deep convolutional neural network, Physics in Medicine & Biology, vol. 63, No. 14, Jul. 16, 2018, XP55899083.
Masaki Ikuta, et al., TextureWGAN: Texture Preserving WGAN with MLE Regularizer for Inverse Problems, arxiv.org, Aug. 12, 2020, XP81738408.
Akinori Hata et al., Effect of Matrix Size on the Image Quality of Ultra-high-resolution CT of the Lung, Academic Radiology, vol. 25, No. 7, Jan. 17, 2018, XP55616265.
Y. Li, et al., A Review of the Deep Learning Methods for Medical Images Super Resolution Problems, IRBM, Elsevier, vol. 42, No. 2, Aug. 18, 2020, XP86526328.
S. Xu, et al., Deep residual learning in CT physics: scatter correction for spectral CT, 2017 IEEE Nuclear Science Symposium and Medical Imaging Conference (NSS/MIC), 2017, pp. 1-3.
Hu Chen, et al., Low-dose CT via convolutional neural network, Biomedical Optics Express, vol. 8, No. 2, 2017, pp. 679-694.
Eunhee Kang, et al., A deep convolutional neural network using directional wavelets for low-dose X-ray CT reconstruction, Med Phys., Oct. 2017, American Association of Physicists in Medicine.

* cited by examiner

| NOISE SIMULATION / RESOLUTION SIMULATION | COLLECTED DATA | IMAGE DATA |
|---|---|---|
| COLLECTED DATA | (a) | (b) |
| IMAGE DATA | (c) | (d) |

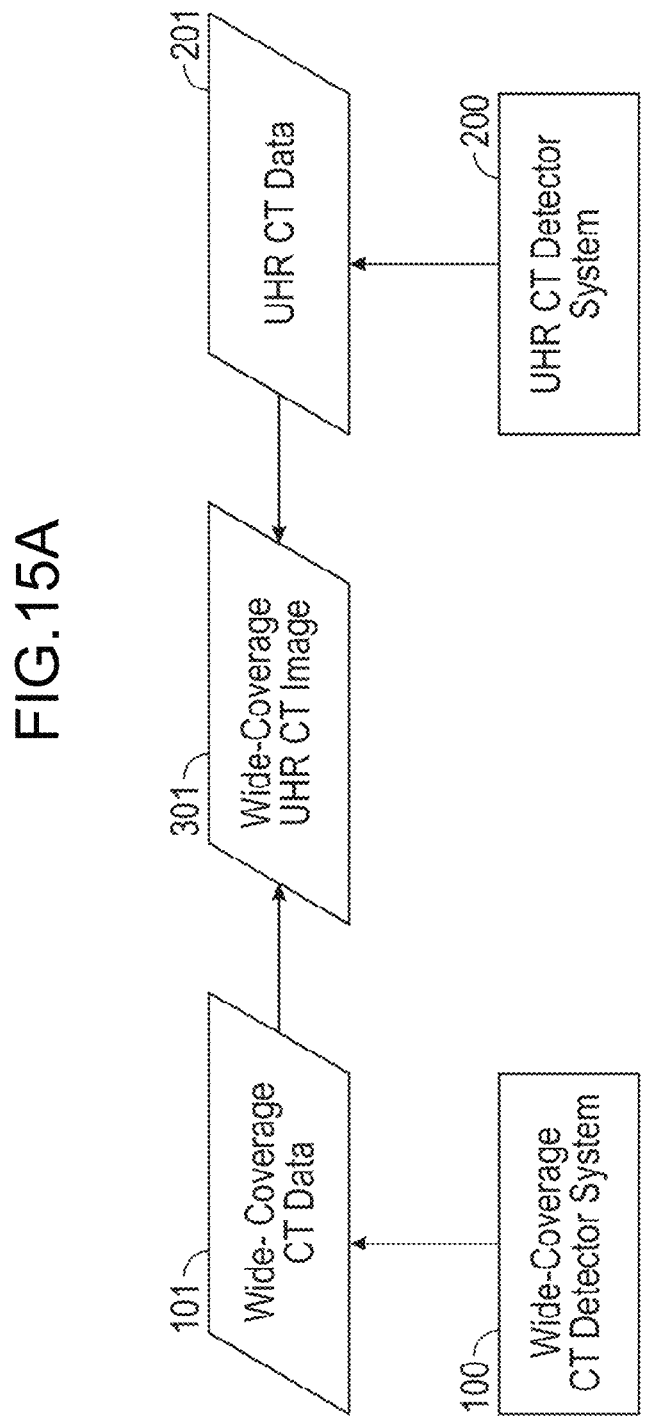

MEDICAL DATA PROCESSING METHOD, MODEL GENERATION METHOD, MEDICAL DATA PROCESSING APPARATUS, AND COMPUTER-READABLE NON-TRANSITORY STORAGE MEDIUM STORING MEDICAL DATA PROCESSING PROGRAM

CROSS-REFERENCE TO RELATED APPLICATIONS

This application is based upon and claims the benefit of priority from U.S. Provisional Application No. 63/251,357, filed on Oct. 1, 2021, and U.S. Provisional Application No. 63/171,700, filed on Apr. 7, 2021, the entire contents of both of which are incorporated herein by reference.

FIELD

Embodiments described herein relate generally to a medical data processing method, a model generation method, a medical data processing apparatus, and a computer-readable non-transitory storage medium storing a medical data processing program. The present disclosure relates generally to the field of medical image processing and diagnostic imaging and more particularly to use of a deep learning model to increase spatial resolution of computed tomography (CT) image.

BACKGROUND

In a computed tomography (CT) examination of a lung field and bones using an X-ray CT apparatus, for example, it is conventionally required to observe their detailed structures. Thus, in the CT examination of a lung field and bones, a CT image generated by reconstruction by the X-ray CT apparatus needs to have higher spatial resolution than that of images of other parts. For example, in a reconstruction method based on filtered back projection (FBP), a technique is known that improves the spatial resolution of the CT image generated by reconstruction using a reconstruction function for enhancing high frequency. Furthermore, a super-resolution technique has recently been proposed for improving spatial resolution in a learned model using deep learning.

Unfortunately, with the FBP-based technique to improve the spatial resolution using a reconstruction function, the high frequency components are emphasized over the entire CT image generated by reconstruction. Thus, with the FBP-based technique to improve the spatial resolution, noise is simultaneously emphasized, which may make it difficult to visually recognize the anatomy in the CT image generated by reconstruction. On the other hand, in a super-resolution CT image with a learned model using deep learning, the resolution of the anatomy can be selectively improved, which can solve the aforementioned issue in the FBP-based reconstruction method.

In a case where projection data is collected with a low dose using an X-ray CT apparatus, such projection data has more noise than that in projection data collected with a high dose. Thus, even if the resolution is improved by the super-resolution, noise in the super-resolution CT image may make it difficult to visually recognize the anatomy.

Detectors for computed tomography have been improved in their coverage with a wider detector and in their spatial resolution with a smaller detector elements' size. Some advantages associated with wider-coverage CT detector systems include expanded coverage, allowing faster scans and even dynamic imaging of organs, including heart and brain. Wider-coverage CT detector systems provide extended coverage per rotation, decreasing scan time and eliminating the need to do otherwise multiple acquisitions. Using a wide-coverage CT detector system may require only one rotation to acquire a whole heart, a neonatal chest or even for foot and ankle scans in a fraction of a second with less radiation dose and great z-axis uniformity.

CT systems with higher spatial resolution, on the other hand, provide diagnostic images that show potential improvements, for example, in tumor classification and staging.

However, even if wide-coverage ultra-high resolution (UHR) CT detector systems were commercially available, the system cost might be expensive as well as suffer from issues related to complexities in signal processing and image reconstruction. Although the advantage of having a wider-coverage, higher resolution CT system includes increased coverage and resolution, the disadvantage of the added costs and complexities may outweigh the advantages in a commercial setting.

Super-resolution imaging (SR) is a technique that enhances the resolution of an imaging system. SR enhances the resolution of an imaging system by recovering high-resolution information from a low-resolution image. There are four categories of SR algorithms: prediction model-based, edge-based, image statistical-based and example-based models. There is a need in the art for Deep convolution neural network-based (DCNN-based) SR approaches that can perform superior image quality and processing speed compared to conventional methods.

BRIEF DESCRIPTION OF THE DRAWINGS

FIG. 15A is a diagram showing an overview of the entire process disclosed in the exemplary embodiments of the present disclosure.

DETAILED DESCRIPTION

Figure 1:
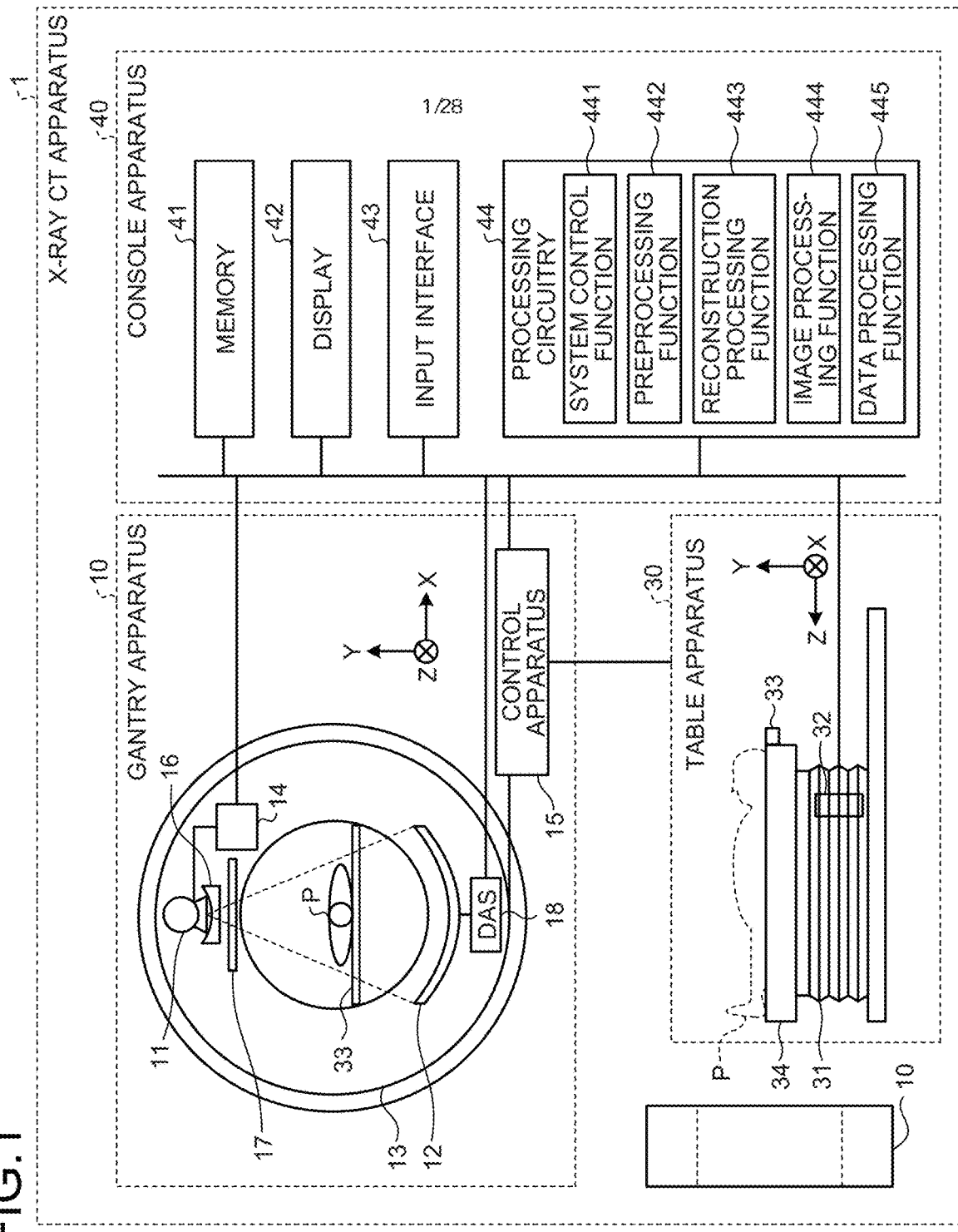
FIG. 1 is a diagram illustrating an example configuration of an X-ray CT apparatus according to an embodiment.

A medical data processing method, a model generation method, a medical data processing apparatus, and a computer-readable non-transitory storage medium storing a medical data processing program will be described below with reference to the drawings. In the following embodiments, components denoted by the same reference signs work similarly, and their overlapping description is omitted as appropriate. To make the description specific, the description is provided on the assumption that the medical data processing apparatus according to the embodiments is installed in a medical image capture apparatus. Note that the medical data processing apparatus according to the embodiments may be realized by a server apparatus capable of achieving the medical data processing method, in other words, a server apparatus or the like capable of executing the medical data processing program.

The description is provided on the assumption that the medical data processing apparatus is installed in an X-ray computed tomography apparatus (hereinafter called an X-ray CT apparatus) as an example of the medical image capture apparatus. Note that the medical image capture apparatus in which this medical data processing apparatus is installed is not limited to an X-ray CT apparatus and may be a nuclear medicine diagnostic apparatus, such as positron emission tomography (PET) and single photon emission computed tomography (SPECT), a magnetic resonance imaging apparatus (hereinafter called an MRI apparatus), a combined apparatus of a nuclear medicine diagnostic apparatus and an X-ray CT apparatus, a combined apparatus of a nuclear medicine diagnostic apparatus and an MRI apparatus, an X-ray angiography apparatus, an X-ray diagnostic apparatus, or the like.

An object of the embodiments is to improve visual recognition of an object, for example, anatomical characteristics, in a medical image and to generate a medical image having improved image quality. For example, one of the problems to be solved by the embodiments disclosed in this specification and the drawings is to improve visual recognition of an object, for example, anatomical characteristics, in a medical image and to generate a medical image having improved image quality. However, the problems to be solved by the embodiments disclosed in this specification and the drawings are not limited to the aforementioned problem. A problem corresponding to an effect achieved by each constituent mentioned in the embodiments described later may be regarded as another problem. A medical data processing method described in the following embodiments includes: acquiring first medical data relating to a subject imaged with a medical image capture apparatus; and inputting the first medical data to a learned model to output second medical data having lower noise than that of the first medical data and having a super resolution compared with the first medical data, the learned model generating the second medical data on the basis of the first medical data.

Embodiments

FIG. 1 is a diagram illustrating an example configuration of an X-ray CT apparatus 1 according to an embodiment. As illustrated in FIG. 1, the X-ray CT apparatus 1 includes a gantry apparatus 10 also called a gantry, a table apparatus 30, and a console apparatus 40. The medical data processing apparatus in this embodiment corresponds to a configuration of the console apparatus 40 illustrated in FIG. 1 from which, for example, a system control function 441 and a preprocessing function 442 are excluded. Note that the medical data processing apparatus in this embodiment may have a configuration of the console apparatus 40 illustrated in FIG. 1 from which an unnecessary constituent is excluded as appropriate.

Note that, in this embodiment, the lengthwise direction of the rotation axis of a rotating frame 13 in a non-tilted state is defined as a Z-axis direction, the direction orthogonal to the Z-axis direction and extending from the center of the rotation toward a pole supporting the rotating frame 13 is defined as an X axis, and the direction orthogonal to the Z axis and the X axis is defined as a Y axis. In FIG. 1, for the sake of description, a plurality of the gantry apparatuses 10 are illustrated; however, the X-ray CT apparatus 1 includes one gantry apparatus 10 in the actual configuration.

The gantry apparatus 10 and the table apparatus 30 work on the basis of operations performed by an operator via the console apparatus 40 or operations performed by the operator via an operation section disposed at the gantry apparatus 10 or the table apparatus 30. The gantry apparatus 10, the table apparatus 30, and the console apparatus 40 are connected to each other in a wired or wireless manner so as to communicate with each other.

The gantry apparatus 10 includes an imaging system that radiates X-rays to a subject P and collects projection data from detection data on X-rays having passed through the subject P. The gantry apparatus 10 includes an X-ray tube 11, an X-ray detector 12, the rotating frame 13, an X-ray high-voltage apparatus 14, a control apparatus 15, a wedge 16, a collimator 17, and a data acquisition system (DAS) 18.

The X-ray tube 11 is a vacuum tube that generates X-rays by emitting thermoelectrons from a cathode (filament) toward an anode (target) through application of high voltage and supply of a filament current from the X-ray high-voltage apparatus 14. The X-rays are generated through collision of the thermoelectrons against the target. The X-rays generated at a tube focal spot in the X-ray tube 11 pass through an X-ray radiation window on the X-ray tube 11, are formed into, for example, a cone beam shape via the collimator 17, and are radiated to the subject P. An example of the X-ray tube 11 is a rotating anode X-ray tube that generates X-rays by emitting thermoelectrons toward a rotating anode.

The X-ray detector 12 detects X-rays radiated from the X-ray tube 11 and having passed through the subject P and outputs an electric signal corresponding to the dose of the X-rays to the DAS 18. The X-ray detector 12 includes, for example, a plurality of detecting element rows each including a plurality of detecting elements aligned in a channel direction along an arc with the focal spot of the X-ray tube 11 being its center. The X-ray detector 12 has, for example, a configuration in which the detecting element rows are aligned in a slice direction (row direction). Note that the X-ray CT apparatus 1 has various types including, for example, rotate/rotate-type (the third generation CT), in which the X-ray tube 11 and the X-ray detector 12 are integrated and rotate around the subject P, stationary/rotate-type (the fourth generation CT), in which a large number of X-ray detecting elements arrayed into a ring shape are fixed and only the X-ray tube 11 rotates around the subject P, and the like, and any type can be applied to this embodiment.

Furthermore, the X-ray detector 12 is, for example, an indirect conversion detector including a grid, a scintillator array, and a photosensor array. The scintillator array includes a plurality of scintillators each including a scintillator crystal outputting light having a quantity of photons corresponding to the dose of incident X-rays. The grid is disposed on a surface of the scintillator array on a side where X-rays are incident, and includes an X-ray blocking plate functioning to absorb scattered X-rays. Note that the grid may also be called a collimator (one-dimensional collimator or two-dimensional collimator). The photosensor array functions to perform conversion into an electric signal corresponding to the quantity of the light from the scintillator and includes a photosensor, such as a photomultiplier (PMT). Note that the X-ray detector 12 may be a direct conversion detector including a semiconductor device converting incident X-rays into an electric signal. Furthermore, the X-ray detector 12 may be a photon counting X-ray detector. The X-ray detector 12 is an example X-ray detection section.

The rotating frame 13 is an annular frame that supports the X-ray tube 11 and the X-ray detector 12 in opposed positions and rotates the X-ray tube 11 and the X-ray detector 12 using the control apparatus 15, which will be described later. Note that, in addition to supporting the X-ray tube 11 and the X-ray detector 12, the rotating frame 13 further includes and supports the X-ray high-voltage apparatus 14 and the DAS 18. The rotating frame 13 is rotatably supported by a non-rotating part (for example, a fixed frame, which is omitted in FIG. 1) of the gantry apparatus 10. A rotating mechanism includes, for example, a motor generating rotational driving force and a bearing transmitting the rotational driving force to the rotating frame 13 and rotating the rotating frame 13. The motor is disposed, for example, at the non-rotating part, the bearing is physically connected to the rotating frame 13 and the motor, and the rotating frame rotates in accordance with the torque of the motor.

The rotating frame 13 and the non-rotating part each include non-contact type or contact type communication circuitry that enables communications between a unit supported by the rotating frame 13 and the non-rotating part or an external apparatus of the gantry apparatus 10. For example, if optical communications are employed as non-contact type communications, detection data generated by the DAS 18 is sent from a sender disposed at the rotating frame 13 and including a light-emitting diode (LED) to a receiver disposed at the non-rotating part of the gantry apparatus 10 and including a photodiode through optical communications, and is then transferred by a sender from the non-rotating part to the console apparatus 40. Note that, other than the aforementioned type, non-contact type data transfer, such as a capacitive coupling type and a radio type, or contact type data transfer using a slip ring and an electrode brush may be employed as a communication type. The rotating frame 13 is an example rotation section.

The X-ray high-voltage apparatus 14 includes a high-voltage generation apparatus including electric circuitry, such as a transformer and a rectifier, and functioning to generate the high voltage to be applied to the X-ray tube 11 and the filament current to be supplied to the X-ray tube 11, and an X-ray control apparatus controlling output voltage corresponding to X-rays radiated by the X-ray tube 11. The high-voltage generation apparatus may be of a transformer type or of an inverter type. Note that the X-ray high-voltage apparatus 14 may be disposed at the rotating frame 13 or at the fixed frame of the gantry apparatus 10. The X-ray high-voltage apparatus 14 is an example X-ray high-voltage section.

The control apparatus 15 includes processing circuitry including a central processing unit (CPU) and the like, and a driving mechanism, such as a motor and an actuator. The control apparatus 15 functions to control workings of the gantry apparatus 10 and the table apparatus 30 in response to input signals from an input interface attached to the console apparatus 40 or the gantry apparatus 10. For example, in response to the input signals, the control apparatus 15 exercises control of rotation of the rotating frame 13, tilting of the gantry apparatus 10, and workings of the table apparatus 30 and a tabletop 33. Note that the tilting of the gantry apparatus 10 can be controlled by the control apparatus 15 rotating the rotating frame 13 about an axis parallel to the X-axis direction on the basis of tilt angle information input from the input interface attached to the gantry apparatus 10.

Note that the control apparatus 15 may be disposed at the gantry apparatus 10 or at the console apparatus 40. Note that the control apparatus 15 may be configured by incorporating a computer program directly into circuitry of a processor instead of storing the computer program in a memory. The control apparatus 15 is an example control section.

The wedge 16 is a filter for adjusting the dose of X-rays radiated from the X-ray tube 11. Specifically, the wedge 16 is a filter transmitting and attenuating X-rays radiated from the X-ray tube 11 so that the X-rays radiated from the X-ray tube 11 to the subject P have predetermined distribution. The wedge 16 is, for example, a wedge filter or a bow-tie filter, and is a filter made from aluminum processed so as to have a predetermined target angle and a predetermined thickness.

The collimator 17 is a lead plate or the like for limiting X-rays having passed through the wedge 16 to an X-ray radiation range, and a plurality of the lead plates are combined to form a slit. Note that the collimator 17 may also be called an X-ray limiter.

The DAS 18 includes an amplifier performing amplification processing to an electric signal output from each of the X-ray detecting elements of the X-ray detector 12 and an A/D converter converting the electric signal into a digital signal, and generates detection data. The detection data generated by the DAS 18 is transferred to processing circuitry 44. The detection data may also be called pure raw data. The DAS 18 is an example data collection section.

The table apparatus 30 is an apparatus on which the subject P to be scanned is placed and that moves the subject P, and includes a base 31, a table driving apparatus 32, the tabletop 33, and a supporting frame 34. The base 31 is a housing supporting the supporting frame 34 so that the supporting frame 34 can move in the vertical direction. The table driving apparatus 32 is a motor or an actuator moving the tabletop 33 on which the subject P is placed, in the long-axis direction of the tabletop 33. The tabletop 33 is disposed on the top surface of the supporting frame 34 and is a plate on which the subject P is placed. Note that the table driving apparatus 32 may move the supporting frame 34 in addition to the tabletop 33 in the long-axis direction of the tabletop 33.

The console apparatus 40 includes a memory 41, a display 42, the input interface 43, and the processing circuitry 44. Data communications among the memory 41, the display 42, the input interface 43, and the processing circuitry 44 are performed via a bus, for example. Note that the description is provided on the assumption that the console apparatus 40 is separate from the gantry apparatus 10; however, the console apparatus 40 or one or more constituents of the console apparatus 40 may be included in the gantry apparatus 10.

The memory 41 is realized by, for example, a random access memory (RAM), a semiconductor memory device, such as a flash memory, a hard disk, an optical disk, a solid state drive (SSD), or the like. The memory 41 stores therein, for example, the detection data output from the DAS 18, projection data generated by the preprocessing function 442, and a reconstructed image generated by reconstruction by a reconstruction processing function 443. The reconstructed image is, for example, three-dimensional CT image data (volume data), two-dimensional CT image data, or the like.

The memory 41 stores therein a learned model generating second medical data having lower noise than that of first medical data and having a super resolution compared with the first medical data on the basis of the first medical data. The first medical data and the second medical data correspond to, for example, projection data before reconstruction processing or reconstructed images. The first medical data relates to the subject imaged with the medical image capture apparatus. The learned model is a model achieving lower noise and higher resolution on input medical data and is generated by, for example, learning of a deep convolution neural network (hereinafter called a DCNN). The generation of the learned model (hereinafter called a noise-reduction super-resolution model) in this embodiment, that is, the learning of the DCNN is achieved by, for example, a learning apparatus, various types of server apparatuses, various types of modalities in which the medical data processing apparatus is installed, or the like. The generated noise-reduction super-resolution model is, for example, output from an apparatus that has learned the DCNN, and is stored in the memory 41. The generation of the noise-reduction super-resolution model will be described later.

The memory 41 stores therein a computer program relating to execution of the system control function 441, the preprocessing function 442, the reconstruction processing function 443, an image processing function 444, and a data processing function 445 executed by the processing circuitry 44. The memory 41 is an example storage section.

The display 42 displays various pieces of information. For example, the display 42 outputs a medical image (CT image) generated by the processing circuitry 44, a graphical user interface (GUI) for receiving various operations from the operator, and the like. As the display 42, for example, a liquid crystal display (LCD), a cathode ray tube (CRT) display, an organic electro luminescence display (OELD), a plasma display, or any other display can be used as appropriate. The display 42 may be disposed at the gantry apparatus 10. Furthermore, the display 42 may be of a desktop type or may be configured by a tablet terminal or the like capable of wirelessly communicating with the main body of the console apparatus 40. The display 42 is an example display section.

The input interface 43 receives various input operations from the operator, converts the received input operations into electric signals, and outputs the electric signals to the processing circuitry 44. For example, the input interface 43 receives, from the operator, collection conditions when projection data is collected, reconstruction conditions when CT image data is generated by reconstruction reconstructed, image processing conditions relating to post-processing to the CT image data, and the like. The post-processing may be performed by the console apparatus 40 or an external workstation. Alternatively, the post-processing may be simultaneously performed by both the console apparatus 40 and the workstation. Herein, the post-processing is defined as a concept indicating processing to an image generated by reconstruction with the reconstruction processing function 443. The post-processing includes, for example, a multi planar reconstruction (MPR) display of a reconstructed image, rendering of volume data, and the like. As the input interface 43, for example, a mouse, a keyboard, a track ball, a switch, a button, a joystick, a touch pad, a touch panel display, or the like can be used as appropriate.

Note that, in this embodiment, the input interface 43 is not limited to an object including a physical operation component, such as a mouse, a keyboard, a track ball, a switch, a button, a joystick, a touch pad, and a touch panel display. For example, electric signal processing circuitry receiving an electric signal corresponding to an input operation from an external input device provided separate from the apparatus and outputting the electric signal to the processing circuitry 44 is also included as an example of the input interface 43. The input interface 43 is an example input section. The input interface 43 may be disposed at the gantry apparatus 10. Furthermore, the input interface 43 may be configured by a tablet terminal or the like capable of wirelessly communicating with the main body of the console apparatus 40.

The processing circuitry 44, for example, controls overall workings of the X-ray CT apparatus 1 in accordance with the electric signals of the input operations output from the input interface 43. For example, the processing circuitry 44 includes, as hardware resources, a processor, such as a CPU, an MPU, and a graphics processing unit (GPU), and a memory, such as a ROM and a RAM. The processing circuitry 44 executes the system control function 441, the preprocessing function 442, the reconstruction processing function 443, the image processing function 444, and the data processing function 445 with the processor executing the computer program loaded into the memory of the processing circuitry 44. Note that the functions 441 to 445 are not limited to being realized by a single piece of processing circuitry. A plurality of independent processors may be combined to configure processing circuitry, and each of the processors may execute the computer program to realize the functions 441 to 445.

The system control function 441 controls each of the functions of the processing circuitry 44 on the basis of the input operation received from the operator via the input interface 43. Furthermore, the system control function 441 reads out a control computer program stored in the memory 41, loads the control computer program into the memory in the processing circuitry 44, and controls each of the constituents of the X-ray CT apparatus 1 in accordance with the loaded control computer program. The system control function 441 is an example control section.

The preprocessing function 442 generates projection data by subjecting the detection data output from the DAS 18 to preprocessing, such as logarithmic transformation processing, offset correction processing, inter-channel sensitivity correction processing, and beam hardening correction. The preprocessing function 442 is an example preprocessing section.

The reconstruction processing function 443 generates CT image data (medical data) by subjecting the projection data generated with the preprocessing function 442 to reconstruction processing using filtered back projection (FBP) or the like. The reconstruction processing includes various types of processing, such as various types of correction processing including scatter correction, beam hardening correction, and the like, and application of a reconstruction function under reconstruction conditions. Note that the reconstruction processing executed with the reconstruction processing function 443 is not limited to using FBP, and known processing, such as iterative reconstruction and a deep neural network outputting a reconstructed image by inputting projection data, may be used as appropriate. The reconstruction processing function 443 stores the CT image data generated by reconstruction into the memory 41. The reconstruction processing function 443 is an example reconstruction processing section.

The image processing function 444 converts the CT image data generated with the reconstruction processing function 443 into tomogram data on an arbitrary section or three-dimensional image data by a publicly known method on the basis of the input operation received from the operator via the input interface 43. Note that the reconstruction processing function 443 may directly generate the three-dimensional image data. The image processing function 444 is an example image processing section.

The data processing function 445 inputs the first medical data to the noise-reduction super-resolution model being the learned model to output the second medical data obtained by achieving lower noise and higher resolution on the first medical data from the noise-reduction super-resolution model. For example, the first medical data input to the noise-reduction super-resolution model is data before reconstruction or data before display processing, collected by imaging the subject with the medical image capture apparatus (for example, the X-ray CT apparatus 1 or the like). If the medical image capture apparatus generates an image while performing reconstruction, the first medical data is data before reconstruction, for example, k-space data, projection data, list-mode data, or the like. If the medical image capture apparatus is an X-ray diagnostic apparatus, the first medical data is data before display processing, for example, data output from an X-ray detector. That is, the first medical data corresponds to, for example, raw data. If the medical image capture apparatus is the X-ray CT apparatus 1, the data processing function 445 inputs first projection data collected by imaging the subject with the X-ray CT apparatus 1 to the noise-reduction super-resolution model and outputs second projection data obtained by achieving lower noise and higher resolution on the first projection data from the noise-reduction super-resolution model. At this time, the second projection data is reconstructed with the reconstruction processing function 443, and a reconstructed image is generated that has lower noise and higher resolution than those of a reconstructed image generated by reconstruction on the basis of the first projection data.

Furthermore, if, for example, the input to the noise-reduction super-resolution model (the first medical data) is a first reconstructed image generated by reconstruction on the basis of raw data collected by imaging the subject P with the medical image capture apparatus, the data processing function 445 inputs the first reconstructed image to the noise-reduction super-resolution model and outputs a second reconstructed image obtained by achieving lower noise and higher resolution on the first reconstructed image from the noise-reduction super-resolution model as the second medical data.

Processing for generating the second medical data from the first medical data (hereinafter called noise-reduction super-resolution processing) using the noise-reduction super-resolution model in the X-ray CT apparatus 1 configured as described above according to this embodiment will be described with reference to FIGS. 2 to 5.

Figure 2:
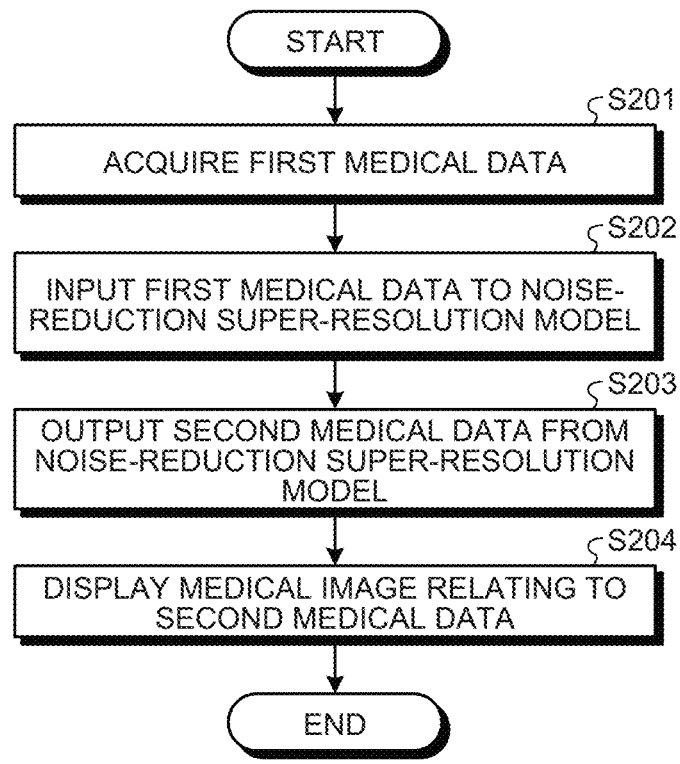
FIG. 2 is a flowchart illustrating an example procedure of noise-reduction super-resolution processing according to the embodiment.
Figure 3:
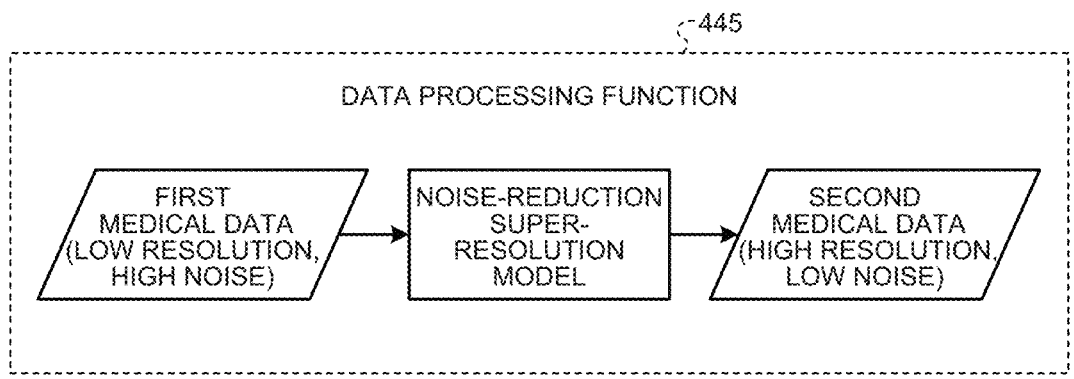
FIG. 3 is a schematic view illustrating the noise-reduction super-resolution processing using medical data according to the embodiment.
Figure 4:
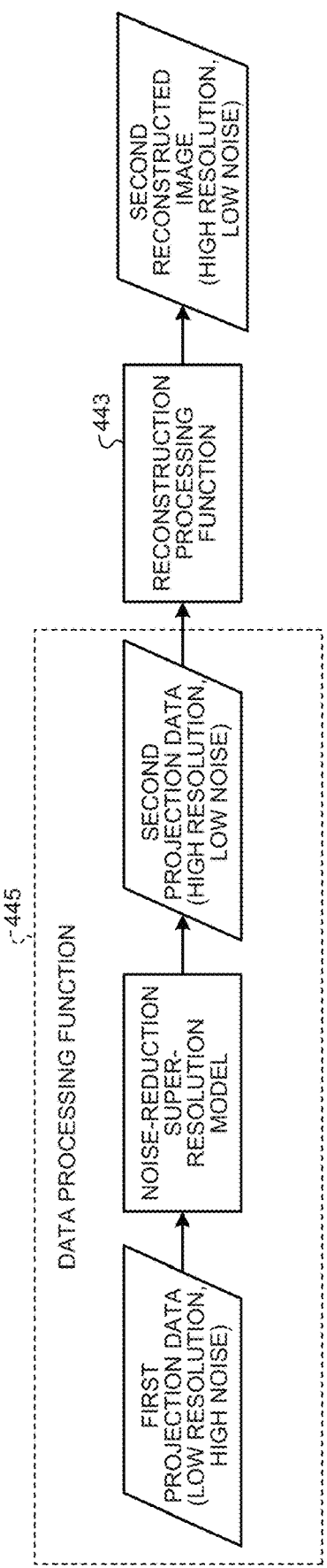
FIG. 4 is a schematic view illustrating the noise-reduction super-resolution processing using projection data as example medical data according to the embodiment.
Figure 5:
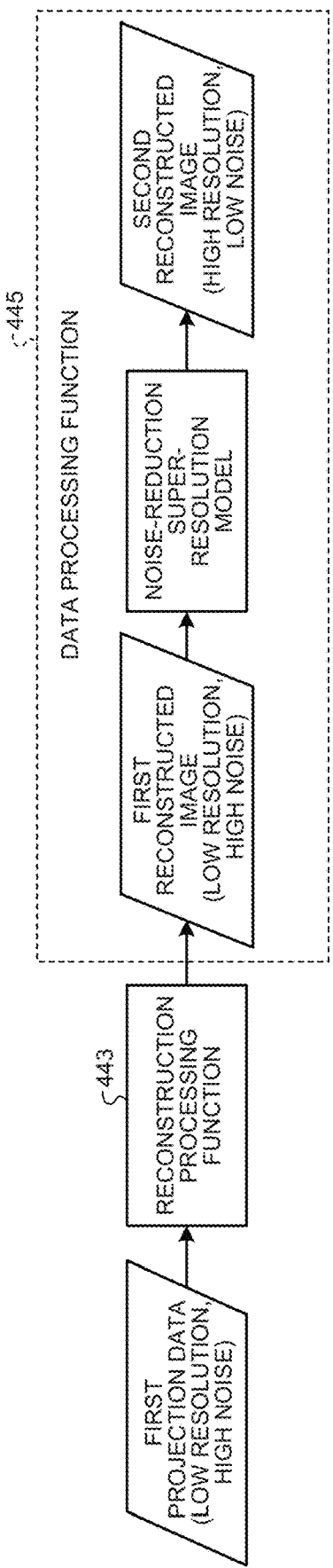
FIG. 5 is a schematic view illustrating the noise-reduction super-resolution processing using a reconstructed image as example medical data according to the embodiment.

FIG. 2 is a flowchart illustrating an example procedure of the noise-reduction super-resolution processing. FIG. 3 is a schematic view illustrating the noise-reduction super-resolution processing using medical data. FIG. 4 is a schematic view illustrating the noise-reduction super-resolution processing using projection data as example medical data. FIG. 5 is a schematic view illustrating the noise-reduction super-resolution processing using a reconstructed image as example medical data.

Noise-reduction Super-resolution Processing

Step S201

The processing circuitry 44 acquires the first medical data to be input to the noise-reduction super-resolution processing with the data processing function 445. If the first projection data is used as the first medical data, the data processing function 445 acquires, for example, the first projection data (low resolution and high noise) generated by scanning the subject P with a low dose from the preprocessing function 442. If the first reconstructed image is used as the first medical data, the data processing function 445 acquires, for example, the first reconstructed image (low resolution and high noise) generated by reconstruction on the basis of the first projection data (low resolution and high noise) generated by scanning the subject P with a low dose, from the reconstruction processing function 443.

Note that, if execution of the noise-reduction super-resolution processing is off, that is, if the learned model (noise-reduction super-resolution model) is not used, the reconstruction processing function 443 performs reconstruction to generate the first reconstructed image in a first matrix size on the basis of collected data (first projection data) collected by imaging the subject with the medical image capture apparatus, using a known deep-learned CNN (hereinafter called a noise-reduction model) that performs only noise-reduction processing, for example. The first matrix size equals to, for example, 512×512. If the noise-reduction super-resolution processing is on, that is, if the learned model (noise-reduction super-resolution model) is used, the reconstruction processing function 443 performs reconstruction to generate the first reconstructed image in a second matrix size greater than the first matrix size and coinciding with the matrix size of the second reconstructed image, on the basis of the collected data. The second matrix size equals to, for example, 1024×1024 or 2048×2048. At this time, the data processing function 445 inputs the first reconstructed image having the second matrix size to the learned model to output the second reconstructed image.

If the noise-reduction super-resolution processing is off at the time of scanning of the subject P, the first reconstructed image is generated in the first matrix size. Then, if the noise-reduction super-resolution processing is turned on in response to an instruction from the operator via the input interface 43, the data processing function 445 upsamples the first matrix size of the first reconstructed image to the second matrix size. That is, if the first matrix size is smaller than the second matrix size at the time of turning-on of the noise-reduction super-resolution processing, the data processing function 445 upsamples the first matrix size to the second matrix size. At this time, the data processing function 445 inputs the first reconstructed image having the second matrix size to the learned model and outputs the second reconstructed image. If the noise-reduction super-resolution processing is turned on after the first reconstructed image is generated in the first matrix size, the reconstruction processing function 443 may perform reconstruction again to generate the first reconstructed image in the second matrix size as the first medical data on the basis of the first projection data.

If the noise-reduction super-resolution processing is executed in the medical data processing apparatus, the data processing function 445 acquires data to be input to the noise-reduction super-resolution model in the noise-reduction super-resolution processing from the medical image capture apparatus or an image storing server, such as a picture archiving and communication system (hereinafter called a PACS).

Step S202

The data processing function 445 reads out the noise-reduction super-resolution model from the memory. The data processing function 445 inputs the first medical data to the noise-reduction super-resolution model. For example, if the first projection data is used as the first medical data, the data processing function 445 inputs the first projection data (low resolution and high noise) to the noise-reduction super-resolution model. If the first reconstructed image is used as the first medical data, the data processing function 445 inputs the first reconstructed image (low resolution and high noise) to the noise-reduction super-resolution model.

Step S203

The data processing function 445 outputs the second medical data from the noise-reduction super-resolution model. For example, if the first projection data is used as the first medical data, the data processing function 445 outputs the second projection data (high resolution and low noise) as the second medical data from the noise-reduction super-resolution model. At this time, the reconstruction processing function 443 performs reconstruction to generate the second reconstructed image (high resolution and low noise) being a medical image on the basis of the second projection data. If the first reconstructed image is used as the first medical data, the data processing function 445 outputs the second reconstructed image (high resolution and low noise) as the second medical data from the noise-reduction super-resolution model.

Step S204

The system control function 441 displays the second reconstructed image on the display 42. Note that the image processing function 444 may subject the second reconstructed image to various types of image processing in response to an instruction from the operator via the input interface 43. In this case, the system control function 441 displays the second reconstructed image subjected to the image processing on the display 42.

The X-ray CT apparatus 1 according to the embodiment described above inputs the first medical data to the learned model (noise-reduction super-resolution model) to output the second medical data, the first medical data relating to the subject being imaged with the medical image capture apparatus, the second medical data having lower noise than that of the first medical data and having a super resolution compared with the first medical data, the learned model generating the second medical data on the basis of the first medical data. For example, in the X-ray CT apparatus 1 according to the embodiment, the first medical data is collected data collected by imaging the subject with the medical image capture apparatus, and the medical image is generated on the basis of the second medical data.

For example, in the X-ray CT apparatus 1 according to the embodiment, the first medical data is the first reconstructed image generated by reconstruction on the basis of the collected data collected by imaging the subject with the medical image capture apparatus, and the second medical data is the second reconstructed image having lower noise than that of the first medical data and having a super resolution compared with the first reconstructed image. In this case, the X-ray CT apparatus 1 according to the embodiment performs reconstruction to generate the first reconstructed image in the first matrix size on the basis of the collected data collected by imaging the subject with the medical image capture apparatus if the learned model (noise-reduction super-resolution model) is not used, performs reconstruction to generate the first reconstructed image in the second matrix size greater than the first matrix size and coinciding with the matrix size of the second reconstructed image, on the basis of the collected data if the noise-reduction super-resolution model is used, and inputs the first reconstructed image having the second matrix size to the learned model to output the second reconstructed image.

Note that the X-ray CT apparatus 1 according to the embodiment may upsample the first matrix size of the first reconstructed image to the second matrix size greater than the first matrix size and coinciding with the matrix size of the second reconstructed image and may input the first reconstructed image having the second matrix size to the learned model to output the second reconstructed image.

In this way, the X-ray CT apparatus 1 according to this embodiment can simultaneously improve spatial resolution (super-resolution) and reduce noise of a medical image in medical data acquired with a low dose, with a single learned model (noise-reduction super-resolution model). Thus, the X-ray CT apparatus 1 according to this embodiment can improve visual recognition of an object, for example, anatomical characteristics, in a medical image and generate a medical image having improved image quality. From the above, the X-ray CT apparatus 1 according to this embodiment can reduce radiation exposure for the subject P and improve the throughput of image diagnosis of the subject P.

Figure 6:
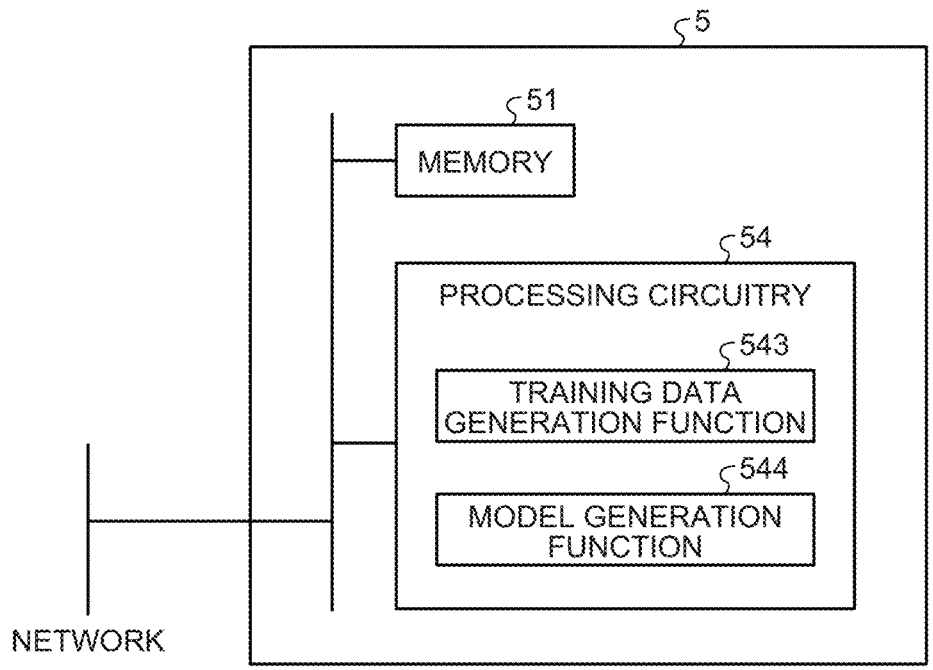
FIG. 6 is a diagram illustrating an example configuration of a learning apparatus relating to generation of a noise-reduction super-resolution model according to the embodiment.

The generation of the learned model (noise-reduction super-resolution model) used in this embodiment will be described below. FIG. 6 is a diagram illustrating an example configuration of a learning apparatus 5 relating to the generation of the noise-reduction super-resolution model. Note that the function to achieve learning of the DCNN with the learning apparatus 5 may be included in the medical image capture apparatus, such as the X-ray CT apparatus 1, or the medical data processing apparatus.

A memory 51 stores therein a pair of training data sets generated with a training data generation function 543 in processing circuitry 54. The memory 51 also stores therein original data being a source of generation of the training data. The original data is acquired from, for example, the medical image capture apparatus relating to data to be processed in the noise-reduction super-resolution model. The memory 51 also stores therein the DCNN to be learned and the learned model (noise-reduction super-resolution model). The memory 51 stores therein a computer program relating to execution of the training data generation function 543 and a model generation function 544 executed by the processing circuitry 54. The memory 51 is an example storage section of the learning apparatus 5. The memory 51 is realized by hardware or the like similar to those for the memory 41 described in the embodiment, and thus the description is omitted.

The processing circuitry 54 executes the training data generation function 543 and the model generation function 544 with a processor executing the computer program loaded into a memory of the processing circuitry 54. The processing circuitry 54 is realized by hardware or the like similar to those for the processing circuitry 44 described in the embodiment, and thus the description is omitted.

The training data generation function 543 acquires first training data that corresponds to the noise and the resolution of the second medical data. The training data generation function 543 adds noise to the first training data and lowers the resolution of the first training data to generate second training data that corresponds to the noise and the resolution of the collected data. For example, the training data generation function 543 runs a noise simulation to add noise to the first training data. Then, the training data generation function 543 runs a resolution simulation to lower the resolution of the first training data to which the noise is added. Note that the noise simulation and the resolution simulation on the first training data are not limited to being run in the order described above and may be run in the reverse order. Known techniques can be used for the noise simulation and the resolution simulation, and thus the description is omitted.

In this way, the training data generation function 543 acquires the second training data paired with the first training data. The first training data corresponds to teaching data (correct data) for the second training data. The training data generation function 543 stores the generated first training data and second training data in the memory 51. The training data generation function 543 repeats the processing described above to generate a plurality of training data sets each including the first training data and the second training data and stores the training data sets in the memory 51.

The model generation function 544 trains the deep convolution neural network using the first training data and the second training data to generate the learned model. That is, the model generation function 544 applies the first training data and the second training data to the DCNN to be learned to learn the DCNN and to generate the noise-reduction super-resolution model.

Figure 7:
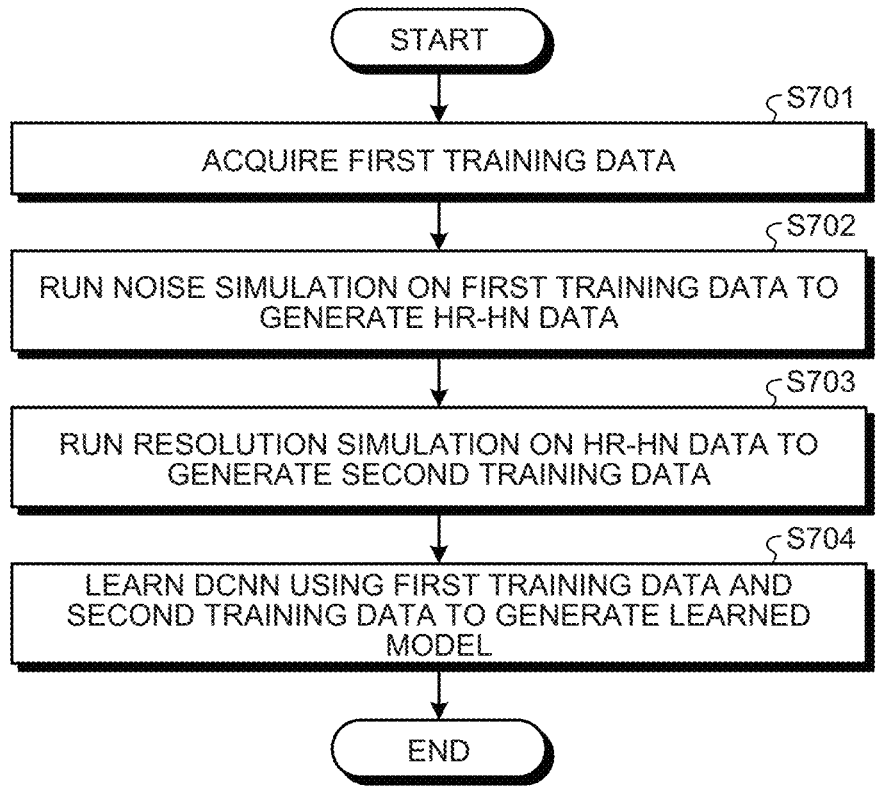
FIG. 7 is a flowchart illustrating an example procedure of processing for generating the noise-reduction super-resolution model by learning a DCNN using first training data and second training data, according to the embodiment.
Figures 8, 9:
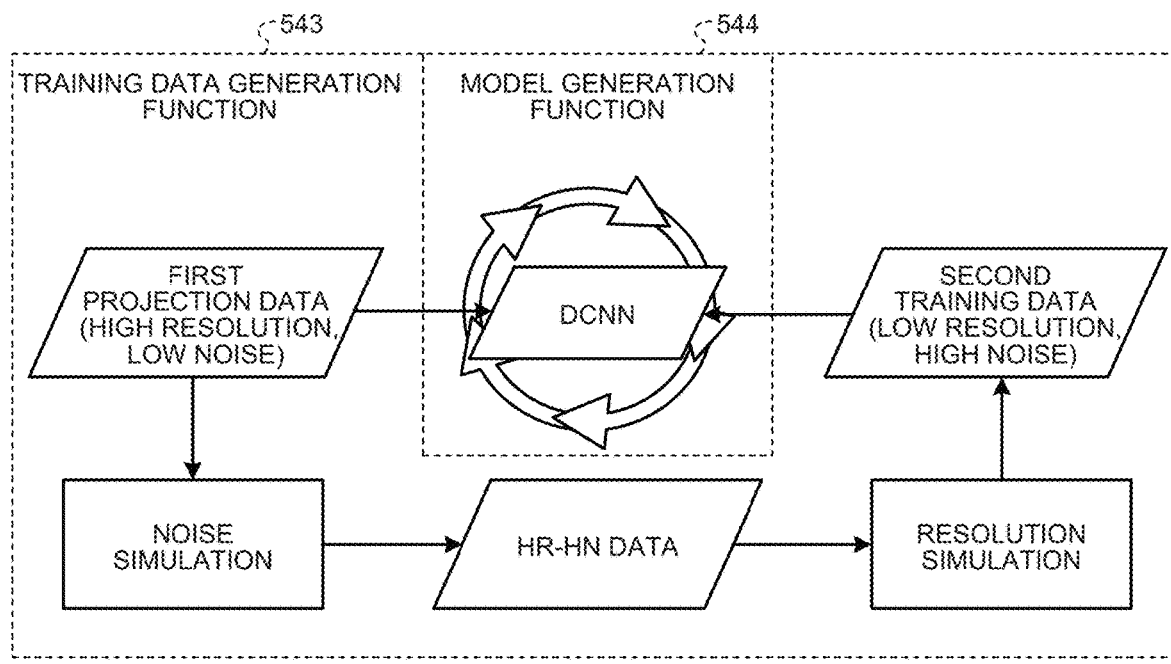
FIG. 8 is a schematic view illustrating model generation processing according to the embodiment.
FIG. 9 is a diagram illustrating example combinations of data to be subjected to a noise simulation and a resolution simulation according to the embodiment.

FIG. 7 is a flowchart illustrating an example procedure of processing for generating the noise-reduction super-resolution model (hereinafter called model generation processing) by learning the DCNN using the first training data and the second training data. FIG. 8 is a schematic view illustrating the model generation processing.

Model Generation Processing

Step S701

The training data generation function 543 acquires the first training data. The training data generation function 543 acquires data collected by image capturing or the like in a high-resolution mode of an image capture apparatus capable of collecting medical data having higher spatial resolution than that of data from a typical X-ray CT apparatus capable of imaging the subject P, such as a photon counting X-ray CT apparatus, an industrial micro CT apparatus, or a high-resolution X-ray CT apparatus including an X-ray detector (hereinafter called a high-resolution detector) having high spatial resolution, as the first training data from the image capture apparatus, for example. The high-resolution mode is for collecting data from each of a plurality of X-ray detecting elements of the high-resolution detector. Note that the collection of the first medical data in the high-resolution X-ray CT apparatus indicates collection of an average output from, for example, four X-ray detecting elements adjacent to each other among the X-ray detecting elements of the high-resolution detector. The training data generation function 543 stores the first training data in the memory 51.

Step S702

The training data generation function 543 runs the noise simulation on the first training data to generate data having high resolution (HR) and high noise (HN) (hereinafter called HR-HN data). The HR-HN data has a large quantity of noise in comparison with the first training data. In other words, the first training data corresponds to HR-LN data having low noise (LN) in comparison with the HR-HN data. The noise in the HR-HN data is at a level corresponding to, for example, the noise level of the first medical data.

Examples of the noise simulation include a method of adding noise based on a predetermined statistical model, typified by Gaussian noise, to the first training data, a method of adding noise based on a preliminarily learned noise model relating to the DAS 18 and/or the detection system, such as the X-ray detector, to the first training data, and the like. These are known methods, and thus the description is omitted. Note that the noise simulation is not limited to the aforementioned methods and may be run by other known methods.

Step S703

The training data generation function 543 runs the resolution simulation on the HR-HN data to generate data having low resolution (LR) and high noise (HN) (hereinafter called LR-HN data) as the second training data. The LR-HN data has low resolution in comparison with the first training data. The resolution of the LR-HN data corresponding to the second training data corresponds to, for example, the resolution of the first medical data.

Examples of the resolution simulation include a downsampling and/or upsampling method, such as bi-cubic, bi-linear, box, and neighbor, a method using a smoothing filter and/or a sharpening file, a method using a prior model, such as the point spread function (PSF), downsampling that performs imitation of a collected data system including collection of an average output from, for example, four X-ray detecting elements adjacent to each other among the X-ray detecting elements of the high-resolution detector of the high-resolution X-ray CT apparatus, and the like. These are known methods, and thus the description is omitted. Note that the resolution simulation is not limited to the aforementioned methods and may be run by other known methods.

In the procedure described above, the noise simulation and then the resolution simulation are run on the first training data; however, no such limitation is intended. For example, the training data generation function 543 may run the resolution simulation on the first training data to generate data having low resolution and low noise (hereinafter called LR-LN data) and then run the noise simulation on the LR-LN data to generate the second training data (LR-HN data).

The training data generation function 543 repeats steps S701 to S703 to generate a plurality of training data sets each including the first training data and the second training data. The training data generation function 543 stores the generated training data sets in the memory 51. Note that generation of the training data may be repeated after processing at step S704 in a subsequent stage until convergence of the learning of the DCNN.

Step S704

The model generation function 544 applies the first training data and the second training data to the DCNN to be learned to learn the DCNN. A known method, such as gradient descent, can be used for a process of learning the DCNN using the training data sets with the model generation function 544, and thus the description is omitted. With the convergence of the learning of the DCNN, the model generation function 544 stores the learned DCNN as the noise-reduction super-resolution model in the memory 51. The noise-reduction super-resolution model stored in the memory 51 is sent to, for example, the medical image capture apparatus relating to the first training data and/or the medical data processing apparatus executing the noise-reduction super-resolution model, as appropriate.

Example data to be subjected to the noise simulation and the resolution simulation will be described below. FIG. 9 is a diagram illustrating example combinations of data to be subjected to the noise simulation and the resolution simulation. The collected data in FIG. 9 differs depending on the medical image capture apparatus and the like. The collected data corresponds to, for example, projection data for the X-ray CT apparatus 1, an X-ray diagnostic apparatus, and the like, k-space data for an MRI apparatus, and sinogram data or list-mode data for a PET apparatus. To make the description specific, the following description is provided on the assumption that the collected data is projection data. The image data in FIG. 9 is, for example, a reconstructed image.

Figure 10:
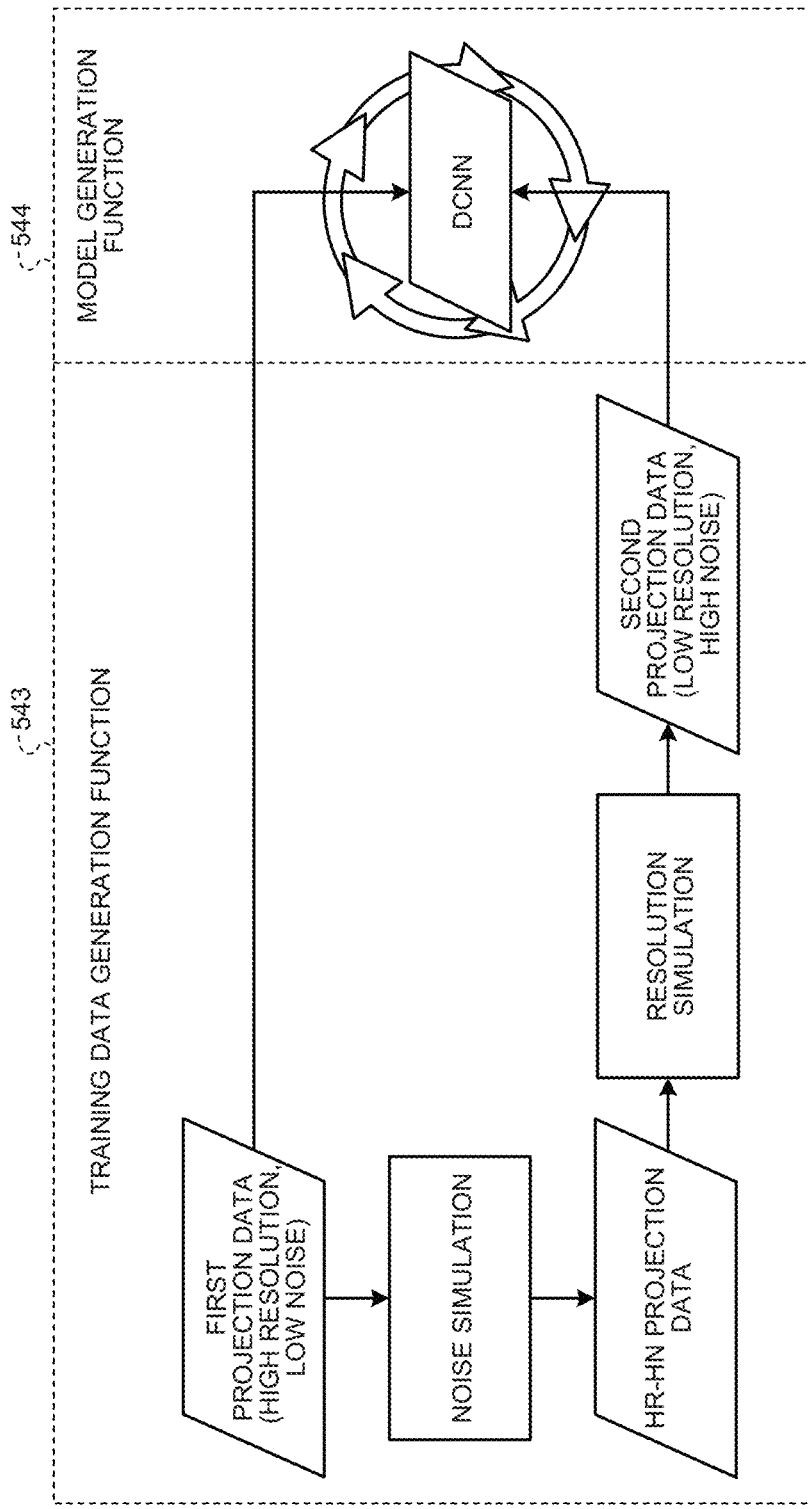
FIG. 10 is a schematic view illustrating the model generation processing in a case where the input to and output from the noise-reduction super-resolution model being a learned model are projection data, with the example (a) in FIG. 9 in the embodiment.
Figure 11:
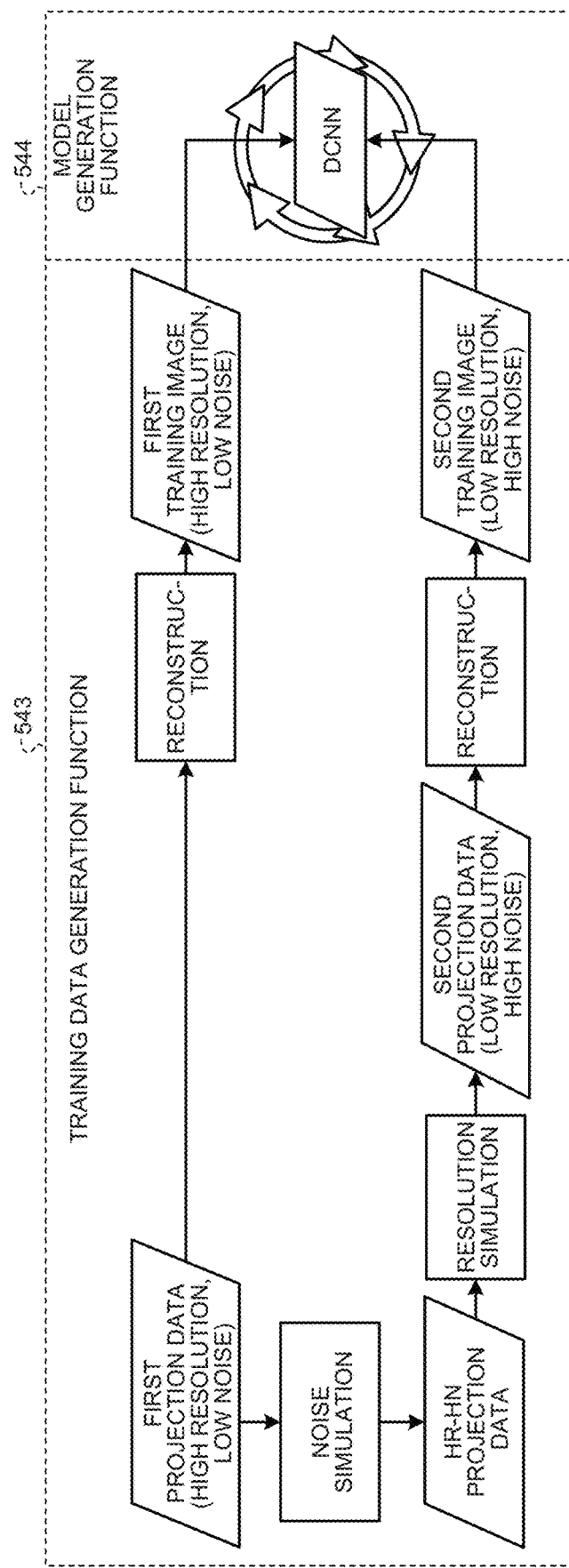
FIG. 11 is a schematic view illustrating the model generation processing in a case where the input to and output from the noise-reduction super-resolution model being the learned model are image data (reconstructed images), with the example (a) in FIG. 9 in the embodiment.

The example (a) in FIG. 9 will be described below with reference to FIGS. 10 and 11. FIG. 10 is a schematic view illustrating the model generation processing in a case where the input to and output from the noise-reduction super-resolution model being the learned model are projection data, with the example (a) in FIG. 9. FIG. 11 is a schematic view illustrating the model generation processing in a case where the input to and output from the noise-reduction super-resolution model being the learned model are image data (reconstructed images), with the example (a) in FIG. 9. As illustrated in FIGS. 10 and 11, data to be subjected to the noise simulation and the resolution simulation is collected data.

The training data generation function 543 acquires first projection data. The first projection data corresponds to first pre-reconstruction data before reconstruction that corresponds to the noise and the resolution of the second reconstructed image. As illustrated in FIGS. 10 and 11, the first projection data is projection data having high resolution and low noise equivalent to those of the second medical data. As illustrated in FIGS. 10 and 11, the training data generation function 543 runs the noise simulation on the first projection data to generate high-resolution high-noise (HR-HN) projection data. The training data generation function 543 then runs the resolution simulation on the HR-HN projection data to generate second projection data having low resolution and high noise. The second projection data corresponds to second pre-reconstruction data before reconstruction that corresponds to the noise and the resolution of the first reconstructed image.

Note that the training data generation function 543 may run the resolution simulation on the first projection data to generate low-resolution low-noise (LR-LN) projection data. In this case, the training data generation function 543 runs the noise simulation on the LR-LN projection data to generate the second projection data having low resolution and high noise.

In FIG. 10, the model generation function 544 learns the DCNN using the first projection data and the second projection data to generate the noise-reduction super-resolution model. In this case, the first projection data corresponds to the first training data, and the second projection data corresponds to the second training data. Furthermore, the first projection data corresponds to teaching data in the learning of the DCNN. In FIG. 10, the learning of the DCNN is performed in the domain of the projection data (collected data).

In FIG. 11, the training data generation function 543 reconstructs the first projection data to generate a first training image having high resolution and low noise. The training data generation function 543 also reconstructs the second projection data to generate a second training image having low resolution and high noise. The second projection data corresponds to the second pre-reconstruction data before reconstruction generated by adding noise to the first pre-reconstruction data and lowering the resolution of the first pre-reconstruction data. Furthermore, the second pre-reconstruction data before reconstruction corresponds to the noise and the resolution of the first reconstructed image. The first training image corresponds to the first training data, and the second training image corresponds to the second training data. Furthermore, the first training image corresponds to teaching data in the learning of the DCNN.

In FIG. 11, the model generation function 544 learns the DCNN using the first training image and the second training image to generate the noise-reduction super-resolution model. Unlike the case in FIG. 10, the learning of the DCNN is performed in the image domain in the case in FIG. 11.

Figure 12:
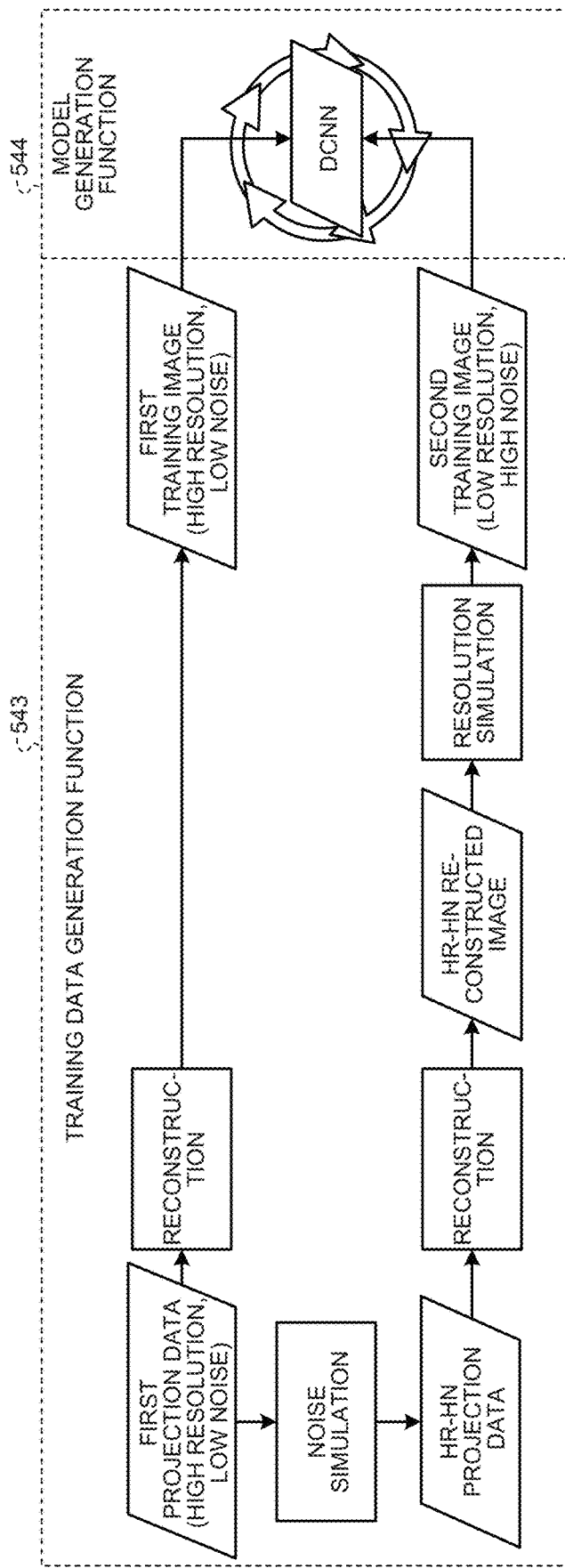
FIG. 12 is a schematic view illustrating the model generation processing with the example (b) in FIG. 9 in the embodiment.

The example (b) in FIG. 9 will be described below with reference to FIG. 12. FIG. 12 is a schematic view illustrating the model generation processing with the example (b) in FIG. 9. As illustrated in the example (b) in FIG. 9 and FIG. 12, data to be subjected to the noise simulation is collected data, and data to be subjected to the resolution simulation is image data.

The training data generation function 543 acquires first projection data. As illustrated in FIG. 12, the first projection data is projection data having high resolution and low noise equivalent to those of the second medical data. As illustrated in FIG. 12, the training data generation function 543 reconstructs the first projection data to generate a first training image. The training data generation function 543 runs the noise simulation on the first projection data to generate HR-HN projection data. The training data generation function 543 then reconstructs the HR-HN projection data to generate a HR-HN reconstructed image. That is, the training data generation function 543 adds noise to the first pre-reconstruction data and reconstructs the first pre-reconstruction data to generate a noise-added image (HR-HN reconstructed image) that corresponds to the noise of the first reconstructed image.

The training data generation function 543 runs the resolution simulation on the HR-HN reconstructed image to generate a second training image having low resolution and high noise. That is, the training data generation function 543 lowers the resolution of the noise-added image to generate the second training image that corresponds to the noise and the resolution of the first reconstructed image. Similar to the case in FIG. 11, the model generation function 544 learns the DCNN using the first training image and the second training image to generate the noise-reduction super-resolution model.

Figure 13:
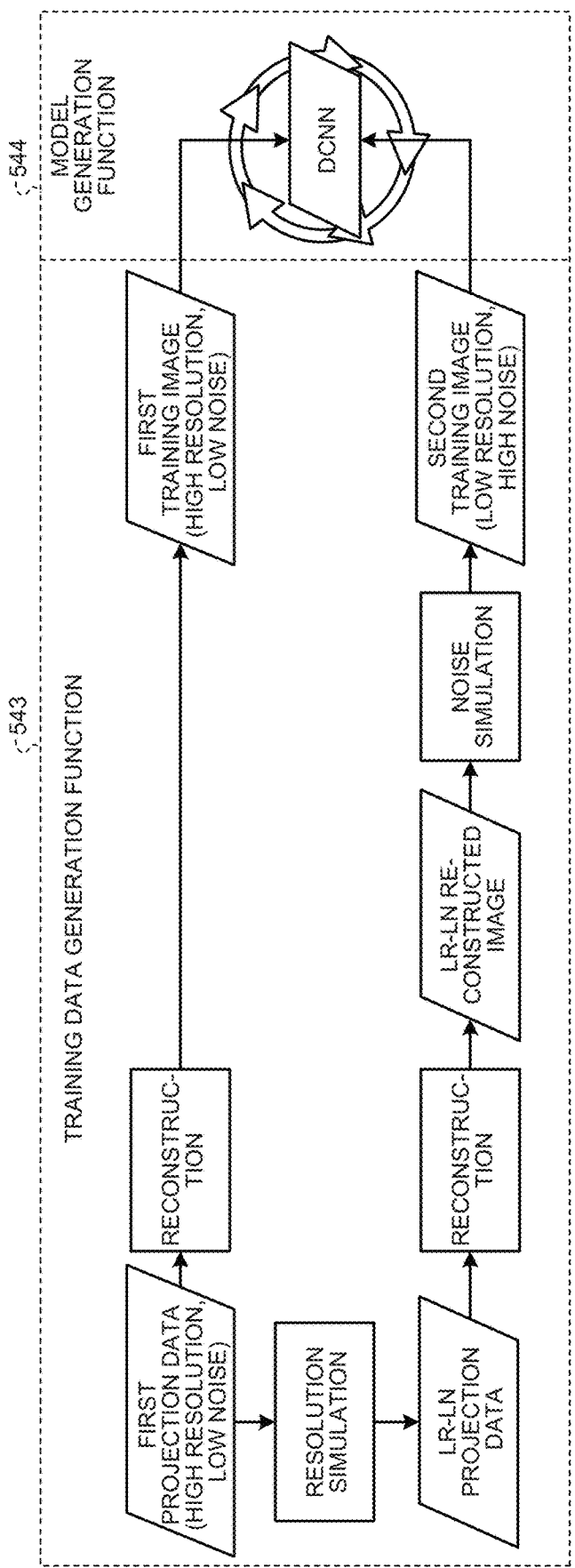
FIG. 13 is a schematic view illustrating the model generation processing with the example (c) in FIG. 9 in the embodiment.

The example (c) in FIG. 9 will be described below with reference to FIG. 13. FIG. 13 is a schematic view illustrating the model generation processing with the example (c) in FIG. 9. As illustrated in the example (c) in FIG. 9 and FIG. 13, data to be subjected to the resolution simulation is collected data, and data to be subjected to the noise simulation is image data.

The training data generation function 543 acquires first projection data. As illustrated in FIG. 13, the first projection data is projection data having high resolution and low noise equivalent to those of the second medical data. As illustrated in FIG. 13, the training data generation function 543 reconstructs the first projection data to generate a first training image. The training data generation function 543 runs the resolution simulation on the first projection data to generate LR-LN projection data. The training data generation function 543 then reconstructs the LR-LN projection data to generate a LR-LN reconstructed image. That is, the training data generation function 543 lowers the resolution of the first pre-reconstruction data and reconstructs the first pre-reconstruction data to generate a low-resolution image (LR-LN reconstructed image) that corresponds to the resolution of the first reconstructed image.

The training data generation function 543 runs the noise simulation on the LR-LN reconstructed image to generate a second training image having low resolution and high noise. That is, the training data generation function 543 adds noise to the low-resolution image to generate the second training image that corresponds to the noise and the resolution of the first reconstructed image. Similar to the cases in FIGS. 11 and 12, as illustrated in FIG. 13, the model generation function 544 learns the DCNN using the first training image and the second training image to generate the noise-reduction super-resolution model.

Figure 14:
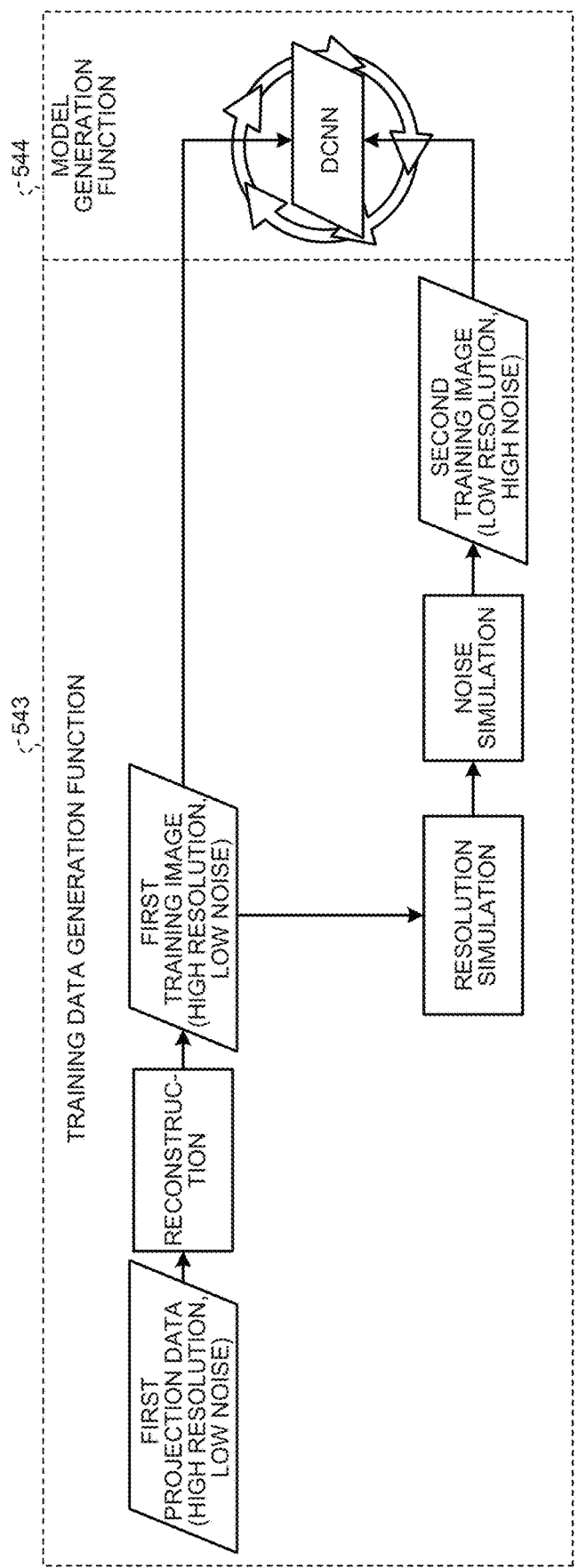
FIG. 14 is a schematic view illustrating the model generation processing with the example (d) in FIG. 9 in the embodiment.

The example (d) in FIG. 9 will be described below with reference to FIG. 14. FIG. 14 is a schematic view illustrating the model generation processing with the example (d) in FIG. 9. As illustrated in the example (d) in FIG. 9 and FIG. 14, data to be subjected to the noise simulation and the resolution simulation is image data.

The training data generation function 543 acquires first projection data. As illustrated in FIG. 14, the first projection data is projection data having high resolution and low noise equivalent to those of the second medical data. As illustrated in FIG. 14, the training data generation function 543 reconstructs the first projection data to generate a first training image. The training data generation function 543 successively runs the resolution simulation and the noise simulation on the first training image to generate a second training image having low resolution and high noise. That is, the training data generation function 543 lowers the resolution of the first training image and adds noise to the first training image to generate the second training image that corresponds to the noise and the resolution of the first reconstructed image.

Note that, in FIG. 14, the resolution simulation and then the noise simulation are run in the procedure; however, no such limitation is intended. That is, the training data generation function 543 may run the noise simulation and then the resolution simulation on the first training image to generate the second training image. Similar to the cases in FIGS. 11 to 13, as illustrated in FIG. 14, the model generation function 544 learns the DCNN using the first training image and the second training image to generate the noise-reduction super-resolution model.

The model generation method achieved by the learning apparatus 5 according to the embodiment described above includes: adding noise to the first training data and lowering the resolution of the first training data to generate the second training data that corresponds to the noise and the resolution of the collected data, the first training data corresponding to the noise and the resolution of the second medical data; and training the deep convolution neural network using the first training data and the second training data to generate the learned model. For example, this model generation method may include: performing reconstruction to generate the first training image on the basis of the first pre-reconstruction data before reconstruction that corresponds to the noise and the resolution of the second reconstructed image; adding noise to the first pre-reconstruction data and lowering the resolution of the first pre-reconstruction data to generate the second pre-reconstruction data before reconstruction that corresponds to the noise and the resolution of the first reconstructed image; performing reconstruction to generate the second training image on the basis of the second pre-reconstruction data; and training the deep convolution neural network using the first training image and the second training image to generate the learned model.

The model generation method achieved by the learning apparatus 5 may include: performing reconstruction to generate the first training image on the basis of the first pre-reconstruction data before reconstruction that corresponds to the noise and the resolution of the second reconstructed image; adding noise to the first pre-reconstruction data and reconstructing the first pre-reconstruction data to generate the noise-added image that corresponds to the noise of the first reconstructed image; lowering the resolution of the noise-added image to generate the second training image that corresponds to the noise and the resolution of the first reconstructed image; and training the deep convolution neural network using the first training image and the second training image to generate the learned model.

The model generation method achieved by the learning apparatus 5 may include: lowering the resolution of the first pre-reconstruction data and reconstructing the first pre-reconstruction data to generate the low-resolution image that corresponds to the resolution of the first reconstructed image; adding noise to the low-resolution image to generate the second training image that corresponds to the noise and the resolution of the first reconstructed image; and training the deep convolution neural network using the first training image and the second training image to generate the learned model.

The model generation method achieved by the learning apparatus 5 includes: performing reconstruction to generate the first training image on the basis of the first pre-reconstruction data before reconstruction that corresponds to the noise and the resolution of the second reconstructed image; adding noise to the first training image and lowering the resolution of the first training image to generate the second training image that corresponds to the noise and the resolution of the first reconstructed image; and training the deep convolution neural network using the first training image and the second training image to generate the learned model.

From the above, the model generation method achieved by the learning apparatus 5 can generate a single learned model (noise-reduction super-resolution model) that can simultaneously improve spatial resolution (super-resolution) and reduce noise of a medical image in medical data acquired with a low dose. By this model generation method, irrespective of the type of training data, such as collected data and image data, the noise-reduction super-resolution model can be generated. From the above, the model generation method can improve visual recognition of an object, for example, anatomical characteristics, in a medical image and generate a learned model capable of generating a medical image having improved image quality.

Modification

Note that, as a modification of this embodiment, the learning apparatus 5 may train a DCNN as a learned model achieving super-resolution (hereinafter called a super-resolution model). In this case, the super-resolution model has no noise reduction action. In this case, the noise simulation in FIGS. 8 to 14 is not needed. In this modification, the model generation function 544 performs learning in the image domain as illustrated in FIGS. 11 to 14. That is, the super-resolution model is performed in the image domain in the medical data processing apparatus.

If the super-resolution model of this modification is applied, the reconstruction processing function 443 generates, for example, a reconstructed image having a matrix size of 1024×1024. The data processing function 445 inputs the reconstructed image having a matrix size of 1024×1024 to the super-resolution model to generate a super-resolution image of the reconstructed image. If the super-resolution model of this modification is not applied, the reconstruction processing function 443 generates, for example, a reconstructed image having a matrix size of 512×512. In this case, the data processing function 445 may input the reconstructed image having a matrix size of 512×512 to the noise-reduction model to generate a noise-reduced image of the reconstructed image.

To realize the technical idea of the embodiment with the medical data processing apparatus, the medical data processing apparatus includes the processing circuitry 44 inputting the first medical data to the learned model (noise-reduction super-resolution model) to output the second medical data, the first medical data relating to the subject imaged with the medical image capture apparatus, the second medical data having lower noise than that of the first medical data and having a super resolution compared with the first medical data, and the learned model generating the second medical data on the basis of the first medical data. The procedure and effect of the noise-reduction super-resolution processing executed by the medical data processing apparatus are similar to those in the embodiment, and thus the description is omitted.

To realize the technical idea of this embodiment with the medical data processing program, the medical data processing program causes a computer to execute inputting the first medical data to the learned model (noise-reduction super-resolution model) to output the second medical data, the first medical data relating to the subject imaged with the medical image capture apparatus, the second medical data having lower noise than that of the first medical data and having a super resolution compared with the first medical data, and the learned model generating the second medical data on the basis of the first medical data. The medical data processing program is stored in, for example, the computer-readable non-transitory storage medium.

For example, the noise-reduction super-resolution processing can also be executed by installing the medical data processing program from the non-transitory storage medium to various types of server apparatuses (processing apparatuses) for medical data processing and by loading the medical data processing program into a memory. In this case, the computer program that can cause a computer to execute the method can be stored in a storage medium, such as a magnetic disk (for example, a hard disk), an optical disk (for example, a CD-ROM, a DVD, or the like), and a semiconductor memory, and can be distributed. The processing procedure and effect of the medical data processing program are similar to those in the embodiment, and thus the description is omitted.

One of the objectives of the present disclosure includes a method for generating a model for obtaining computed tomography (CT) images that approximate wide-coverage UHR CT images. In one embodiment, the method for generating the model for obtaining CT images that approximate wide-coverage UHR CT images enables wide coverage ultra-high resolution images without requiring a wide-coverage UHR CT detector system. The method includes obtaining a first set of projection data acquired from scanning an object to be imaged with a CT imaging modality. The first set of projection data may include ultra-high resolution (UHR) CT data that is obtained from an imaging modality such as a UHR CT scanner. The method may continue by applying resolution-lowering processing of the first set of projection data to obtain a second set of projection data. The second set of projection data may include normal resolution (NR) CT data. The method continues by training a machine-learning model with a first CT image reconstructed based on the first set of projection data and a second CT image reconstructed based on the second set of projection data to obtain a model for generating CT images that approximate wide-coverage UHR CT images. The machine-learning model may be a deep convolutional neural network (DCNN) model. The first CT image may include a UHR CT image and the second CT image may include a normal resolution (NR) CT image.

In one or more embodiments of the present disclosure, a medical image processing apparatus is provided that includes one or more memories storing instructions and one or more processors executing instructions to generate a machine-learning model enabled CT image. The medical image processing apparatus includes receiving a set of projection data acquired in scanning an object to be examined with a medical imaging modality. The set of projected data may include wide-coverage CT detector data that is obtained from a wide-coverage CT detector that is used as the imaging modality for scanning an object. Then the medical image processing apparatus reconstructs a CT image of the object based on the set of projection data. The reconstructed CT image may include a wide-coverage CT detector image. The medical image processing apparatus designates a model from a first trained machine-learning model for noise reduction and a second trained machine-learning model for super-resolution, both of which may be stored in the one or more memories. The designated model may be a deep convolutional neural network (DCNN) training model for noise reduction or a DCNN training model for super-resolution. The medical image processing apparatus is configured to apply the designated model to the reconstructed CT image to obtain a processed image. The reconstructed CT image may include a wide-coverage CT detector image. After applying the DCNN trained model to the wide-coverage CT detector image, a processed image is generated. The processed image may include a DCNN enabled image that approximates or resembles a wide-coverage UHR CT image.

One or more embodiments of the present disclosure may be used in clinical application(s), such as, but not limited to, medical imaging and research.

According to other aspects of the present disclosure, one or more additional devices, one or more systems, one or more methods and one or more storage mediums using a deep convolution neural network for generating a CT image approximating a wide-coverage ultra-high resolution CT image are discussed herein. Further features of the present disclosure will in part be understandable and will in part be apparent from the following description and with reference to the attached drawings.

For the purposes of illustrating various aspects of the disclosure, wherein like numerals indicate like elements, there are shown in the drawings simplified forms that may be employed, it being understood, however, that the disclosure is not limited by or to the precise arrangements and instrumentalities shown. To assist those of ordinary skill in the relevant art in making and using the subject matter hereof, reference is made to the appended drawings and figures.

The term ultra-high resolution (UHR) CT detector system may be used interchangeably with the terms UHR CT detector scanner or UHR CT detector imaging throughout the present disclosure. The term wide-coverage CT detector system may be used interchangeably with wide-coverage CT detector scanner or wide-coverage CT detector imaging throughout the present disclosure. In the exemplary embodiments described below, the term 'ultra-high resolution' or UHR and 'normal resolution' or NR does not refer to a specific resolution. 'UHR' is defined as having a spatial resolution that is relatively higher than NR, and 'NR' has a spatial resolution that is lower than UHR. Also, in the exemplary embodiments described below, the term 'wide-coverage' or 'wider-coverage' does not refer to a specific coverage or a specific size of detector. 'Wide-coverage' means that its coverage is larger than normal-coverage detectors. The term 'Low-Dose (LD)' or 'High-Dose (HD)' does not refer to a specific dose. 'Low-Dose (LD)' means that the dose is relatively lower than 'High-Dose (HD)', and 'High-Dose (HD)' means that the dose is relatively higher than 'Low-Dose (LD)'.

The present disclosure involves using a UHR CT detector system to formulate a super-resolution training model to obtain an optimized trained deep convolution neural network (DCNN) to be applied to a wide-coverage CT detector image obtained from a wide-coverage CT detector system. In a clinical setting, super-resolution training enables a wide-coverage CT detector system to obtain a DCNN enabled CT image that resembles or approximates a wide-coverage UHR CT image by applying an optimized trained DCNN. Thus, a UHR CT detector system is used to train the machine-learning model but is not required in a clinical setting. The advantage being that in the clinical setting, only a wide-coverage CT system is required. Thus, the present disclosure allows for obtaining CT images that closely resemble wide-coverage UHR CT images without the use of a wide-coverage UHR CT detector system. This is especially advantageous when, for example, a wide-coverage UHR CT detector system is not available.

Turning now to the details of the figures, FIG. 15A shows an overview of the process disclosed in the exemplary embodiments. A wide-coverage CT data 101 and UHR CT data 201 are used to obtain a wide-coverage UHR CT image 301. The UHR CT data 201 is a set of projection data which has not yet been subjected to reconstruction processing. The wide-coverage CT data 101 may be acquired from a wide-coverage CT detector system 100, and the UHR CT data 201 may be acquired from a UHR CT detector system 200. The UHR CT data 201 is used in a training phase in accordance with one or more aspects of the present disclosure to obtain a trained model to be applied to a lower-resolution CT image. According to the present disclosure, the UHR CT data 201 used in the training phase is not required in a clinical setting. In other words, the UHR CT detector system 200 may be offsite in a remote location and is used in a training application for a machine-learning model. The wide-coverage CT detector system 100 is used in a clinical setting to obtain diagnostic imaging of a patient and the wide-coverage CT data 101 is acquired and is subjected to super-resolution processing during an inference phase in accordance with one or more aspects of the present disclosure. During the inference phase, the wide-coverage CT detector system 100 uses the trained machine-learning model obtained in the training phase to generate a CT image that approximates or resembles an image that can be acquired in a wide-coverage UHR CT detector system, without requiring a wide-coverage UHR CT detector system, in accordance with an aspect of the present disclosure. The image-domain super-resolution (SR) is described below with reference to FIGS. 16, 17, 20, 21, 22, 23, 24 and 27, and the data (projection)-domain SR is described below with reference to FIG. 28.

In one of the exemplary embodiments, both the wide-coverage CT detector system 100 and the UHR CT detector system 200 may include a console or computer that is in communication with a network as will be further described below with reference to FIGS. 25 and 26. Alternatively, the wide-coverage CT detector system 100 and the UHR CT detector system 200 may be connected to a CPU associated with a computer (shown in FIGS. 25 and 26) via a network. Thus, the detector systems (100, 200) may either be connected to a computer or console via a network or may include a computer within or both in accordance with the present disclosure. An exemplary configuration of the CT system is described below with reference to FIG. 29.

Figure 15B:
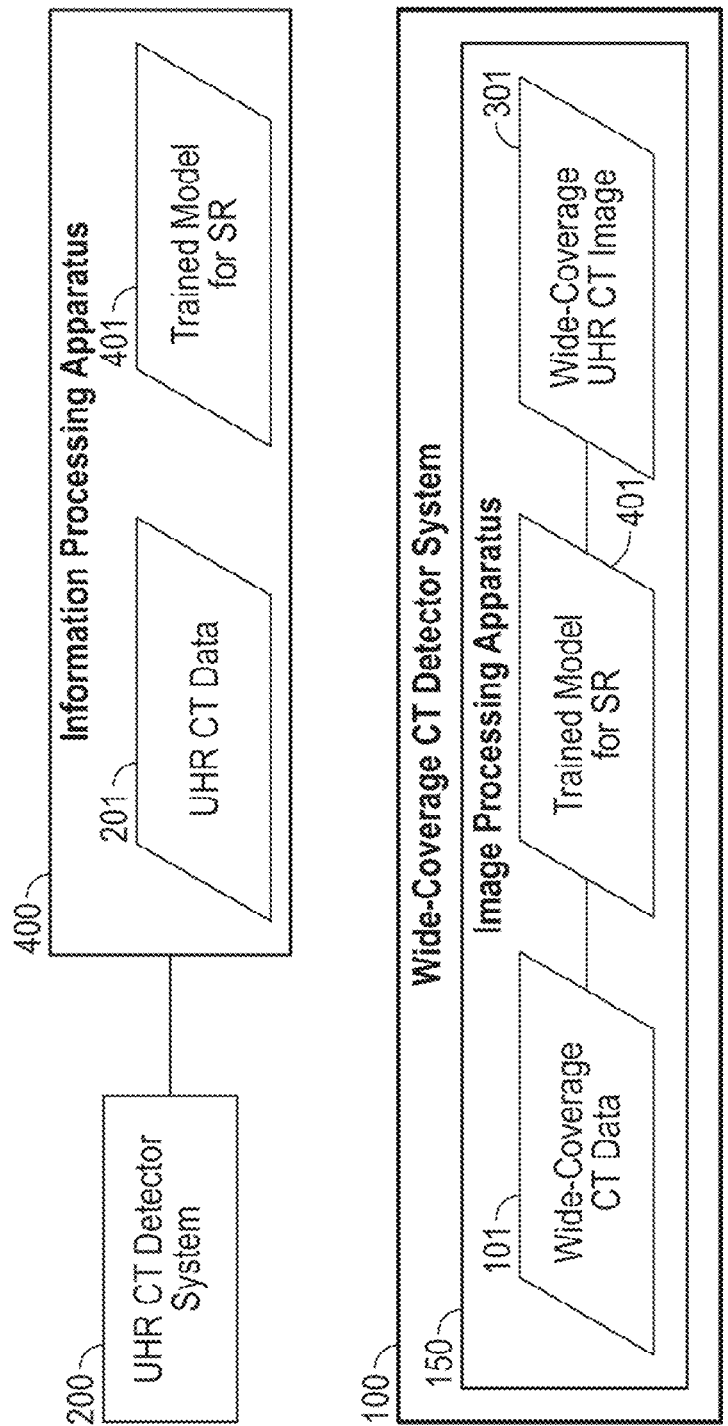
FIG. 15B is a diagram showing an overview of hardware systems used in a training phase and in an inference phase of machine-learning model in accordance with one or more aspects of the present disclosure.

Hardware systems used in a training phase and in an inference phase of machine-learning model are described with reference to FIG. 15B. Training of the machine-learning model is performed in an information processing apparatus 400 which has the same components illustrated in FIG. 26 as components of the computer 1200'. The information processing apparatus 400 receives UHR CT data 201 from the UHR CT detector system 200 via the network I/F 1212 and the CPU or the GPU performs training of a machine-learning model based on the UHR CT data 201. The details of the training process are described later. After the training is completed the information processing apparatus 400 obtains a trained model for super-resolution (SR) 401, which is exported to an image processing apparatus 150 or the console describe above, in the wide-coverage CT detector system 100. The image processing apparatus 150 or the CPU of the apparatus 150 stores the trained model 401 in the memory. The CPU or GPU of the image processing apparatus 150 generates the wide-coverage UHR CT image 301 based on the wide-coverage CT data 101 acquired in the wide-coverage CT detector system 100 and the trained model 401 applied to a CT image or a CT (projection) data.

In another embodiment, instead of applying to a wide-coverage CT image, the above-mentioned trained model is applied to a CT image acquired in a normal-coverage CT detector system, to generate a CT image with improved spatial resolution.

Figure 16:
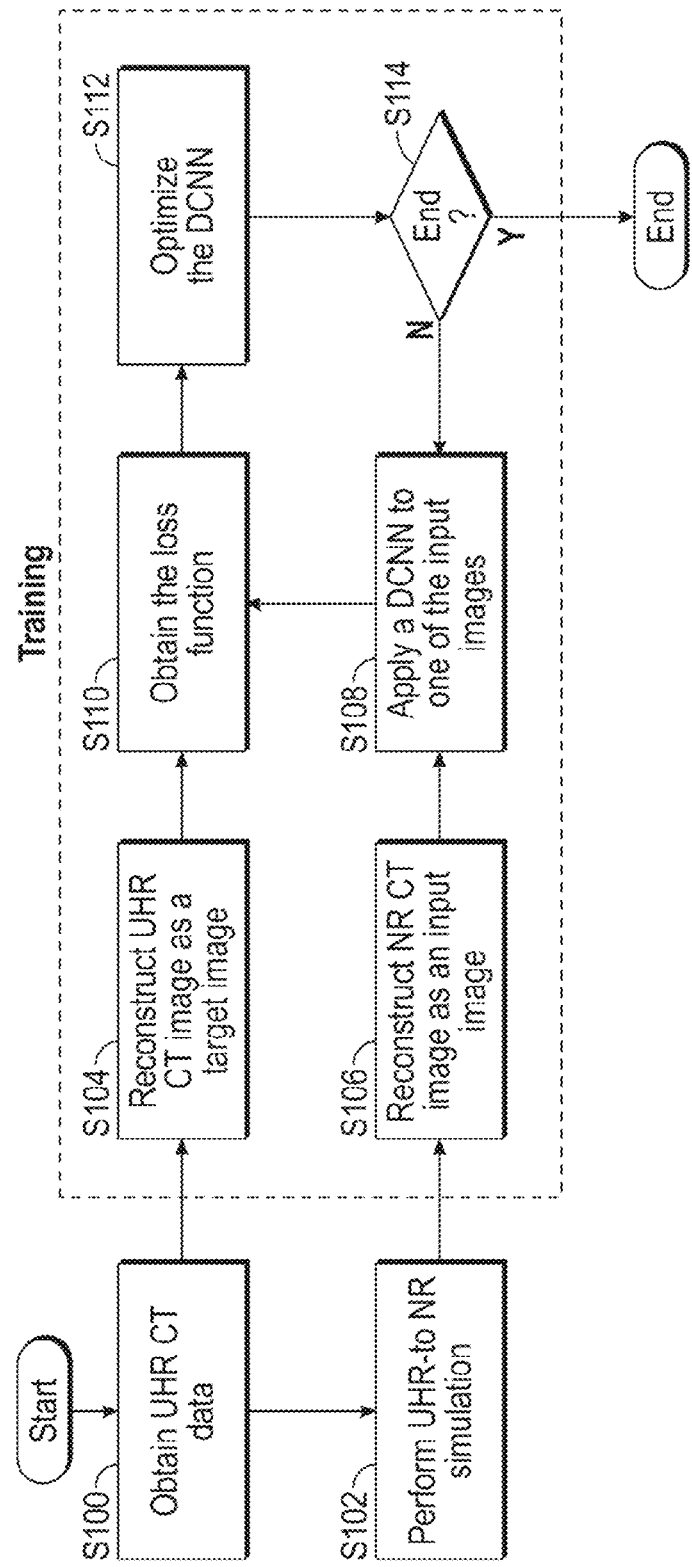
FIG. 16 is a diagram showing a workflow of data preparation to obtain and refine a trained deep convolution neural network (DCNN) in accordance with one or more aspects of the present disclosure.

FIG. 16 shows a workflow of data preparation and deep convolution neural network (DCNN) process to train a machine-learning model. The workflow initiates by obtaining UHR CT data in step S100. The UHR CT data is the pre-reconstructed, projection data acquired from an ultra-high resolution CT detector scanner 200. The UHR CT detector scanner 200 may be located offsite or remote location and is used for training to obtain a machine-learning model. The next step S102 in the workflow includes application of UHR-to-NR simulation (or resolution-lowering processing) to the UHR CT data to obtain normal resolution (NR) CT data. One example of UHR-to-NR simulation can be down sampling that may be used, includes a ratio of 4:1 data domain binning by way of example. However, other types of resolution-lowering processing, e.g. smoothing or other types of filtering may be used within the scope of the present disclosure. The UHR-to-NR simulation simulates the pre-reconstructed CT data acquired from a normal resolution scanner (e.g. 4-to-1 pixel binning). Alternatively, if a NR CT detector system is available, then the NR CT data may be acquired directly from the NR CT detector system instead of down sampling the UHR CT data. If the NR CT detector system is used for obtaining NR CT data, then steps S100 and S102 may be processed in parallel or independent of each other.

In the case where the UHR CT data in step S100 is down sampled to NR CT data in step S102, this is done because there are more pixels in the UHR CT data compared to conventional CT data. Hence, the ultra-high resolution data and normal resolution data. In one embodiment, the UHR CT data may have 4× more pixels (1024×1024) compared to a conventional CT data (512×512). In other words, because the pixels from the UHR CT are four times smaller than the pixels from a conventional CT, the pixels from the UHR CT are down sampled to match the pixel size of a conventional CT.

The next steps S104 and S106 include reconstructing the acquired data from steps S100 and S102. In particular, in step S104 the UHR CT data is reconstructed into a UHR CT image. In step S106 the NR CT data is reconstructed into a NR CT image. The UHR CT image is a reconstructed image from the UHR CT detector scanner 200 that is used as the training target for the DCNN. In other words, the UHR CT image is the training target for the machine-learning model. The NR CT image is a reconstructed image from down-graded (binned) UHR CT data in smaller pixel size in order to match the training target.

The image domain DCNN may be applied with any kind of DCNN structures such as U-NET, V-NET and EDSR by way of example and not meant to limit any type of DCNN structure applicable to the present disclosure. The NR CT image is used as an input into the DCNN or machine-based learning model in step S108. The UHR CT image is used as a target for the DCNN training workflow in order to optimize the DCNN. During optimization, the DCNN outputs a processed NR CT image in step S108. The processed NR CT image is used to obtain loss function in step S110, and the loss function is used to optimize the DCNN model in step S112. In step S114, the information processing apparatus 400 determines if an end criterion is satisfied or not, and the loop continues until the end criterion is satisfied (Y in step S114). If the end criterion is not satisfied (N in step S114), the loop returns to step S108. The processed NR CT image is compared with the UHR CT image (the target). The processed NR CT image is the training output image of DCNN machine-learning model with NR CT image as the input. The loss function between the UHR CT image and the processed NR CT image aims to reduce a difference between the two images. The loss function between the UHR CT image and the processed NR CT image may aim to improve the processed NR CT image with every iteration that loops back to the DCNN machine-learning model. The improvement of the processed NR CT image is optimized until the image may no longer be improved or the ability to improve the image has flattened. Common loss function setup for neural network training that may be applied include mean square factor (MSA) and mean squared error (MAE) by way of example and not meant to limit the types of loss function that are compatible with the neural network training of the present disclosure. The loss function and optimization process for optimizing the trained DCNN model is discussed in further detail below with respect to FIG. 18.

The training process of the DCNN is a method for creating a machine-learning model for generating DCNN enabled computed tomography (CT) images that closely resemble or approximate a wide-coverage UHR CT image. The method includes obtaining a first set of projection data (UHR CT data) in scanning an object to be imaged with a CT imaging modality. The method includes applying resolution-lowering processing of the first set of projection data to obtain a second set of projection data (NR CT data). Then, training the machine-learning model (DCNN) with a first CT image reconstructed based on the first set of projection data and a second CT image reconstructed based on the second set of projection data to obtain a model for super-resolution (trained DCNN). In one embodiment, when resolution-lowering processing is applied, noise data may be added to the first set of projection data to obtain the second set of projection data. The noise data is added so that noise level of the second CT image is higher than the noise level of the first image.

The noise data is added so that the trained machine-learning model denoises and improves a resolution of an input CT image in a case where the input CT image is processed by the trained machine-learning model. In another embodiment, an input of the machine-learning model is three-dimensional (3D) image data of a predetermined size, and an output of the machine-learning model is 3D image data of a predetermined size.

Figure 17:
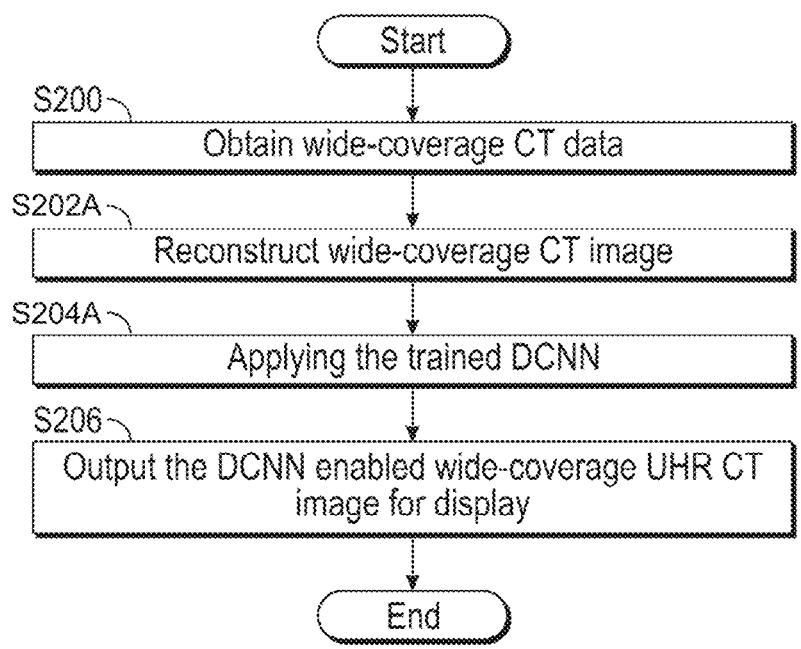
FIG. 17 is a flowchart for approximating a wide-coverage UHR CT image in accordance with one or more aspects of the present disclosure.

Referring now to FIG. 17, a flowchart detailing various steps of the framework known as the inference is provided that utilizes the trained DCNN from FIG. 16 to be applied to a wide-coverage CT detector system 100. The use of a wide-coverage CT detector with the trained DCNN is advantageous for several reasons. One reason being that a whole heart scan or other biological scans may be accomplished with one scan, reducing radiation dosage, the scan takes less time, hardware and software complexities as well as cost are reduced. Using the trained DCNN machine-learning model allows for the resolution to approximate a UHR CT detector system 200 without some of the drawbacks of a wide-coverage UHR CT detector system. The more time required for more than one scan may result in an issue where the scan is more susceptible to a patient moving resulting in a less than ideal scan as well as the increased hardware and software complexities and costs.

The inference framework initiates by acquiring a wide-coverage CT detector data in step S200. The wide-coverage CT detector data is the pre-reconstructed CT projection data acquired from the wide coverage CT detector system 100. The inference framework is applied in a clinical setting where an imaging modality is used to scan a patient for diagnostic imaging. The image processing apparatus 150 in the wide-coverage CT detector system 100 also loads reconstruction condition for the acquired wide-coverage CT data. The reconstruction condition is determined based on a body part imaged or the purpose of the imaging. In this step the trained DCNN is selected from multiple trained DCNNs, each trained specifically to a body part imaged or to a purpose of imaging. The workflow continues by reconstruction which generates a wide-coverage CT detector image based on the wide-coverage CT data in step S202A. Then the trained DCNN is applied to the wide-coverage detector CT image in step S204A, to generate a processed CT image. Applying the trained DCNN to the wide-coverage CT detector image results in a DCNN enabled CT image that approximates a wide-coverage UHR CT image. In step S206 the processed CT image is output for display on a display monitor for quality check and/or for diagnosis. It should be noted that the trained DCNN that is applied is generated from the UHR CT detector system 200 in the training phase of the present disclosure.

In FIG. 17, only the DCNN model for super-resolution (SR) trained by the method in FIG. 16 is applied to the CT image, but in another embodiment, in addition to the DCNN model for SR, a trained DCNN model for denoise (generation method of this model is described below) may be applied as well. The DCNN for SR and the DCNN for denoise can be applied sequentially, in which the DCNN for SR first is applied first and then the DCNN for denoise is applied, or, the DCNN for denoise is applied first and then the DCNN for SR is applied. In yet another embodiment, the DCNNs may be applied in parallel to the same CT image, and then blending the CT image which the DCNN for SR has been applied and the CT image which the DCNN for denoise has been applied, at a certain ratio. Alternatively, a DCNN is trained to have both denoise and SR effect, which is described below with reference to FIG. 23 or FIG. 27.

The DCNN enabled CT image that approximates a wide-coverage UHR CT image is an image which has a large segment coverage and high resolution performance. In other words, applying the trained DCNN enables generating a higher resolution image (UHR CT image) from wide-coverage CT detector data. This results in the advantages of using a wide-coverage CT detector system 100 (wide scan coverage, less cost, less signal processing complexities) while having the advantage of higher resolution from UHR CT data and minimizing any of the drawbacks associated with a wide-coverage UHR CT scanner system 300 (narrower scan coverage, higher cost, higher processing complexities, increased radiation dosage, susceptibility to artifacts).

In another embodiment, a medical image processing apparatus that includes one or more memories and one or more processors executes various steps to apply the trained DCNN to generate a processed image (DCNN enabled CT image that approximates a wide-coverage UHR CT image). The medical image processing apparatus may be a wide-coverage CT detector scanner/system. The medical image processing apparatus may be an apparatus configured to receive data from a UHR CT detector system 200 and is able to apply a trained machine-learning model by way of example. The medical image processing apparatus receives a set of projection data acquired in scanning an object to be examined with a medical imaging modality, then reconstructing a CT image of the object based on the set of projection data. A model from a first trained machine-learning model for noise reduction and a second trained machine-learning model for super-resolution that is stored in the one or more memories is designated and the designated model is applied to the reconstructed CT image to obtain a processed image.

The medical image processing apparatus may be configured to reconstruct the CT image with a first reconstruction filter in a case where the first trained machine-learning model is designated and to reconstruct the CT image with a second reconstruction filter in a case where the second trained machine-learning model is designated. The medical image processing apparatus may combine the processed image and the reconstructed CT image at a predetermined ratio. The predetermined ratio may be set based on a user input or determined in a set of imaging conditions. In another embodiment, the medical image processing apparatus is configured to generate multiple partial 3D images based on the reconstructed CT image, to apply the designated model by inputting the multiple partial 3D images to the designated model to obtain multiple processed partial 3D images, and to combine the multiple processed partial 3D images to obtain the processed image. In some scenarios, at least two of the partial 3D images are partially overlapped.

In another aspect of the present disclosure, the medical image processing apparatus applies a filter to a joint part between two adjacent processed partial 3D images of the multiple processed partial 3D images.

In accordance with at least one aspect of the present disclosure, a feature of the deep learning neural network enabled wide-coverage ultra-high resolution CT is the use of a trained DCNN obtained from the UHR CT detector system 200. As aforementioned, one application of the trained DCNN of the present disclosure is to use the optimization process for the training of the machine-learning model as schematically shown in FIG. 18.

Figure 18:
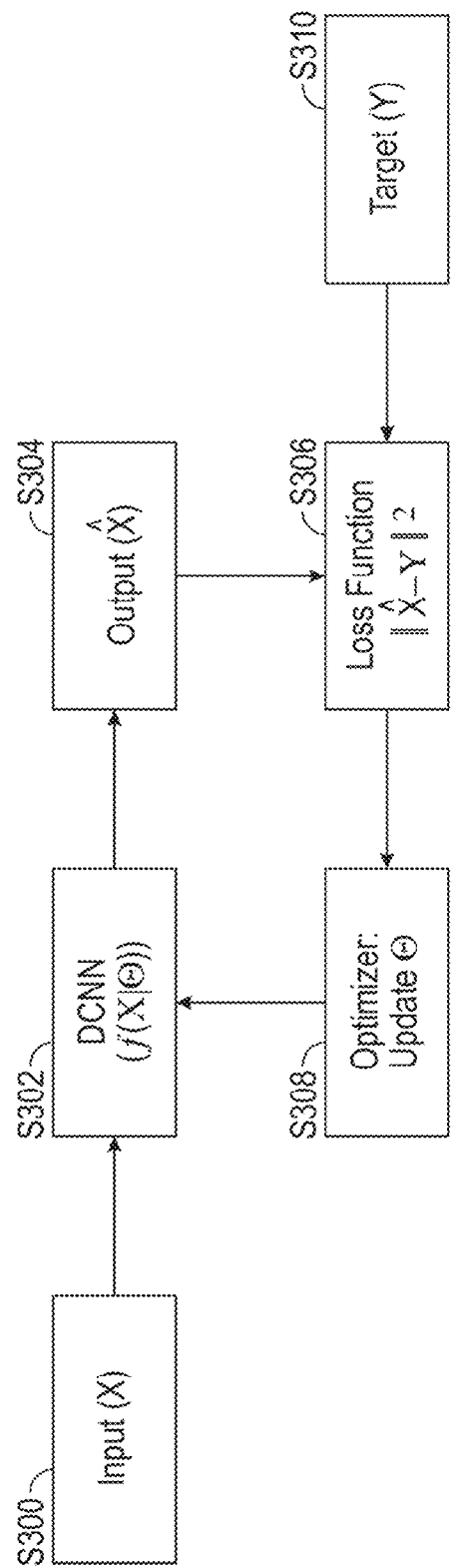
FIG. 18 is a block diagram illustrating the training framework to obtain an optimized trained DCNN model in accordance with one or more aspects of the present disclosure.

FIG. 18 shows the optimization process in more detail applied during the training framework for DCNN described above in FIG. 16. As shown in FIG. 18, the framework initiates by using an Input (X) in step S300. The training process for DCNN is designed to map training input X to desired Target (Y) in step S310. Subsequent to obtaining Input (X) the following DCNN (f(X/Θ)) algorithm is applied to obtain an Output ($\hat{X}$) in steps S302 and S304, respectively:

$$\Theta^* = \mathrm{argmin} \frac{1}{N} \sum_{i=1}^{N} \|f(x_i; \Theta) - y_i\|^2$$

Where Θ is the set of parameters of the neural network to be optimized, N is the total number of training instances in training process, f is the neural network to be optimized, $x_i$ is the i-th element of the training input, and $y_i$ is the i-th element of the training target. By solving this optimization equation, an optimal network parameter Θ*, such that the difference between the network output and the target image Y will be minimized. In particular, after Output ($\hat{X}$) is obtained, the loss function is applied in step S306 which compares with the Target (Y) in order to obtain an updated optimal network parameter in step S308. Subsequent to step S308, the updated optimizer may then repeat steps S302 by being applied to the DCNN algorithm until the difference between the network output ($\hat{X}$) in step S304 and the target image Y is minimized beyond a predetermined threshold or the improvements to the output become flat according to the loss function in step S306. This training framework results in an optimized machine-learning model for applying in an inference process.

FIGS. 19A, 19B, 19C, and 19D show various examples of the machine-learning model 401 (also referred to as DL network 401).

Figure 19A:
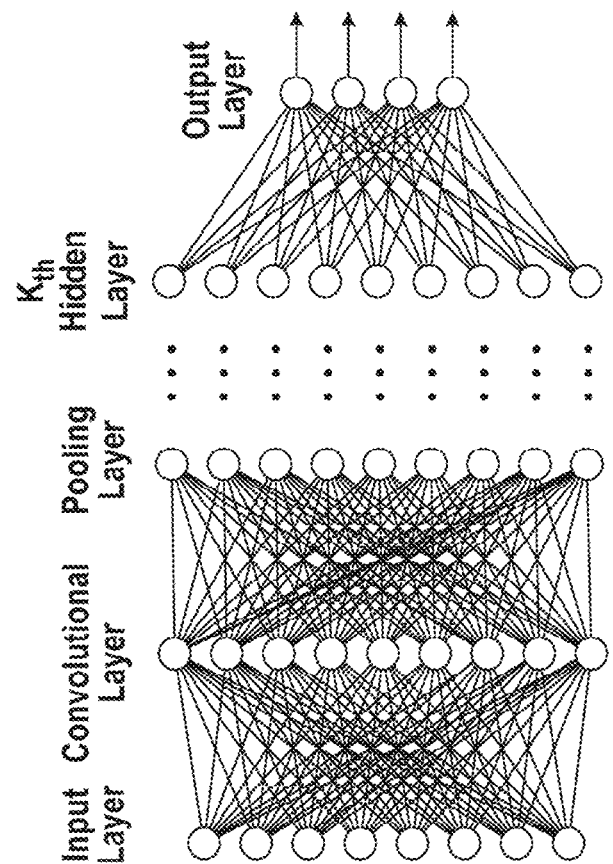
FIG. 19A shows an example of a DL network that is a feedforward artificial neural network (ANN), according to one embodiment.

FIG. 19A shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The DL network 401 generally has more than three layers of neurons and has as many output neurons $\tilde{x}_N$ as input neurons, wherein N is the number of pixels in the reconstructed image. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can further be defined as a composition of other functions. This can be conveniently represented as a network structure, with arrows depicting the dependencies between variables, as shown in FIG. 19A. For example, the ANN can use a nonlinear weighted sum, wherein m(x)=K($\Sigma_i w_i n_i(x)$), where K (commonly referred to as the activation function) is some predefined function, such as the sigmoidal function, hyperbolic tangent function, and rectified linear unit (ReLU).

In FIG. 19A (and similarly in FIG. 19B), the neurons (i.e., nodes) are depicted by circles around a threshold function. For the non-limiting example shown in FIG. 19A, the inputs are depicted as circles around a linear function, and the arrows indicate directed connections between neurons. In certain implementations, the machine-learning model 401 is a feedforward network as exemplified in FIGS. 19A and 19B (e.g., it can be represented as a directed acyclic graph).

The machine-learning model 401 operates to achieve a specific task, such as super-resolution processing of a CT image, by searching within the class of functions F to learn, using a set of observations, to find m*∈F which solves the specific task in some optimal sense. For example, in certain implementations, this can be achieved by defining a cost function C such that, for the optimal solution m*, C(m*)≤C (m)∀m∈F (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

Figure 19B:
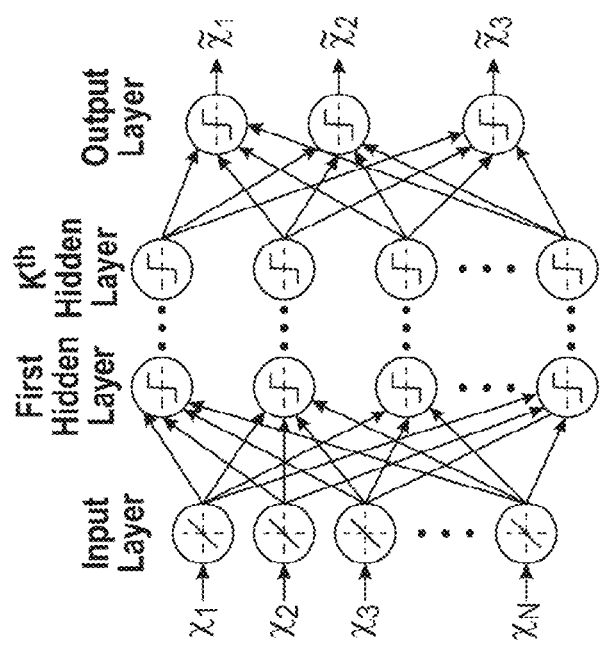
FIG. 19B shows an example of a DL network that is a convolutional neural network (CNN), according to one embodiment.

FIG. 19B shows a non-limiting example in which the machine-learning model 401 is a convolutional neural network (CNN). CNNs are type of ANN that has beneficial properties for image processing, and, therefore, have specially relevancy for the applications of image denoising and sinogram restoration. CNNs use feed-forward ANNs in which the connectivity pattern between neurons can represent convolutions in image processing. For example, CNNs can be used for image-processing optimization by using multiple layers of small neuron collections which process portions of the input image, called receptive fields. The outputs of these collections can then be tiled so that they overlap, to obtain a better representation of the original image. This processing pattern can be repeated over multiple layers having alternating convolution and pooling layers. Note that FIG. 19B shows an example of a full connect type network defining a node of a succeeding layer using all the nodes of a preceding layer. What is shown in the figure should strictly be understood as one example of DNNs. It is common for CNNs to form a loose connect (partial connect) type network defining a node of a succeeding layer using some of the nodes of a preceding layer.

Figure 19C:
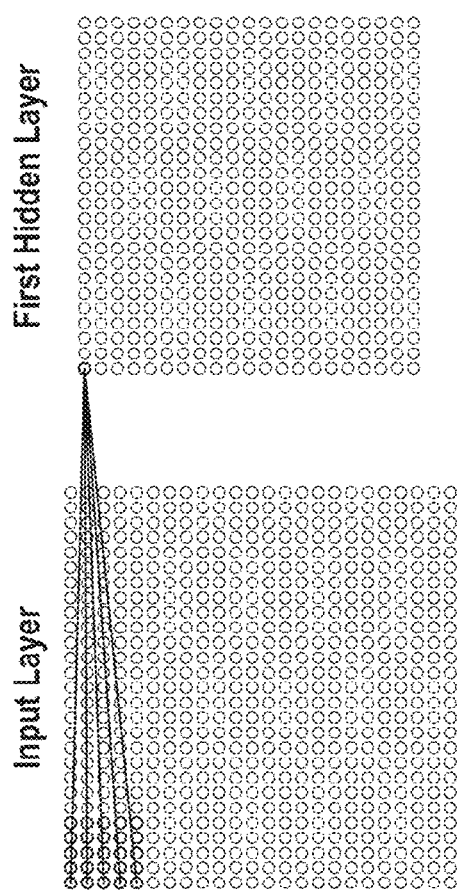
FIG. 19C shows an example of implementing a convolution layer for one neuronal node of the convolution layer, according to one embodiment.

FIG. 19C shows an example of a 5×5 kernel being applied to map values from an input layer representing a two-dimensional image to a first hidden layer, which is a convolution layer. The kernel maps respective 5×5 pixel regions to corresponding neurons of the first hidden layer.

Following a convolutional layer, a CNN can include local and/or global pooling layers, which combine the outputs of neuron clusters in the convolution layers. Additionally, in certain implementations, the CNN can also include various combinations of convolutional and fully connected layers, with pointwise nonlinearity applied at the end of or after each layer.

CNNs have several advantages for image processing. To reduce the number of free parameters and improve generalization, a convolution operation on small regions of input is introduced. One significant advantage of certain implementations of CNNs is the use of shared weight in convolutional layers, which means that the same filter (weights bank) is used as the coefficients for each pixel in the layer; this both reduces memory footprint and improves performance. Compared to other image-processing methods, CNNs advantageously use relatively little pre-processing. This means that the network is responsible for learning the filters that in traditional algorithms were hand-engineered. The lack of dependence on prior knowledge and human effort in designing features is a major advantage for CNNs.

Figure 19D:
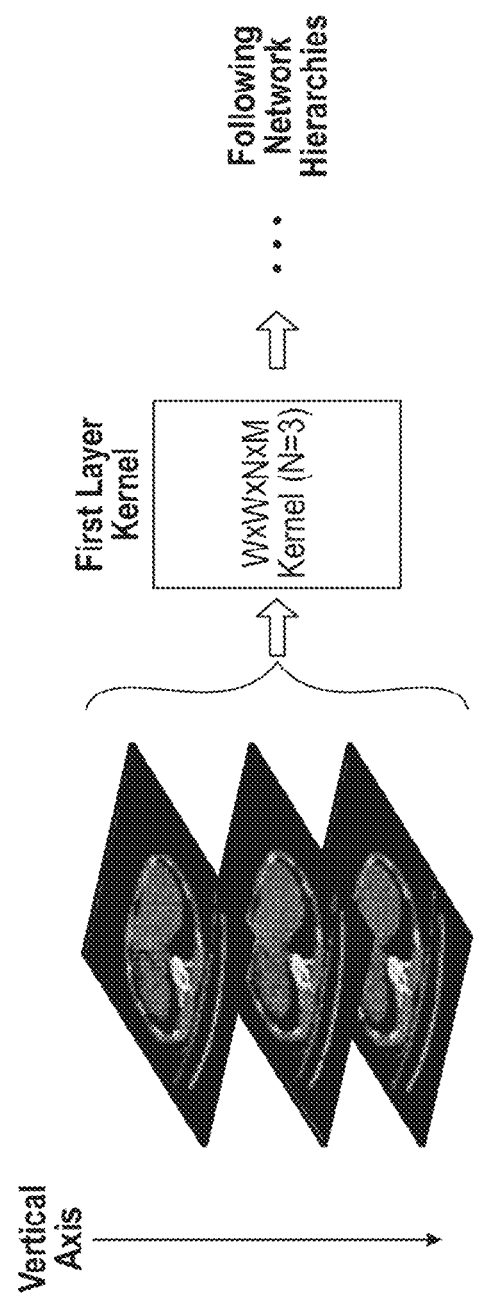
FIG. 19D shows an example of implementing a three channel volumetric convolution layer for volumetric image data, according to one embodiment.

FIG. 19D shows an implementation of machine-learning model 401 that takes advantage of the similarities between adjacent layers in reconstructed three-dimensional medical images. The signal in adjacent layers is ordinarily highly correlated, whereas the noise is not. That is, in general, a three-dimensional volumetric image in CT usually can provide more diagnostic information than single slice transverse two-dimensional image since more volumetric features can be captured. Based on this insight, certain implementations of the methods described herein use a volumetric-based deep-learning algorithm to improve the CT images.

As shown in FIG. 19D, a slice and the adjacent slices (i.e., the slice above and below the central slice) are identified as a three-channel input for the network. To these three layers, a W×W×3 kernel is applied M times to generate M values for the convolutional layer, which are then used for the following network layers/hierarchies (e.g., a pooling layer). This W×W×3 kernel can also be thought of and implemented as three W×W kernels respectively applied as three-channel kernels that are applied to the three slices of volumetric image data, and the result is an output for the central layer, which is used as an input for the following network hierarchies. The value M is the total filter number for a given slice of the convolutional layer, and W is the kernel size.

In another embodiment, you can apply a different method, (e.g. a 3D method) instead of the above-mentioned 3-channel method.

In one embodiment of the present disclosure, for reducing computational costs in the training and inference phases, CT images can be split into small image data sets and input into the machine-learning model for training and inference.

Data splitting, weighting and reassembly may allow wide-coverage CT detector systems to computationally power or data buffer to process advance networks like super-resolution 3D networks for wide-coverage UHR images. The present disclosure proposes data splitting, weighting and reassembly data flow for benefitting its implementation. For example, a 1024×1024 image is disassembled into 81 128×128 small images in the XY dimension (including overlap to prevent boundary effects) so that the system can process a small batch of the image at a time. Then the image is re-assembled back to its original size (e.g. 1024×1024) after processing with the network. Weighting is applied for overlapped pixels. The same approach may be applied to the Z-dimension as well. Namely, the ultra-high resolution image is divided into a plurality of smaller images that are then processed by the wide-coverage CT detector system and put back together into the larger image by using any preferred weighting and reassembly data flow. The data splitting, weighting and reassembly approach can be applied to various size images and the image described above is merely by way of example and not meant to limit the different sizes that the approach may be applied to.

Figure 20:
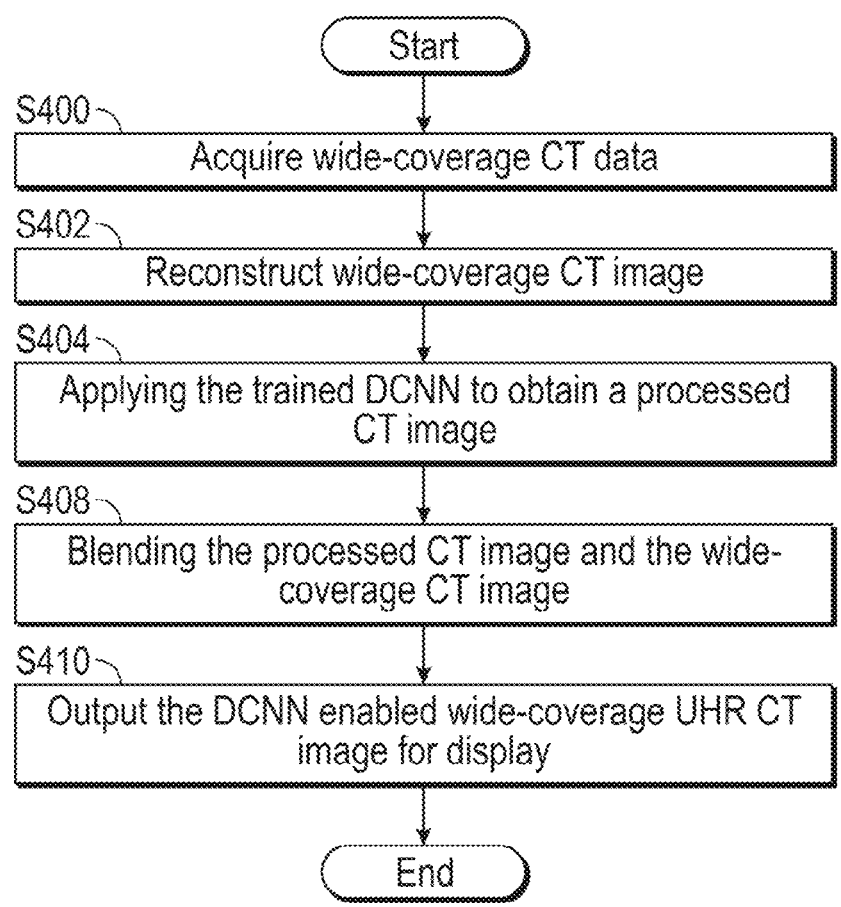
FIG. 20 is a flowchart illustrating the steps of a second embodiment that approximates a wide-coverage UHR CT image in accordance with one or more aspects of the present disclosure.

Referring now to FIG. 20, a flowchart representative of a second embodiment of the present disclosure is shown. The present embodiment proposes a blending operation that allows a user to tune the output textures (e.g. Mild, Standard or Strong) to output a UHR CT system image or a NR CT system image depending on a user's preference. In this embodiment, the trained DCNN is obtained in the same or similar manner as described in FIG. 16 above. The flowchart is initiated by acquiring wide-coverage CT detector data in step S400, then reconstructing (smaller pixel size) a wide-coverage CT detector image in step S402. The DCNN trained machine-learning model is applied to the wide-coverage CT image in step S404 to output a DCNN enabled CT image that approximates a wide-coverage UHR CT image. However, a user may not be satisfied with a texture of a 100% DCNN enabled wide-coverage UHR CT image. In this embodiment, the user of the wide-coverage CT detector system 100 may select an output texture for the DCNN enabled CT image that approximates a wide-coverage UHR CT image in a blending step S408. The blending step S408 may include three options for the operator to choose from such as mild, standard or strong by way of example. Alternatively, in the blending step, the user may choose a percentage of blending. For example, if the operator chooses 50%, the blending will tune the output textures to consist of a 50% original NR CT detector system image and a 50% UHR CT detector system image. The operator may prefer a texture that is closer to the UHR CT detector system image by selecting 75% UHR CT detector system image and 25% original NR CT detector system image. The original NR CT system image and the UHR CT system image may vary from 0 to 100% depending on the type of blending the user would like to achieve. After the blending step, a final DCNN enabled image that approximates a wide-coverage UHR CT image is output in step S410 for display on a monitor, in accordance with the operator's blending preference.

Figure 21:
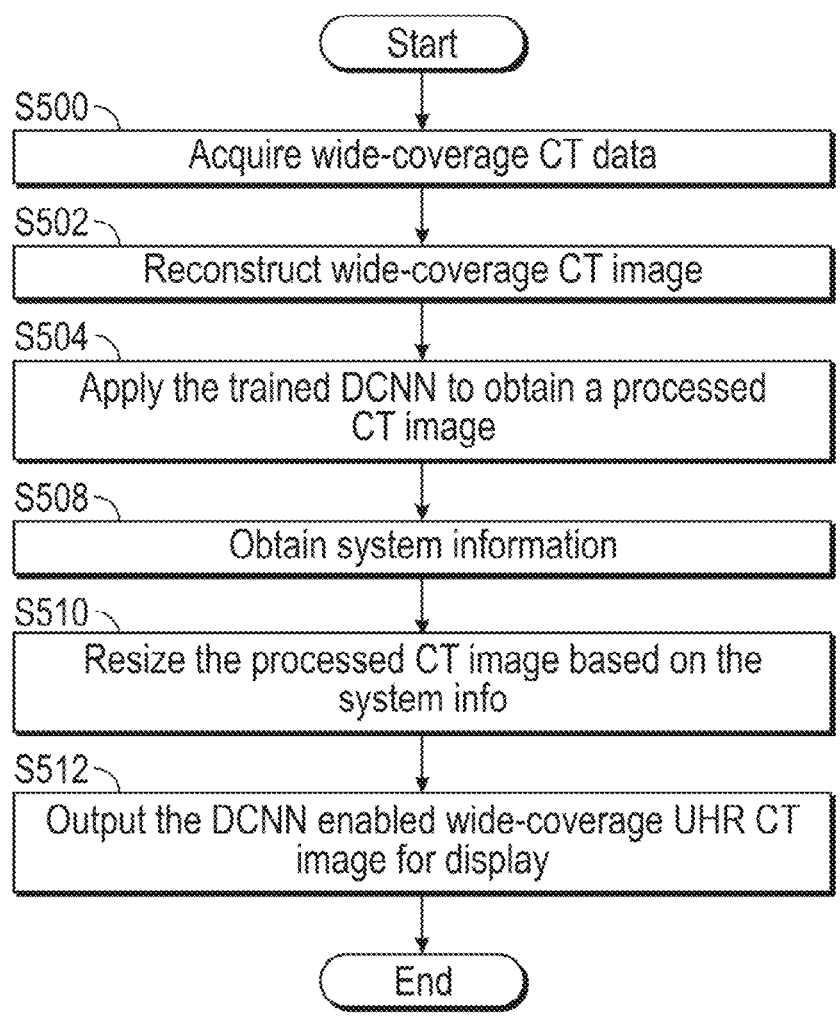
FIG. 21 is a flowchart illustrating the steps of a third embodiment that approximates a wide-coverage UHR CT image in accordance with one or more aspects of the present disclosure.

In considering current commercially available wide-coverage CT detector systems, these systems may not have the computational power or data buffer to process advance networks (e.g. super-resolution 3D networks) for wide-coverage UHR CT images, a third embodiment is proposed as shown in the flowchart of FIG. 21. The inference process shown in FIG. 21 includes a resizing operator which reads hardware and related software specifications (such as system information) for resizing (e.g. down sampling in XY or Z dimension) the output image in order to be properly processed with normal-resolution wide coverage CT detector system.

In accordance with FIG. 21, the process initiates with acquiring wide-coverage CT detector data from a wide-coverage CT detector system 100 in step S500. Then, the wide-coverage CT detector data is reconstructed into a wide-coverage CT detector image in step S502. The wide-coverage CT detector image is inputted into the trained DCNN in step S504 to output a DCNN enabled CT image that approximates a wide-coverage UHR CT image. The method may continue by taking into consideration the system information in step S508 such as particular system specifications to determine a size of the DCNN enabled CT image that approximates a wide-coverage UHR CT image that may be processed by the system in accordance with the system information. Although the workflow shows that the system information is obtained after outputting the DCNN enabled CT image that approximates a wide-coverage UHR CT image, the system information may be obtained in parallel with the process for outputting a DCNN enabled CT image that approximates a wide-coverage UHR CT image or the system information may be obtained prior to the process for generating a DCNN enabled CT image that approximates a wide-coverage UHR CT image. Subsequent to obtaining the system information, a resizing operator step S510 is applied to resize the generated DCNN enabled CT image that approximates a wide-coverage UHR CT image in accordance with the information obtained from the system information. This allows for outputting a final DCNN enabled CT image, for display on a monitor, that approximates a wide-coverage UHR CT image in step S512 that may be properly processed with normal-resolution wide coverage CT detector system. In one embodiment of the present disclosure, the system information is obtained from the wide-coverage CT detector system 100.

Figure 22:
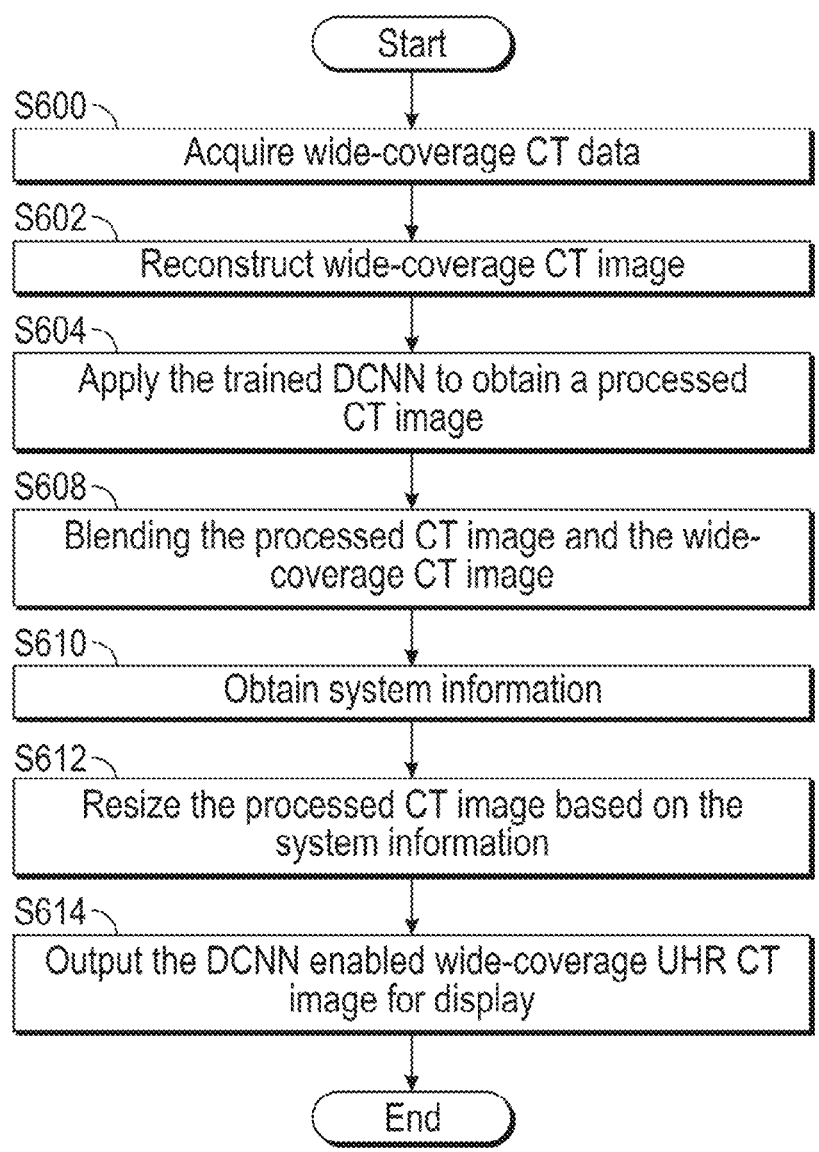
FIG. 22 is a flowchart illustrating the steps of a fourth embodiment that approximates a wide-coverage UHR CT image in accordance with one or more aspects of the present disclosure.

A fourth embodiment of the present disclosure will now be described with reference to FIG. 22. FIG. 22 illustrates a flow chart of at least one embodiment of generating a DCNN enabled CT image that approximates a wide-coverage UHR CT image with blending and resizing prior to generating a final DCNN enabled CT image. The first step S600 includes acquiring wide-coverage CT detector data from a wide-coverage CT detector scanner 100. Next, the wide-coverage CT detector data is reconstructed into a wide-coverage CT detector image in step S602 as input for the trained DCNN in step S604 which outputs a DCNN enabled CT image that approximates a wide-coverage UHR CT image. The blending step S608 allows for an operator to tune the output textures to either more closely represent a wide-coverage CT detector image or a DCNN enabled CT image that closely resembles a wide-coverage UHR CT image depending on the operator's preference. After the blending step is performed, the system information of detector system 100 is obtained in step S610 by reading hardware and related software specifications in order to resize appropriately. A resizing step S612 is applied to ensure that the output image (the final DCNN enabled CT image that approximates a wide-coverage UHR CT image) may be properly processed by the normal-resolution wide coverage CT detector system 100. After the resizing step, a final DCNN enabled CT image that approximates a wide-coverage UHR CT image is output for display on a monitor in step S614.

Figure 23:
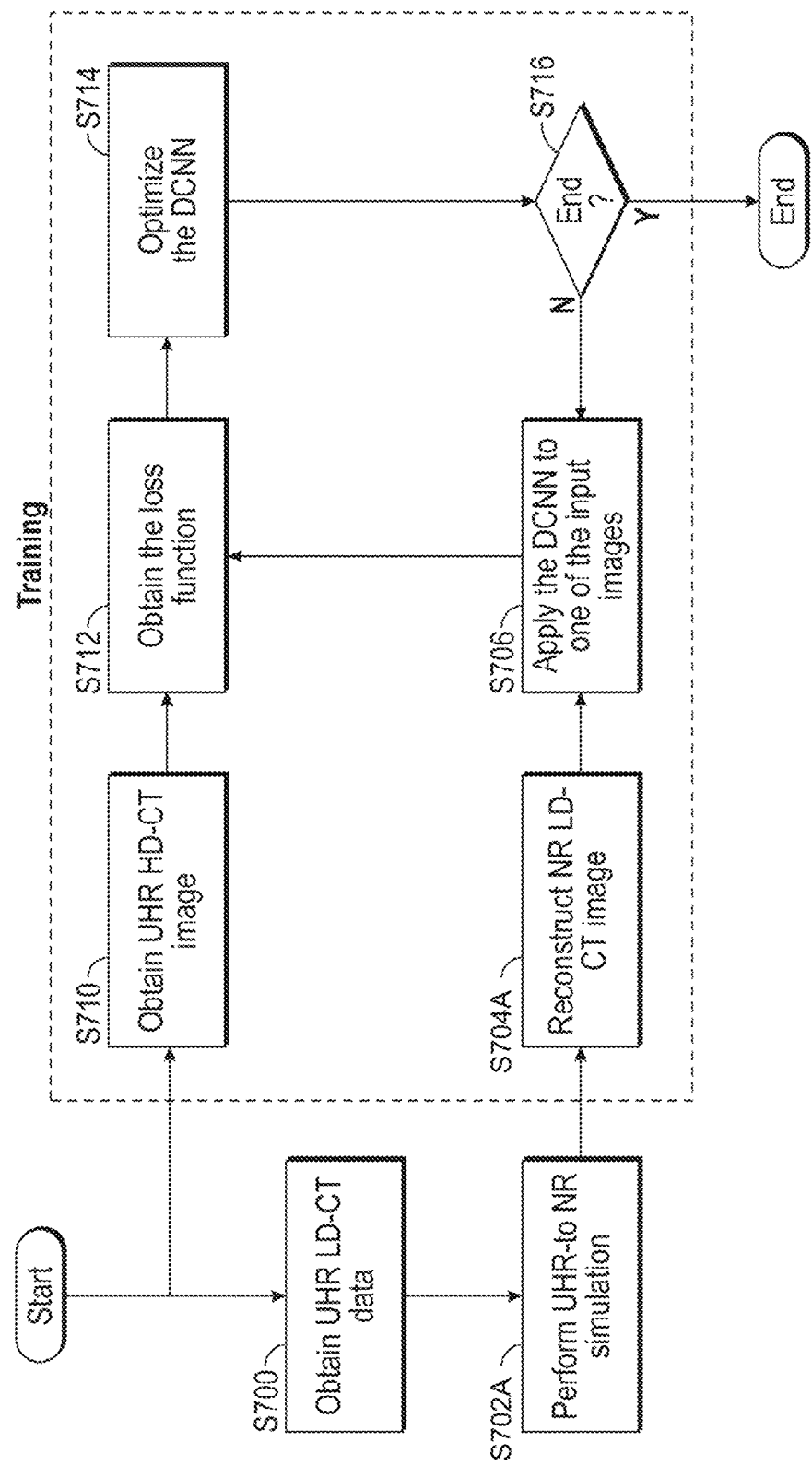
FIG. 23 is a diagram showing a fifth embodiment of a workflow of data preparation to obtain and refine a trained deep convolution neural network (DCNN) in accordance with one or more aspects of the present disclosure.

A fifth embodiment of the present disclosure is described herein with respect to FIG. 23 as shown. FIG. 23 shows a workflow for the training process of the DCNN which implements a denoising task in order to achieve ultra-high resolution for a wide-coverage CT detector system 100 while minimizing noise levels associated with UHR CT data. This embodiment of the present disclosure may initiate with the acquisition of UHR low dose CT data (LD-CT data) in step S700. The UHR LD-CT data is the pre-reconstructed CT data acquired from the ultra-high resolution CT scanner 200 with low-dose setups (real or simulated). In step S710, a target image is obtained. The target image is a UHR high-dose CT image. The UHR HD-CT image is reconstructed high-dose image from UHR CT scanner that is used as the training target. In this embodiment, the UHR HD-CT Image and the UHR LD-CT data are generated from the same UHR HD-CT data. In another embodiment, UHR HD-CT image is generated from CT data which is different than the CT data from which the UHR LD-CT data is generated.

In step S702A, UHR-to-NR simulation as described above in step S102 is performed on the UHR LD-CT data to obtain the NR LD-CT data. The NR LD-CT data in step S702A simulates the pre-reconstructed CT data acquired from a normal resolution scanner system. The NR LD-CT data is then reconstructed to an NR LD-CT image in step S704A which is used as an input image to the DCNN in step S706. The NR LD-CT image is a reconstructed image from downgraded (binned) low-dose UHR CT data in smaller pixel size in order to match the training target. In step S706, the image processing apparatus 150 in the wide-coverage CT detector system 100 applies the DCNN to one of the input images to output a processed NR-LD-CT image to optimize the DCNN training in step S714 using a loss function analysis, in step S712, between the output image (the processed NR LD-CT image) and the training target image (the UHR HD-CT image). In step S716 a criterion is used to determine whether the optimization loop continues to step S706 if the criterion is not satisfied. Alternatively, the optimization loop ends if the criterion for optimizing the DCNN is satisfied. The processed NR LD-CT image is the training output image of DCNN with low-dose NR CT image as the input. The loss function applied between the output image and the target image is the same or similar as discussed in FIGS. 16 and 18. Loss function is applied to minimize the difference between the output image and the target image to obtain a trained DCNN that is optimized for application in the inference process. This may conclude the training portion of the DCNN for noise suppression and resolution enhancement for DCNN enabled CT images that approximate a wide-coverage UHR CT detector image.

Figure 24:
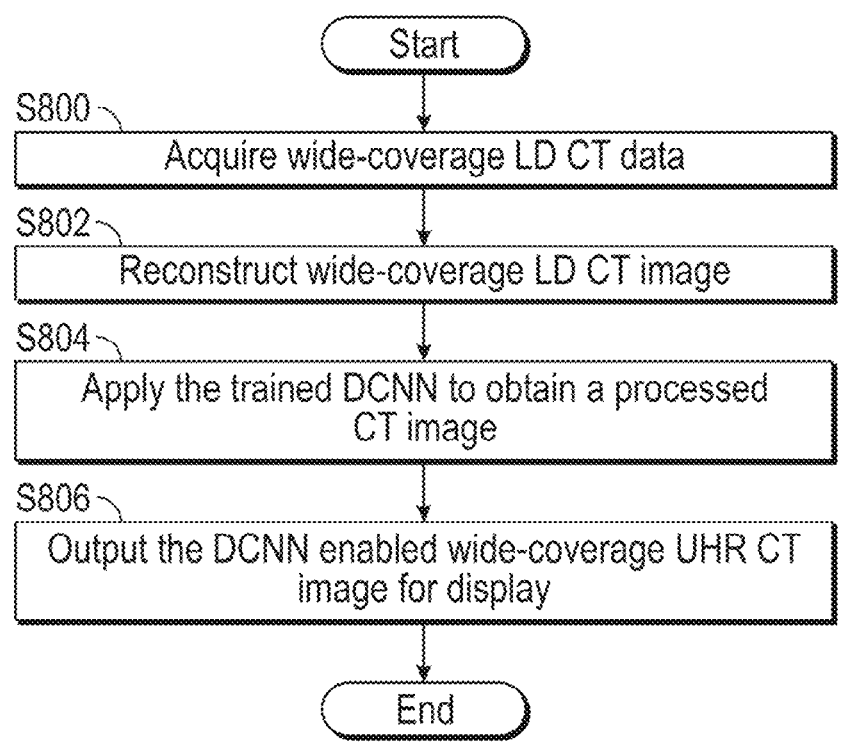
FIG. 24 is a flowchart according to the fifth embodiment to obtain a DCNN enabled CT image that approximates a wide-coverage UHR CT image in accordance with one or more aspects of the present disclosure.

Referring now to FIG. 24, a flowchart for the inference portion of noise suppression and resolution enhancement after the trained DCNN is obtained is shown. The flowchart begins by acquiring wide-coverage CT detector data that is low-dose (LD) in step S800. Wide coverage detector CT data is the pre-reconstructed CT data acquired from the wide coverage CT detector scanner 100. Then, the wide-coverage CT detector data (LD) is reconstructed into a wide-coverage CT detector LD image in step S802. The wide-coverage CT detector LD image is reconstructed CT image in smaller pixel size to correspond to the pixel size in UHR CT image. Next, the trained DCNN is applied to the wide-coverage CT detector LD image in step S804 to generate a DCNN enabled CT image that approximates a wide-coverage UHR CT image that is denoised. In step S806, the processed CT image (the DCNN enabled CT image) is output for display on a monitor. The DCNN enabled CT image that resembles a wide-coverage UHR CT image (denoised) is advantageous because it provides a noise suppressed image which has large segment coverage and high resolution performance.

The various embodiments of the present disclosure apply to UHR-CT trained DCNN on wide-coverage detector CT data. This is advantageous for several reasons. Compared to current wide-coverage CT detector images, the present embodiments offer better resolution and noise suppression performance which gains from UHR-CT trained network and finer reconstructed pixel sizes. Compared to current UHR-CT images, the present embodiments include wider detector (S-I direction) coverage in one single bed position scan, which benefits dose, image uniformity, time resolution, and easier scan workflow. Large acquisition detector pixel size from wide-coverage CT also results in better noise performance. Compared to wide-coverage UHR-CT system which does not exist commercially currently, the present embodiments offer much lower cost and significantly less signal processing complexity in both hardware and software.

The present disclosure is directed to a system, method and/or an apparatus for deep learning neural network enabled wide coverage ultra-high resolution CT. The DCNN is trained from an existing UHR-CT detector scanner and applied to a wide-coverage detector CT system data to enhance the resolution performance and reduce the noise while maintaining the edges from wide coverage scan. In particular, the present disclosure combines the advantages from two different modalities (UHR-CT detector scanner & wide-coverage CT detector scanner) which may result in advantages with respect to cost and system complexity compared to a non-commercially available wide-coverage UHR CT detector system 300.

Figure 25:
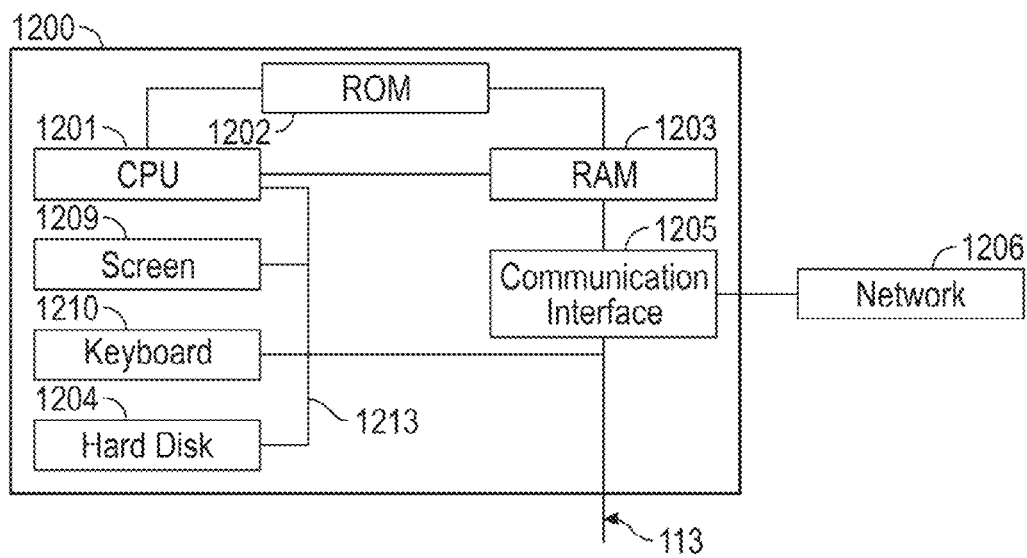
FIG. 25 shows a schematic diagram of embodiments of a computer that may be used with one or more embodiments of at least one apparatus, system, method and/or storage medium, for generating a model, optimizing the model and applying the model to generate a DCNN enabled CT image that closely resembles or approximates a wide-coverage UHR CT image in accordance with one or more aspects of the present disclosure.
Figure 26:
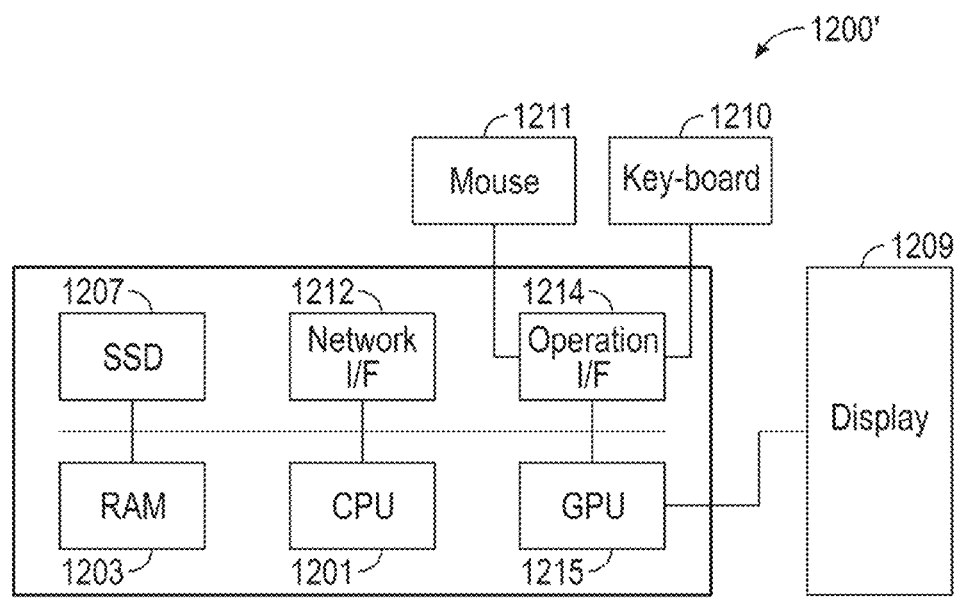
FIG. 26 shows a schematic diagram of embodiments of a computer that may be used with one or more embodiments of at least one apparatus, system, method and/or storage medium, for generating a model, optimizing the model and applying the model to generate a DCNN enabled CT image that closely resembles or approximates a wide-coverage UHR CT image in accordance with one or more aspects of the present disclosure.

Referring now to FIGS. 25 and 26, in at least one embodiment, a computer, such as the console or computer 1200, 1200', may be dedicated to generating a DCNN enabled CT image that approximates a wide-coverage UHR CT image.

The electric signals used for imaging may be sent to one or more processors, such as, but not limited to, a computer 1200, a computer 1200', etc. as discussed further below, via cable(s) or wire(s), such as, but not limited to, the cable(s) or wire(s) 113 (see FIG. 25).

Various components of a computer system 1200 are provided in FIG. 25. A computer system 1200 may include a central processing unit ("CPU") 1201, a ROM 1202, a RAM 1203, a communication interface 1205, a hard disk (and/or other storage device) 1204, a screen (or monitor interface) 1209, a keyboard (or input interface; may also include a mouse or other input device in addition to the keyboard) 1210 and a BUS or other connection lines (e.g., connection line 1213) between one or more of the aforementioned components (e.g., as shown in FIG. 25). In addition, the computer system 1200 may comprise one or more of the aforementioned components. For example, a computer system 1200 may include a CPU 1201, a RAM 1203, an input/output (I/O) interface (such as the communication interface 1205) and a bus (which may include one or more lines 1213 as a communication system between components of the computer system 1200; in one or more embodiments, the computer system 1200 and at least the CPU 1201 thereof may communicate with the one or more aforementioned components of a ultra-high resolution detector scanner and/or a wide-coverage CT detector scanner or a device or system using same, such as, but not limited to, the ultra-high resolution detector scanner 200, the wide-coverage CT detector scanner 100, and one or more other computer systems 1200 may include one or more combinations of the other aforementioned components. The CPU 1201 is configured to read and perform computer-executable instructions stored in a storage medium. The computer-executable instructions may include those for the performance of the methods and/or calculations described herein. The computer system 1200 may include one or more additional processors in addition to CPU 1201, and such processors, including the CPU 1201, may be used for controlling and/or manufacturing a device, system or storage medium for use with same or for use to generate a DCNN enabled CT image that approximates a wide-coverage UHR CT image discussed herein. The system 1200 may further include one or more processors connected via a network connection (e.g., via network 1206). The CPU 1201 and any additional processor being used by the system 1200 may be located in the same telecom network or in different telecom networks (e.g., performing, manufacturing, controlling and/or using technique(s) may be controlled remotely).

The I/O or communication interface 1205 provides communication interfaces to input and output devices, which may include the ultra-high resolution detector scanner 200 and the wide-coverage CT detector scanner 100, a communication cable and a network (either wired or wireless), a keyboard 1210, a mouse (see e.g., the mouse 1211 as shown in FIG. 26), a touch screen or screen 1209, a light pen and so on. The Monitor interface or screen 1209 provides communication interfaces thereto.

Any methods and/or data of the present disclosure, such as the methods for using and/or manufacturing a device, system or storage medium for use with same and/or method(s) for generating a DCNN enabled CT image that approximates a wide-coverage UHR CT image, as discussed herein, may be stored on a computer-readable storage medium. A computer-readable and/or writable storage medium used commonly, such as, but not limited to, one or more of a hard disk (e.g., the hard disk 1204, a magnetic disk, etc.), a flash memory, a CD, an optical disc (e.g., a compact disc ("CD") a digital versatile disc ("DVD"), a Blu-ray™ disc, etc.), a magneto-optical disk, a random-access memory ("RAM") (such as the RAM 1203), a DRAM, a read only memory ("ROM"), a storage of distributed computing systems, a memory card, or the like (e.g., other semiconductor memory, such as, but not limited to, a non-volatile memory card, a solid state drive (SSD) (see SSD 1207 in FIG. 26), SRAM, etc.), an optional combination thereof, a server/database, etc. may be used to cause a processor, such as, the processor or CPU 1201 of the aforementioned computer system 1200 to perform the steps of the methods disclosed herein. The computer-readable storage medium may be a non-transitory computer-readable medium, and/or the computer-readable medium may comprise all computer-readable media, with the sole exception being a transitory, propagating signal. The computer-readable storage medium may include media that store information for predetermined, limited, or short period(s) of time and/or only in the presence of power, such as, but not limited to Random Access Memory (RAM), register memory, processor cache(s), etc. Embodiment(s) of the present disclosure may also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

In accordance with at least one aspect of the present disclosure, the methods, devices, systems, and computer-readable storage mediums related to the processors, such as, but not limited to, the processor of the aforementioned computer 1200, the processor of computer 1200', etc., as described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. The CPU 1201 (as shown in FIG. 25 or FIG. 26) may also include and/or be made of one or more microprocessors, nanoprocessors, one or more graphics processing units ("GPUs"; also called a visual processing unit ("VPU")), one or more Field Programmable Gate Arrays ("FPGAs"), or other types of processing components (e.g., application specific integrated circuit(s) (ASIC)). Still further, the various aspects of the present disclosure may be implemented by way of software and/or firmware program(s) that may be stored on suitable storage medium (e.g., computer-readable storage medium, hard drive, etc.) or media (such as floppy disk(s), memory chip(s), etc.) for transportability and/or distribution. The computer may include a network of separate computers or separate processors to read out and execute the computer executable instructions. The computer executable instructions may be provided to the computer, for example, from a network or the storage medium.

As aforementioned, hardware structure of an alternative embodiment of a computer or console 1200' is shown in FIG. 26. The computer 1200' includes a central processing unit (CPU) 1201, a graphical processing unit (GPU) 1215, a random access memory (RAM) 1203, a network interface 1212, an operation interface 1214 such as a universal serial bus (USB) and a memory such as a hard disk drive or a solid state drive (SSD) 1207. Preferably, the computer or console 1200' includes a display 1209. The computer 1200' may connect with the ultra-high resolution detector scanner 200 and/or the wide-coverage CT detector scanner 100, and/or one or more other components of a system via the operation interface 1214 or the network interface 1212. A computer, such as the computer 1200, 1200', may include the ultra-high resolution detector scanner 200 and/or the wide-coverage CT detector scanner 100 in one or more embodiments. The operation interface 1214 is connected to an operation unit such as a mouse device 1211, a keyboard 1210 or a touch panel device. The computer 1200' may include two or more of each component. Alternatively, the CPU 1201 or the GPU 1215 may be replaced by the field-programmable gate array (FPGA), the application-specific integrated circuit (ASIC) or other processing unit depending on the design of a computer, such as the computer 1200, the computer 1200', etc.

A computer program is stored in the SSD 1207, and the CPU 1201 loads the program onto the RAM 1203 and executes the instructions in the program to perform one or more processes described herein, as well as the basic input, output, calculation, memory writing and memory reading processes.

The computer, such as the computer 1200, 1200', communicates with the ultra-high resolution detector scanner 200 and/or the wide-coverage CT detector scanner 100, to perform imaging, and to generate a DCNN enabled CT image that approximates a wide-coverage UHR CT image. The monitor or display 1209 displays the DCNN enabled CT image that approximates a wide-coverage UHR CT image and may display other information about the imaging condition or about an object to be imaged. The monitor 1209 also provides a graphical user interface for a user to operate a system, for example when generating a DCNN enabled CT image that approximates a wide-coverage UHR CT image. An operation signal is input from the operation unit (e.g., such as, but not limited to, a mouse device 1211, a keyboard 1210, a touch panel device, etc.) into the operation interface 1214 in the computer 1200', and corresponding to the operation signal the computer 1200' instructs the system to set or change the imaging condition, and to start or end the imaging, and/or to start or end training the DCNN or the inference process for generating a DCNN enabled CT image that approximates a wide-coverage UHR CT image.

Figure 27:
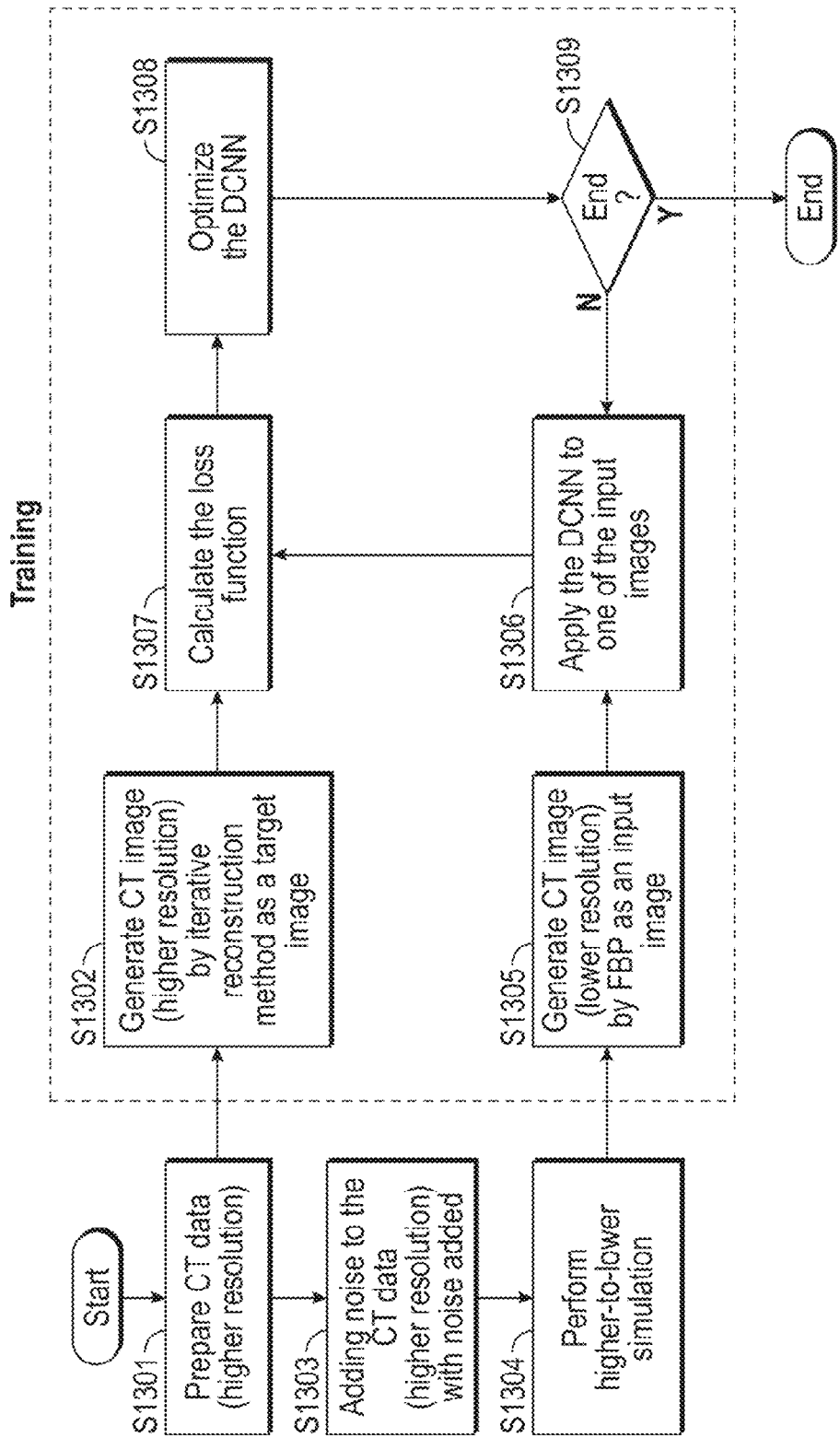
FIG. 27 shows a diagram of a method for generating a trained model for SR according to another embodiment of the present disclosure.

Another exemplary embodiment of a method for generating a trained model for SR is described with reference to FIG. 27. This method includes one of the features of the method described in FIG. 16, in which both the UHR CT image and the NR CT image are generated from UHR CT data. This method is also similar to the method described in FIG. 23, in which NR low-dose CT image and UHR high-dose CT image are used to train the DCNN for SR. Unless mentioned otherwise, the following steps are performed by the information processing apparatus 400. The CPU or GPU (hereinafter processing circuitry) will perform each of the steps.

In step S1301, the UHR CT data, or CT data with higher resolution is obtained. In step S1302, the UHR CT image, or CT image with higher resolution is reconstructed based on the UHR CT data. The reconstruction method can be one of iterative reconstruction methods, which can generate an image with a better resolution than the filtered back-projection (FBP) method. The UHR CT image will be used as target image in the training phase. In step S1303, the processing circuitry generates UHR CT data with noise added, by adding noise to the UHR CT data Gaussian noise and/or Poisson noise may be added to better simulate low-dose CT data. In step S1304, CT data with lower resolution, is generated, by applying resolution-lowering processing (e.g. n:1 binning processing, smoothing or other filtering) to the UHR CT data with noise added, to simulate the CT data with lower resolution. In step S1305, the CT image with lower resolution is reconstructed based on the CT data with lower resolution. Here the reconstruction method can be filtered back-projection (FBP) method, or any other reconstruction method that is typically used in a clinical setting. Usually there are a variety of selections for reconstruction functions and filters for FBP, and for this FBP reconstruction in step S1305, you can select a reconstruction function with no/less noise reduction effect so that you can preserve signals as much as possible. You can also select a filter of filters with no/less normalizing effect. The CT image with lower resolution is used as an input image to train the DCNN for SR. The corresponding input image and target image generated from the UHR data is associated with each other to become a pair of training data. In steps 1301 through S1305 are performed repeatedly for different UHR data to generate multiple pairs of training data. In step S1306, The DCNN is applied to one of the input images to obtain a processed CT image. In Step S1307, the loss function as described in step S306 with reference to FIG. 18 is obtained. In Step S1308 the DCNN is optimized to obtain a revised DCNN which is used in the next step S1306. The loop of steps S1306, S1307 and S1308 continues to train the DCNN for super-resolution processing, until an end criterion is satisfied (Y in S1309).

Though the binning processing in Step 1303 has some noise reduction effect, due to the noise addition processing in S1303 and the difference in the reconstruction methods, the target image (CT image with higher resolution) has both better spatial resolution and better noise characteristics than the input image (CT image with lower resolution), the trained DCNN for SR has an effect of noise reduction as well as an effect of super-resolution. In alternative embodiments, noise may be added to the reconstructed CT image with lower resolution to get an input image, instead of /in addition to adding noise to the CT data, in a projection domain. The above-described DCNN is trained to have the effect of both denoise and super-resolution, can be at least in some situations advantageous over application of both the DCNN for denoise and DCNN for SR, separately trained. Another embodiment of the processes of the inference phase is described herein. The processes include application of another type of a DCNN model which is specifically for denoising CT images, and selection of one of (1) the DCNN for denoise and (2) the DCNN trained by the method described above with reference to FIG. 21 or FIG. 27. It should be noted that the DCNN (hereinafter sometimes referred to DCNN for SR and denoise) can have an effect of noise reduction as well as super-resolution. The processes of applying the inference phase may be implemented into the image processing apparatus 150 in the wide-coverage CT detector system 100, a console in other types of CT imaging system, or an image processing apparatus external to the CT imaging system, for example a workstation in a hospital or an image processing server which receives a medical image to analyze or medical data to reconstruct a medical image. In the following description, each step is performed by, processing circuitry, which is a CPU or GPU included in the image processing apparatus, the console, the workstation or the image processing server.

The DCNN for denoise can be trained with multiple pairs of training images. In one embodiment, the input image can be a low-dose CT image and the corresponding target image can be a high-dose CT image. The low-dose CT image can be acquired in a CT scan of an object to be examined. The high-dose CT image can also be acquired in a CT scan of an object to be examined. The low-dose CT image can also be generated from the high-dose CT image acquired in a CT scan, by adding noise to simulate low-dose image. The high-dose CT image can be generated from the low-dose CT image acquired in a CT scan, by image processing to simulate a high-dose image. In another embodiment the target image can be acquired in iterative reconstruction processing of CT data acquired in a CT scan of an object to be examined, and the input image can be obtained by adding noise to the CT data and by reconstructing the CT data with noised added, with FBP method. It should be noted that the denoise model can also have an effect of reducing various types of artifacts.

In a first step, the CT data is obtained from CT detector in a case where this step is performed in the CT imaging system. The CT data can be obtained from the CT imaging system, in a case where this step is performed in the workstation or the image processing server. The CT data also can be obtained from a memory in a case where this step is performed in the CT imaging system, the workstation or the image processing server.

In a second step, the processing circuitry determines whether the denoise model (the DCNN for denoise) or the SR model (the DCNN for denoise and SR) is to be applied to the image resultant to the reconstruction processing. In a case where the denoise model is selected, the processing circuitry reconstructs a first CT image with a first reconstruction condition, and the processing circuitry reconstructs a second CT image with a second reconstruction condition. The second reconstruction condition includes the reconstruction function and the filter that has no/less noise reduction effect in order to preserve image information are selected for FBP reconstruction, compared to the first reconstruction condition. Also, pixel density or the number of pixels in a reconstruction area is larger in the second reconstruction condition than in the first reconstruction condition, for better resolution improvement in SR processing for the second CT image. Also, in a case where the specific noise reduction processing is applied in reconstruction of both the first and the second CT images, the degree of noise reduction may be lower for the second CT image than for the first CT image, for preserving image information in the second CT image.

In a next step, the DCNN for denoise is applied to the first CT image to obtain a denoised CT image, and then, the DCNN for SR and denoise is applied to the first CT image to obtain an SR-CT image. The CT image obtained is output for display or for analysis. In a case where the obtained CT image is output for display, the processing circuitry generates a graphical user interface including the obtained CT image and send it to a display. If the display is connected to the image processing apparatus or the workstation, the processing circuitry causes the display to display the obtained CT image.

The above-described processes do not mention a case where no DCNN model is selected to be applied, but in this case the processing circuitry selects the same first reconstruction condition, or a third reconstruction condition which is different from the first or the second reconstruction condition.

In one embodiment, multiple DCNN models for SR (and denoise) and multiple DCNN models for denoise can be prepared 'on a body-part basis', meaning that a DCNN model, whether for SR or for denoise, can be trained for a specific body-part and/or a specific clinical application by using only the images of a specific body-part and/or specific clinical application are used for training.

If the multiple DCNN for SR are stored on a memory, the processing circuitry designates one of the multiple DCNN, corresponding to the body-part imaged.

The reconstruction condition and DCNN can be selected either before or after the CT data is obtained, based on the scanning information.

Figure 28:
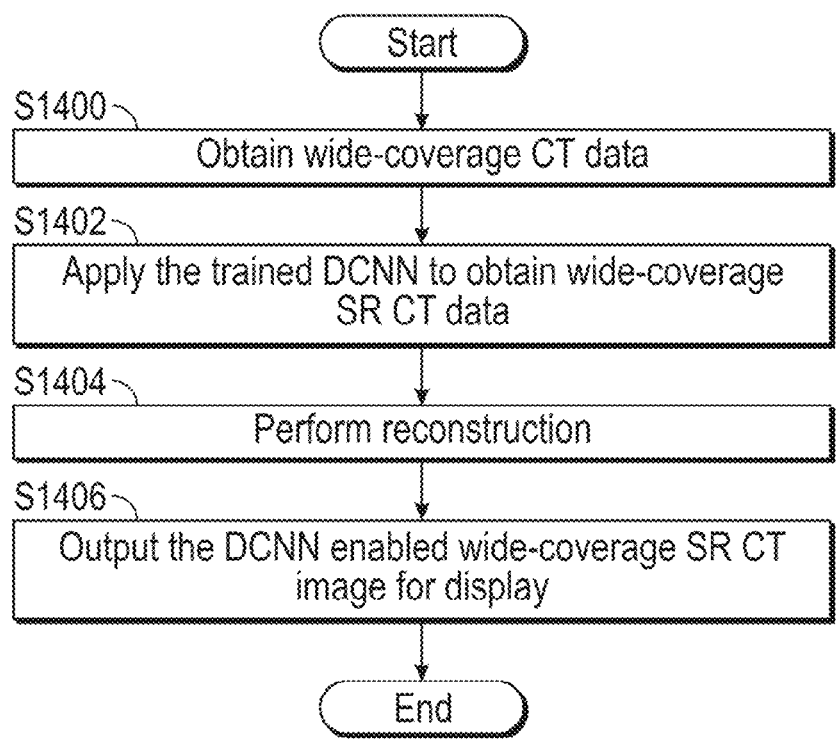
FIG. 28 is a flowchart illustrating various steps of the inference phase, according to another embodiment of the present disclosure.

Another exemplary embodiment of the present disclosure is described herein with reference to FIG. 28. In this embodiment, the DCNN model is applied to the CT data (CT projection data) in a projection domain, and then the image is reconstructed. In one embodiment, the DCNN can be trained with pairs of training data each including a target data which is UHR CT data, and an input data which is NR CT data which can be acquired in a different CT scan than the UHR CT data or can be generated by performing UHR-to-NR simulation as described above. In another embodiment, the target data is HD UHR CT data and the input data is LD NR CT data which can be acquired in a different CT scan than the HD UHR CT data, or can be generated by adding noise and performing UHR-to NR simulation as described with reference to FIG. 27.

The following steps described below are performed by the CPU or GPU of the image processing apparatus 150 (the processing circuitry) or can be performed by the processing circuitry of the workstation or the image processing server.

In step S1400, wide-coverage CT data is obtained. In another embodiment, the CT data can be normal-coverage CT data. In step S1402, the trained DCNN is applied to the wide-coverage CT data to obtain wide-coverage SR CT data. In step S1404, the reconstruction processing is applied to the wide-coverage SR CT data to obtain wide-coverage SR CT image. In step S1406, the wide-coverage SR CT image is output for display, or for further analysis.

Figure 29:
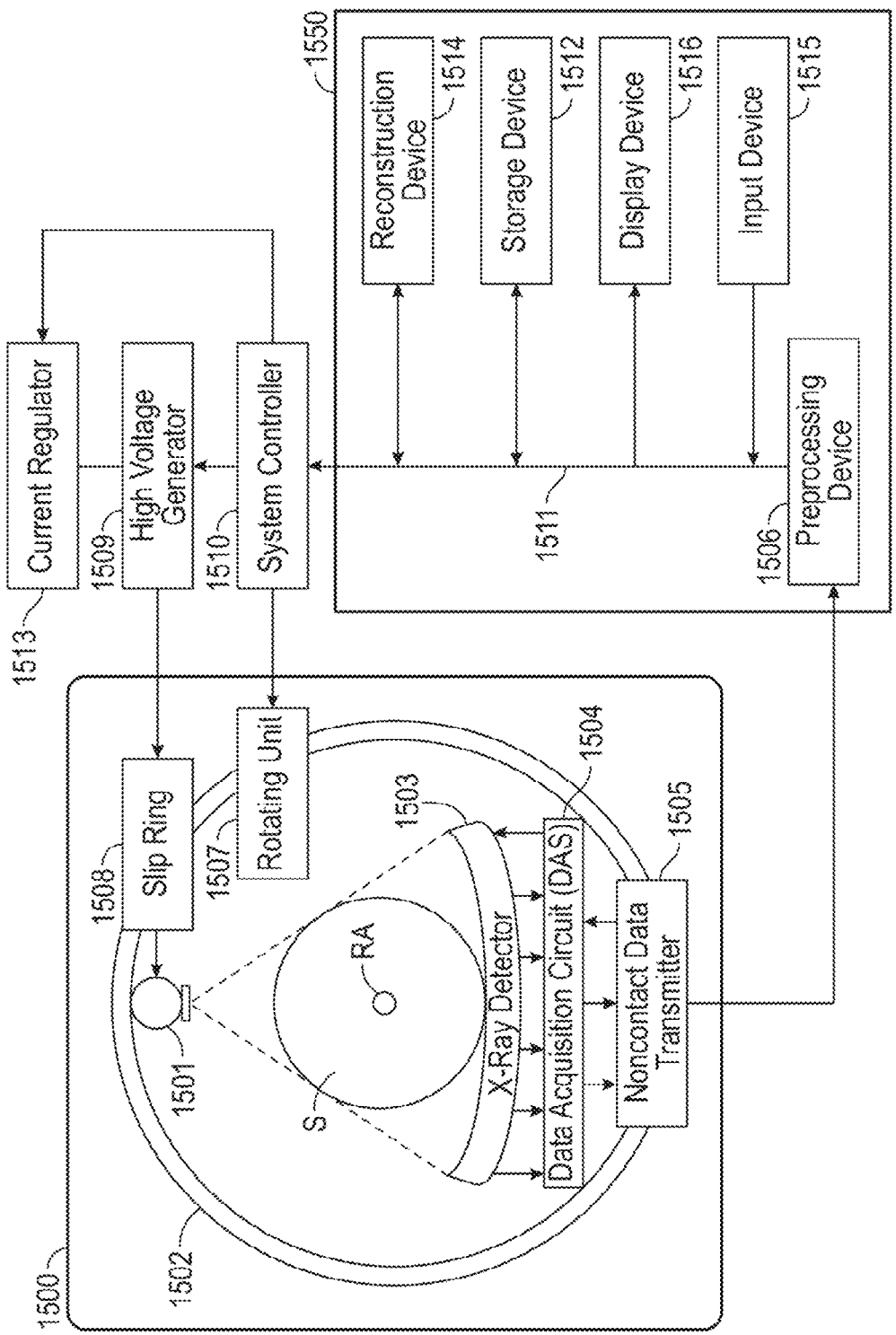
FIG. 29 shows a schematic diagram of a CT imaging apparatus, according to an embodiment of the present disclosure.

FIG. 29 illustrates an exemplary embodiment of a radiography gantry included in a CT imaging system, corresponding to the wide-coverage CT detector system. As shown in FIG. 29, a radiography gantry 1500 is illustrated from a side view and further includes an X-ray tube 1501, an annular frame 1502, and a multi-row or two-dimensional-array-type X-ray detector 1503. The X-ray tube 1501 and X-ray detector 1503 are diametrically mounted across an object OBJ on the annular frame 1502, which is rotatably supported around a rotation axis RA. A rotating unit 1507 rotates the annular frame 1502 at a certain speed, while the object OBJ is being moved along the axis RA into or out of the illustrated page. The console or the image processing apparatus 1550 includes the reconstruction device 1514, the storage device 1512, the display device 1516, the input device 1515, and the preprocessing device 1506.

The X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present disclosure can be applied to either type. In this case, the rotate/rotate type, which is currently the mainstream, will be exemplified.

The multi-slice X-ray CT apparatus further includes a high voltage generator 1509 that generates a tube voltage applied to the X-ray tube 1501 through a slip ring 1508 so that the X-ray tube 1501 generates X-rays. The X-rays are emitted towards the object OBJ, whose cross-sectional area is represented by a circle. For example, the X-ray tube 1501 having an average X-ray energy during a first scan that is less than an average X-ray energy during a second scan. Thus, two or more scans can be obtained corresponding to different X-ray energies. The X-ray detector 1503 is located at an opposite side from the X-ray tube 1501 across the object OBJ for detecting the emitted X-rays that have transmitted through the object OBJ. The X-ray detector 1503 further includes individual detector elements or units.

The CT apparatus further includes other devices for processing the detected signals from X-ray detector 1503. A data acquisition circuit or a Data Acquisition System (DAS) 1504 converts a signal output from the X-ray detector 1503 for each channel into a voltage signal, amplifies the signal, and further converts the signal into a digital signal. The X-ray detector 1503 and the DAS 1504 are configured to handle a predetermined total number of projections per rotation (TPPR).

The above-described data is sent to a preprocessing device 1506, which is housed in the console outside the radiography gantry 1500 through a non-contact data transmitter 1505. The preprocessing device 1506 performs certain corrections, such as sensitivity correction on the raw data. A memory 1512 stores the resultant data, which is also called projection data at a stage immediately before reconstruction processing. The memory 1512 is connected to a system controller 1510 through a data/control bus 1511, together with a reconstruction device 1514, input device 1515, and display device 1516. The system controller 1510 controls a current regulator 1513 that limits the current to a level sufficient for driving the CT system.

In this exemplary configuration of the CT imaging apparatus, the reconstruction device 1514 performs the processes and methods described with reference to FIGS. 17, 20, 21, 22, 24, and 28.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 1501 and the X-ray detector 1503 are diametrically mounted on the annular frame 1502 and are rotated around the object OBJ as the annular frame 1502 is rotated about the rotation axis RA. In the fourth-generation geometry system, the detectors are fixedly placed around the patient and an X-ray tube rotates around the patient. In an alternative embodiment, the radiography gantry 1500 has multiple detectors arranged on the annular frame 1502, which is supported by a C-arm and a stand.

The memory 1512 can store the measurement value representative of the irradiance of the X-rays at the X-ray detector 1503.

Further, reconstruction device 1514 can execute pre-reconstruction image processing such as volume rendering processing and image difference processing as needed.

The pre-reconstruction processing of the projection data performed by the preprocessing device 1506 can include correcting for detector calibrations, detector nonlinearities, and polar effects, for example.

Post-reconstruction processing performed by the reconstruction device 1514 can include filtering and smoothing the image, volume rendering processing, and image difference processing as needed. The reconstruction device 1514 can use the memory to store, e.g., projection data, reconstructed images, calibration data and parameters, and computer programs.

The reconstruction device 1514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 1512 can be non-volatile, such as ROM, EPROM, EEPROM or FLASH memory. The memory 1512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 1514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a given processor and a given operating system or any operating systems known to those skilled in the art. Further, CPU can be implemented as multiple processors cooperatively working in parallel to perform the instructions.

In one implementation, the reconstructed images can be displayed on a display 1516. The display 1516 can be an LCD display, CRT display, plasma display, OLED, LED or any other display known in the art.

The memory 1512 can be a hard disk drive, CD-ROM drive, DVD drive, FLASH drive, RAM, ROM or any other electronic storage known in the art.

Figure 30:
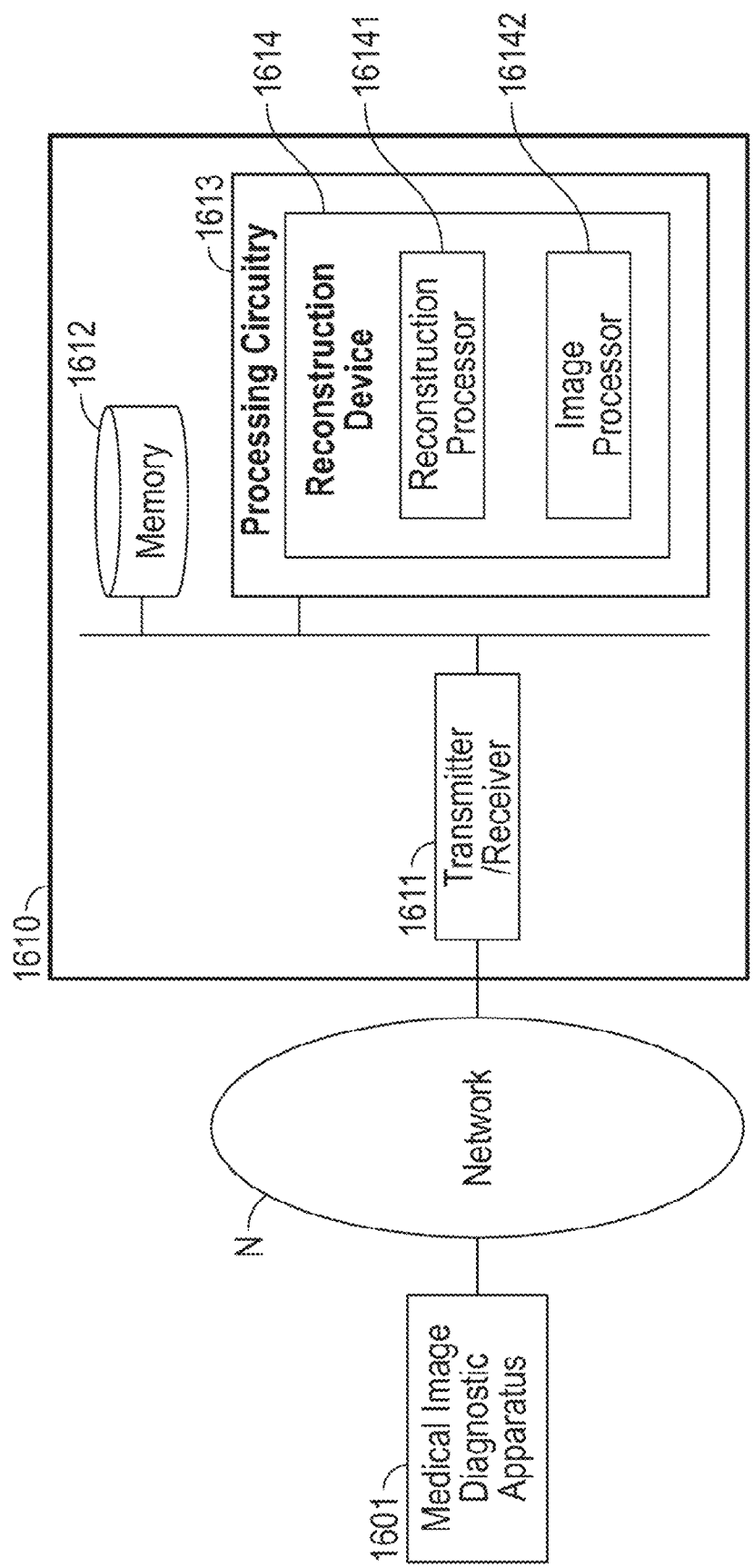
FIG. 30 shows a diagram illustrating an example of a medical image processing system that has a client-server configuration involving an intermediary network, according to an embodiment of the present disclosure.

FIG. 30 shows an example of a medical image processing system that has a client-server configuration involving an intermediary network. As shown in this figure, the medical image processing system includes a medical image diagnostic apparatus 1601 as a client-side apparatus, and a medical image processing apparatus 1610 as a server-side apparatus connected with the medical image diagnostic apparatus 1601 via a network N.

The medical image diagnostic apparatus 1601 may typically be an X-ray CT apparatus as shown in FIG. 29, or the wide-coverage CT detector system 100 in FIG. 16.

The medical image processing apparatus 1610 includes a transmitter/receiver 1611, a memory 1612, and processing circuitry 1613. The processing circuitry 1613 includes a reconstruction device 1614 which includes a reconstruction processor 16141 and an image processor 16142. The transmitter/receiver 1611 transmits data to, and receives data from, the medical image diagnostic apparatus 1601 via the network N. The memory 1612 stores information such as medical image data received from the medical image diagnostic apparatus 1601, and various dedicated programs for executing the reconstruction processing, denoise processing, etc. as described. The processing circuitry 1613 is a processor to realize the functions of the reconstruction device 1514 as described.

With these configurations, the medical image diagnostic apparatus 1601 is not required to implement the functions of the reconstruction device 1514 in FIG. 29. Therefore, the processing load within the medical image diagnostic apparatus 1601 as well as the costs associated with the medical image diagnostic apparatus 1601 can be reduced. Also, the reconstruction processing and the denoise processing are performed in a uniform manner in the medical image processing apparatus 1610 as a server side. Thus, it is possible to avoid variations in image qualities, etc. that might otherwise occur due to differences in operators when the reconstruction processing and the denoise processing are performed in each local medical image diagnostic apparatus.

According to at least one of the embodiments and the like described above, visual recognition of an object, for example, anatomical characteristics, in a medical image can be improved, and a medical image having improved image quality can be generated.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

With respect to the embodiments as above, the following subjoinders describing an aspect and selective features of the present disclosure will be presented.

Subjoinder 1:
A medical data processing method, includes inputting first medical data relating to a subject imaged with a medical image capture apparatus to a learned model configured to generate second medical data having lower noise than that of the first medical data and having a super resolution compared with the first medical data based on the first medical data to output the second medical data.

Subjoinder 2:
The first medical data may be data before reconstruction or data before display processing, collected by imaging the subject with the medical image capture apparatus, and the method further may include generating a medical image based on the second medical data.

Subjoinder 3:
The first medical data may be a first reconstructed image reconstructed based on collected data collected by imaging the subject with the medical image capture apparatus, and the second medical data may be a second reconstructed image having lower noise than that of the first reconstructed image and having a super resolution compared with the first reconstructed image.

Subjoinder 4:
The medical data processing method may further include when the learned model is not used, performing reconstruction to generate the first reconstructed image in a first matrix size based on the collected data collected by imaging the subject with the medical image capture apparatus, when the learned model is used, performing reconstruction to generate the first reconstructed image in a second matrix size based on the collected data, the second matrix size being greater than the first matrix size and coinciding with a matrix size of the second reconstructed image, and inputting the first reconstructed image having the second matrix size to the learned model to output the second reconstructed image.

Subjoinder 5:
The medical data processing method may further include upsampling a first matrix size of the first reconstructed image to a second matrix size greater than the first matrix size and coinciding with a matrix size of the second reconstructed image, and inputting the first reconstructed image having the second matrix size to the learned model to output the second reconstructed image.

Subjoinder 6:
A model generation method of generating the learned model according to Subjoinder 2 may include adding noise to first training data and lowering a resolution of the first training data to generate second training data, the first training data corresponding to the noise and the resolution of the second medical data, the second training data corresponding to noise and a resolution of the collected data, and training a deep convolution neural network using the first training data and the second training data to generate the learned model.

Subjoinder 7:
A model generation method of generating the learned model according to Subjoinder 3 may include performing reconstruction to generate a first training image based on first pre-reconstruction data before reconstruction that corresponds to the noise and the resolution of the second reconstructed image, adding noise to the first pre-reconstruction data and lowering a resolution of the first pre-reconstruction data to generate second pre-reconstruction data before reconstruction that corresponds to the noise and the resolution of the first reconstructed image, performing reconstruction to generate a second training image based on the second pre-reconstruction data; and training a deep convolution neural network using the first training image and the second training image to generate the learned model.
Subjoinder 8:

A model generation method of generating the learned model according to Subjoinder 3 may include performing reconstruction to generate a first training image based on first pre-reconstruction data before reconstruction that corresponds to the noise and the resolution of the second reconstructed image, adding noise to the first pre-reconstruction data and reconstructing the first pre-reconstruction data to generate a noise-added image that corresponds to the noise of the first reconstructed image, lowering a resolution of the noise-added image to generate a second training image that corresponds to the noise and the resolution of the first reconstructed image, and training a deep convolution neural network using the first training image and the second training image to generate the learned model.
Subjoinder 9:

A model generation method of generating the learned model according to Subjoinder 3 may include performing reconstruction to generate a first training image based on first pre-reconstruction data before reconstruction that corresponds to the noise and the resolution of the second reconstructed image, lowering the resolution of the first pre-reconstruction data and reconstructing the first pre-reconstruction data to generate a low-resolution image that corresponds to the resolution of the first reconstructed image, adding noise to the low-resolution image to generate a second training image that corresponds to the noise and the resolution of the first reconstructed image, and training a deep convolution neural network using the first training image and the second training image to generate the learned model.
Subjoinder 10:

A model generation method of generating the learned model according to Subjoinder 3 may include performing reconstruction to generate a first training image based on first pre-reconstruction data before reconstruction that corresponds to the noise and the resolution of the second reconstructed image, adding noise to the first training image and lowering a resolution of the first training image to generate a second training image that corresponds to the noise and the resolution of the first reconstructed image, and training a deep convolution neural network using the first training image and the second training image to generate the learned model.
Subjoinder 11:

A medical data processing apparatus includes processing circuitry configured to input first medical data relating to a subject imaged with a medical image capture apparatus to a learned model configured to generate second medical data having lower noise than that of the first medical data and having a super resolution compared with the first medical data based on the first medical data to output the second medical data.
Subjoinder 12:

A computer-readable non-transitory storage medium storing a medical data processing program including programmed instructions, wherein the instructions, when executed by a computer, cause the computer to perform inputting first medical data relating to a subject imaged with a medical image capture apparatus to a learned model configured to generate second medical data having lower noise than that of the first medical data and having a super resolution compared with the first medical data based on the first medical data to output the second medical data.
Subjoinder 13:

A medical image processing method includes obtaining a first set of projection data by performing, with a first computed tomography (CT) apparatus comprising a first detector with a first pixel size, a first CT scan of an object in a first imaging region of the first detector; obtaining a first CT image with a first resolution by reconstructing the first set of projection data; obtaining a processed CT image with a resolution higher than the first resolution by applying a machine-learning model for resolution enhancement to the first CT image; and displaying the processed CT image or outputting the processed CT image for analysis. The machine-learning model is obtained by training using a second CT image generated based on a second set of projection data which is acquired by performing, with a second CT apparatus comprising a second detector with a second pixel size smaller than the first pixel size, a second CT scan of the object in a second imaging region of the second detector, the second imaging region being smaller than the first imaging region.
Subjoinder 14:

The medical image processing method may include, in applying the machine-learning model, generating the first CT image by reconstructing the first set of projection data according to a first matrix size; and, in not applying the machine-learning model, generating another CT image by reconstructing the first set of projection data according to a second matrix size smaller than the first matrix size.
Subjoinder 15:

The first matrix size may be set to any of 512×512, 1024×1024, 2048×2048, and 4096×4096.
Subjoinder 16:

The second matrix size may be set to any of 256×256, 512×512, 1024×1024, and 2048×2048.
Subjoinder 17:

The first matrix size may be set to 1024×1024 or more and the second matrix size may be set to 512×512 or more.
Subjoinder 18:

The medical image processing method may include, in applying the machine-learning model, generating the first CT image by reconstructing the first set of projection data by a first reconstruction function; and, in applying another machine-learning model for noise reduction different from the machine-learning model in place of the machine-learning model, generating another CT image by reconstructing the first set of projection data by a second reconstruction function having a larger noise reduction effect than the first reconstruction function, and applying the another machine-learning model to the another CT image.
Subjoinder 19:

According to the medical image processing method, in the obtaining the processed CT image, the processed CT image may be obtained by combining, at a predetermined ratio, the first CT image and an image obtained by applying the machine-learning model to the first CT image.
Subjoinder 20:

The predetermined ratio may be set according to a user input or a set of imaging conditions.
Subjoinder 21:

The medical image processing method may include, in applying the machine-learning model, generating a plurality of 3D partial images based on the first CT image; inputting the plurality of 3D partial images to a designated one of the machine-learning model and the another machine-learning model to obtain a plurality of processed 3D partial images by applying the designated machine-learning model, and obtaining the processed image by combining the plurality of processed 3D partial images together.

Subjoinder 22:

According to the medical image processing method, in the generating the plurality of 3D partial images, at least two of the plurality of 3D partial images may be generated in a partially overlapping manner.

Subjoinder 23:

According to the medical image processing method, in combining the plurality of processed 3D partial images, the plurality of processed 3D partial images may be combined by applying filtering to a joint part between two adjacent processed 3D partial images of the plurality of processed 3D partial images.

Subjoinder 24:

The machine-learning model may be for applying super resolution processing to the first CT image.

Subjoinder 25:

The machine-learning model may be for applying super resolution processing and noise reduction processing to the first CT image.

Subjoinder 26:

According to the medical image processing method, in obtaining the machine-learning model, the machine-learning model may be trained with training images being the second CT image and a third CT image generated based on either the second CT image or the second set of projection data. The third CT image has a lower resolution and greater noise than the second CT image.

Subjoinder 27:

According to the medical image processing method, in obtaining the machine-learning model, the machine-learning model may be trained with training images being the second CT image and a fourth CT image generated based on a third set of projection data. The third set of projection data is obtained by applying noise addition and resolution-lowering processing to the second set of projection data.

Subjoinder 28:

A medical image processing apparatus includes processing circuitry configured to obtain a first set of projection data by performing, with a first computed tomography (CT) apparatus comprising a first detector with a first pixel size, a first CT scan of an object in a first imaging region of the first detector; obtain a first CT image with a first resolution by reconstructing the first set of projection data; obtain a processed CT image with a resolution higher than the first resolution by applying a machine-learning model for resolution enhancement to the first CT image; and display the processed CT image or output the processed CT image for analysis. The machine-learning model is obtained by training using a second CT image generated based on a second set of projection data which is acquired by performing, with a second CT apparatus comprising a second detector with a second pixel size smaller than the first pixel size, a second CT scan of the object in a second imaging region of the second detector, the second imaging region being smaller than the first imaging region.

Subjoinder 29:

An X-ray computed tomography apparatus including the medical image processing apparatus of Subjoinder 28 may be provided.

Subjoinder 30:

A computer readable, non-volatile storage medium stores an image processing program which causes, when executed by a computer, the computer to execute obtaining a first set of projection data by performing, with a first computed tomography (CT) apparatus comprising a first detector with a first pixel size, a first CT scan of an object in a first imaging region of the first detector; obtaining a first CT image with a first resolution by reconstructing the first set of projection data; obtaining a processed CT image with a resolution higher than the first resolution by applying a machine-learning model for resolution enhancement to the first CT image; and displaying the processed CT image or outputting the processed CT image for analysis. The machine-learning model is obtained by training using a second CT image generated based on a second set of projection data which is acquired by performing, with a second CT apparatus comprising a second detector with a second pixel size smaller than the first pixel size, a second CT scan of the object in a second imaging region of the second detector, the second imaging region being smaller than the first imaging region.

What is claimed is:

1. A medical data processing method, comprising:
   inputting first medical data relating to a subject imaged with a medical image capture apparatus to a learned model;
   outputting second medical data having lower noise than the first medical data and having a higher resolution than the first medical data;
   performing reconstruction to generate a first training image based on first pre-reconstruction data before reconstruction that corresponds to the noise and the resolution of the second reconstructed image;
   adding noise to the first pre-reconstruction data and lowering a resolution of the first pre-reconstruction data to generate second pre-reconstruction data before reconstruction that corresponds to the noise and the resolution of the first reconstructed image;
   performing reconstruction to generate a second training image based on the second pre-reconstruction data; and
   training a deep convolution neural network using the first training image and the second training image to generate the learned model, wherein
   the learned model has been trained using first training data and second training data, the first training data relating to a subject imaged with a medical image capture apparatus, and the second training data being generated by adding noise to the first training data for training the learned model and lowering a resolution of the first training data, and
   the learned model has been learned to generate the first training data based on the second training data, the generated first training data having lower noise than the second training data and having a higher resolution than the second training data.

2. The medical data processing method according to claim 1, wherein the first medical data is data before reconstruction or data before display processing, collected by imaging the subject with the medical image capture apparatus, and
   the method further includes generating a medical image based on the second medical data.

3. The medical data processing method according to claim 1, wherein
   the first medical data is a first reconstructed image reconstructed based on collected data collected by imaging the subject with the medical image capture apparatus, and the second medical data is a second reconstructed image having lower noise than that of the first reconstructed image and having a super resolution compared with the first reconstructed image.

4. The medical data processing method according to claim 3, further comprising:
when the learned model is not used, performing reconstruction to generate the first reconstructed image in a first matrix size based on the collected data collected by imaging the subject with the medical image capture apparatus;
when the learned model is used, performing reconstruction to generate the first reconstructed image in a second matrix size based on the collected data, the second matrix size being greater than the first matrix size and coinciding with a matrix size of the second reconstructed image; and
inputting the first reconstructed image having the second matrix size to the learned model to output the second reconstructed image.

5. The medical data processing method according to claim 3, further comprising:
upsampling the first reconstructed image to a second size greater than a first size and equal to the second reconstructed image; and
inputting the first reconstructed image having the second size to the learned model to output the second reconstructed image.

6. The medical data processing method of generating the learned model according to claim 2, the medical data processing method comprising:
the first training data corresponding to the noise and the resolution of the second medical data, the second training data corresponding to noise and a resolution of the collected data; and
training a deep convolution neural network using the first training data and the second training data to generate the learned model.

7. A medical data processing method comprising:
inputting first medical data relating to a subject imaged with a medical image capture apparatus to a learned model;
outputting second medical data having lower noise than the first medical data and having a higher resolution than the first medical data;
performing reconstruction to generate a first training image based on first pre-reconstruction data before reconstruction that corresponds to the noise and the resolution of the second reconstructed image;
adding noise to the first pre-reconstruction data and reconstructing the first pre-reconstruction data to generate a noise-added image that corresponds to the noise of the first reconstructed image;
lowering a resolution of the noise-added image to generate a second training image that corresponds to the noise and the resolution of the first reconstructed image; and
training a deep convolution neural network using the first training image and the second training image to generate the learned model.

8. The medical data processing method of generating the learned model according to claim 3, the medical data processing method comprising:
performing reconstruction to generate a first training image based on first pre-reconstruction data before reconstruction that corresponds to the noise and the resolution of the second reconstructed image;
lowering the resolution of the first pre-reconstruction data and reconstructing the first pre-reconstruction data to generate a low-resolution image that corresponds to the resolution of the first reconstructed image;
adding noise to the low-resolution image to generate a second training image that corresponds to the noise and the resolution of the first reconstructed image; and
training a deep convolution neural network using the first training image and the second training image to generate the learned model.

9. The medical data processing method of generating the learned model according to claim 3, the medical data processing method comprising:
performing reconstruction to generate a first training image based on first pre-reconstruction data before reconstruction that corresponds to the noise and the resolution of the second reconstructed image;
adding noise to the first training image and lowering a resolution of the first training image to generate a second training image that corresponds to the noise and the resolution of the first reconstructed image; and
training a deep convolution neural network using the first training image and the second training image to generate the learned model.

10. A medical data processing apparatus comprising:
a processor configured to input first medical data relating to a subject imaged with a medical image capture apparatus to a learned model; and
the processor configured to output second medical data having lower noise than the first medical data and having a higher resolution than the first medical data;
the processor configured to perform reconstruction to generate a first training image based on first pre-reconstruction data before reconstruction that corresponds to the noise and the resolution of the second reconstructed image;
the processor configured to add noise to the first pre-reconstruction data and lowering a resolution of the first pre-reconstruction data to generate second pre-reconstruction data before reconstruction that corresponds to the noise and the resolution of the first reconstructed image;
the processor configured to perform reconstruction to generate a second training image based on the second pre-reconstruction data; and
the processor configured to train a deep convolution neural network using the first training image and the second training image to generate the learned model, wherein
the learned model has been trained using first training data and second training data, the first training data relating to a subject imaged with a medical image capture apparatus, and the second training data being generated by adding noise to the first training data and lowering a resolution of the first training data, and
the learned model has been learned to generate the first training data based on the second training data, the generated first training data having lower noise than the second training data and having a higher resolution than the second training data.

11. A computer-readable non-transitory storage medium storing a medical data processing program including programmed instructions, wherein the instructions, when executed by a computer, cause the computer to perform:
inputting first medical data relating to a subject imaged with a medical image capture apparatus to a learned model;

output second medical data having lower noise than the first medical data and having a higher resolution than the first medical data;

performing reconstruction to generate a first training image based on first pre-reconstruction data before reconstruction that corresponds to the noise and the resolution of the second reconstructed image;

adding noise to the first pre-reconstruction data and lowering a resolution of the first pre-reconstruction data to generate second pre-reconstruction data before reconstruction that corresponds to the noise and the resolution of the first reconstructed image;

performing reconstruction to generate a second training image based on the second pre-reconstruction data; and training a deep convolution neural network using the first training image and the second training image to generate the learned model, wherein the learned model has been trained using first training data and second training data, the first training data relating to a subject imaged with a medical image capture apparatus, and the second training data being generated by adding noise to the first training data and lowering a resolution of the first training data, and the learned model has been learned to generate the first training data based on the second training data, the generated first training data having lower noise than the second training data and having a higher resolution than the second training data.

* * * * *